Dec. 15, 1953     R. G. FORDYCE     2,662,470
STENCILING MACHINE
Filed May 12, 1949                                               18 Sheets-Sheet 1

Inventor:
Rufus G. Fordyce
By Hinkle, Horton, Ahlberg, Harrmann & Whipper
Attys.

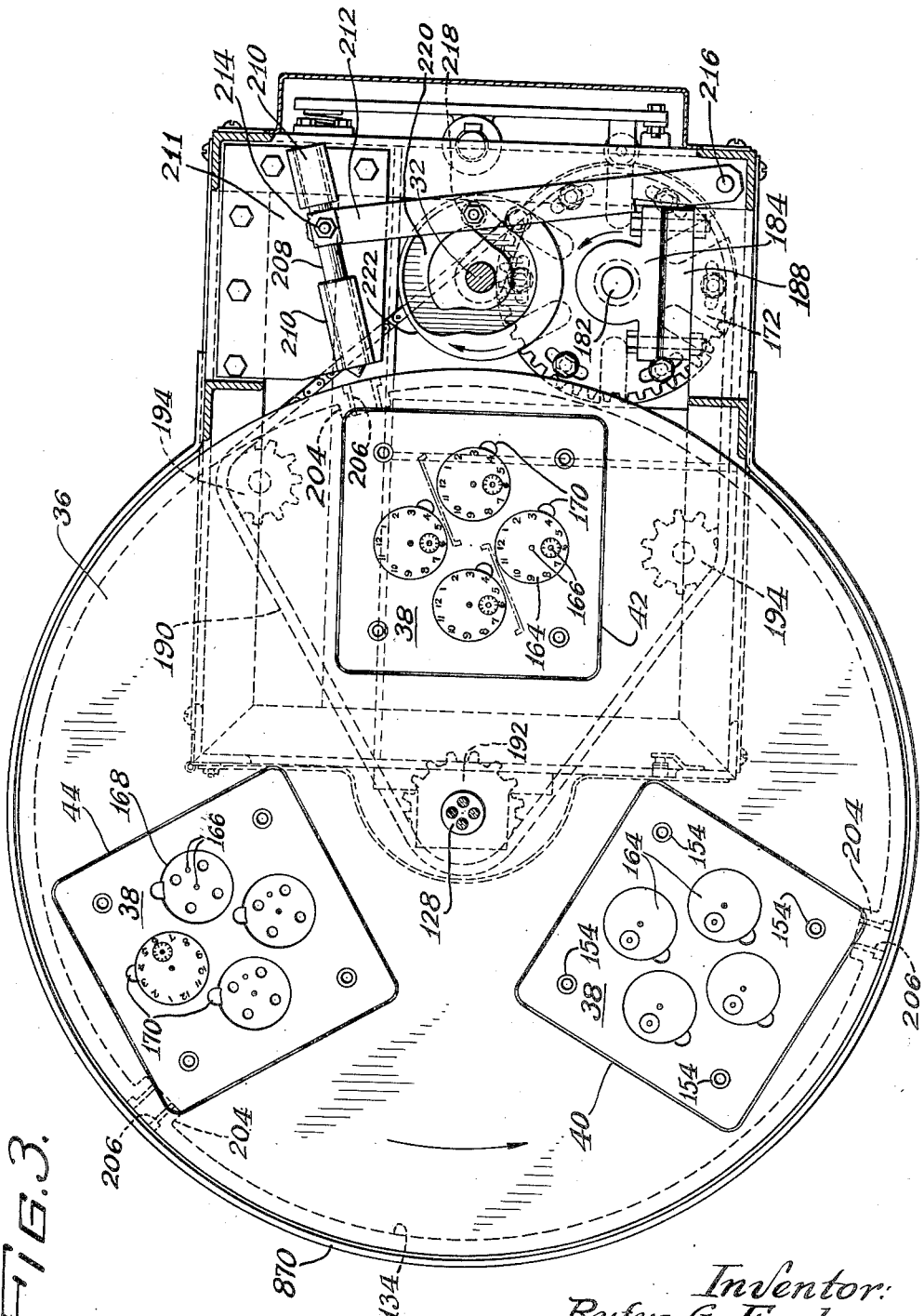

Dec. 15, 1953  R. G. FORDYCE  2,662,470
STENCILING MACHINE
Filed May 12, 1949  18 Sheets-Sheet 4
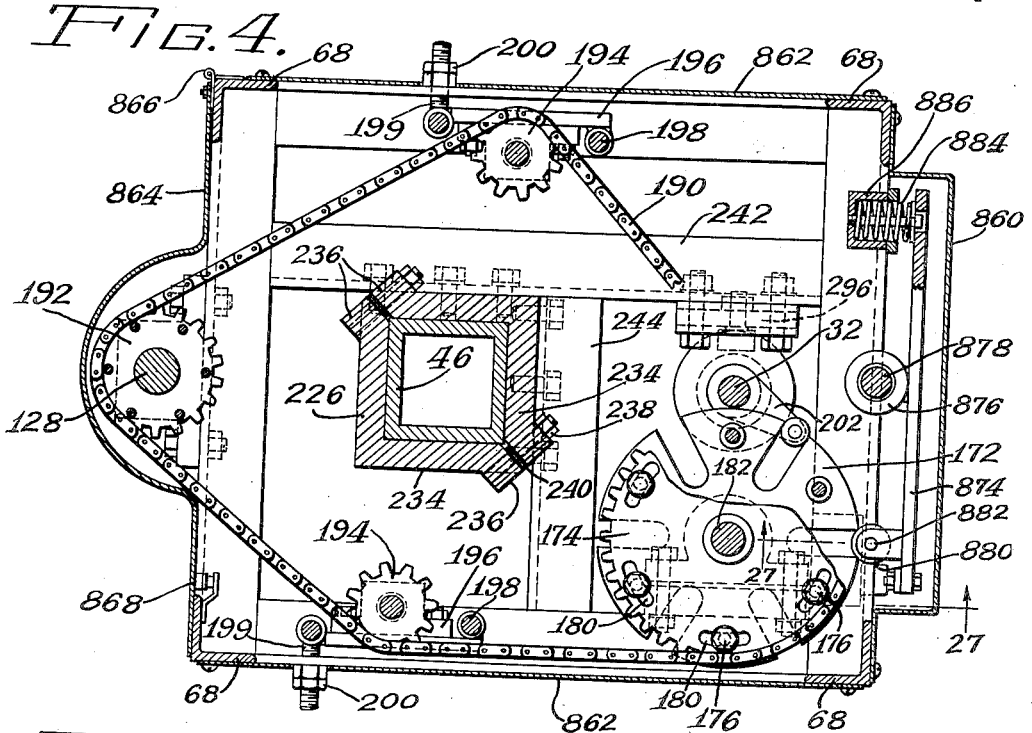
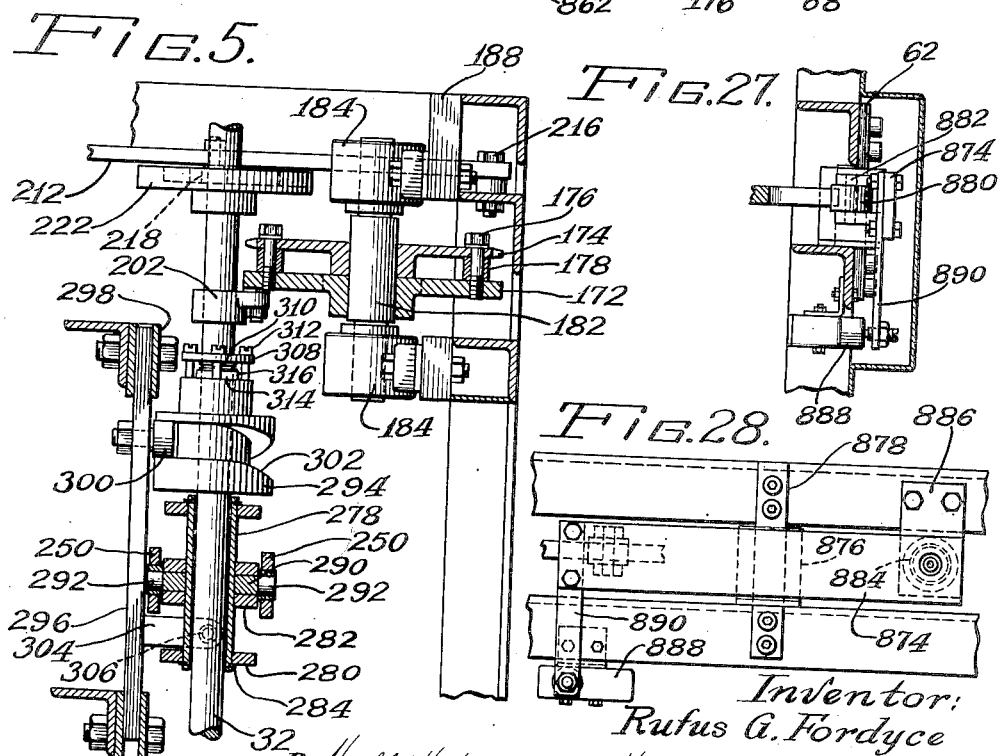
Inventor:
Rufus G. Fordyce Dec. 15, 1953
R. G. FORDYCE
2,662,470
STENCILING MACHINE
Filed May 12, 1949
18 Sheets-Sheet 5
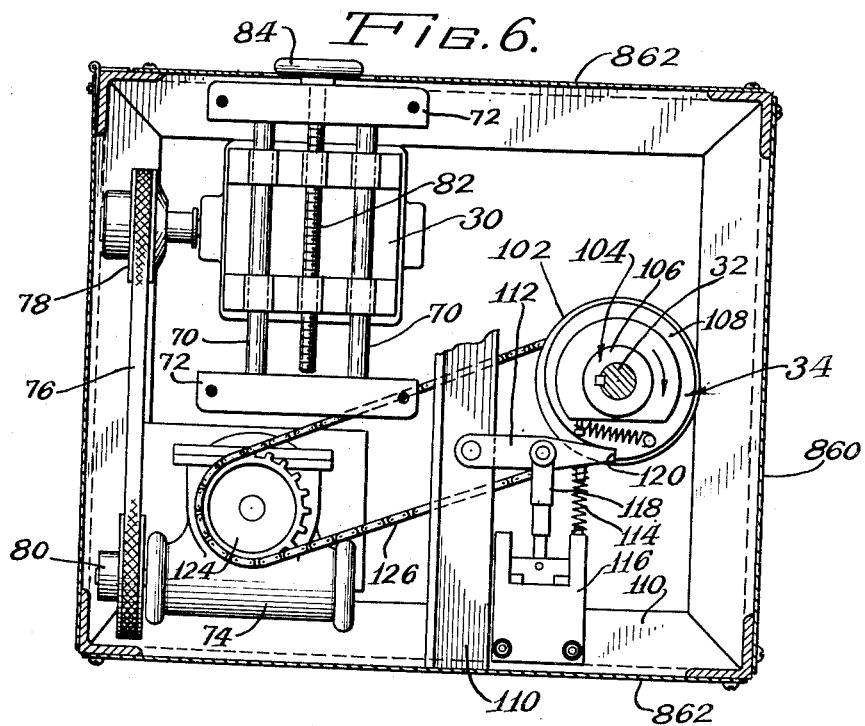
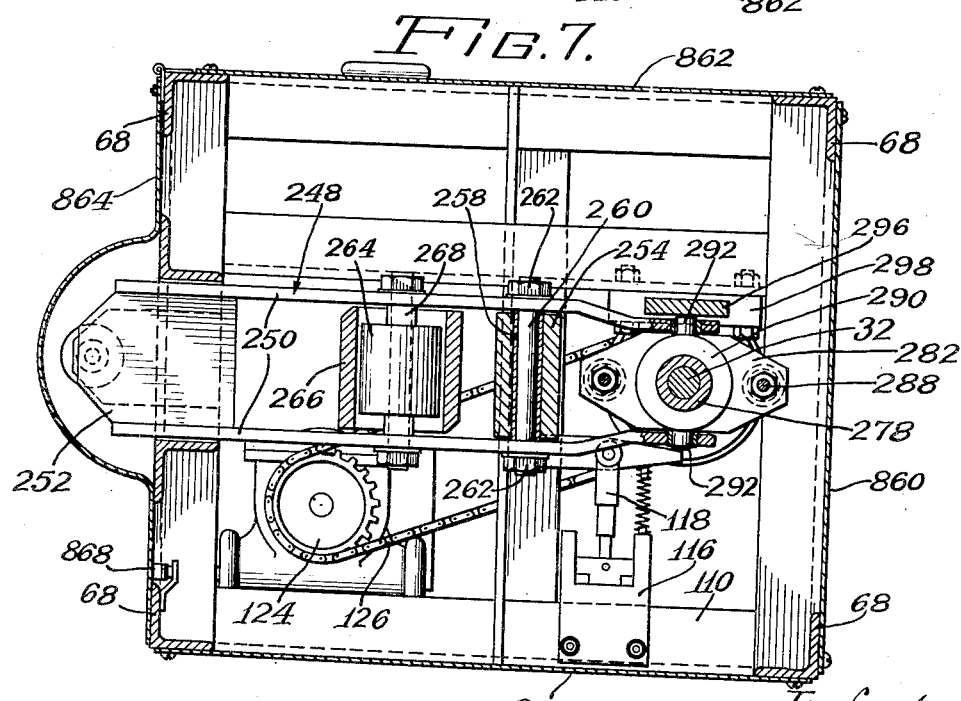
Inventor:
Rufus G. Fordyce
By Hinkle, Horton, Ahlberg, Harrsmann & Wupper
Attys.

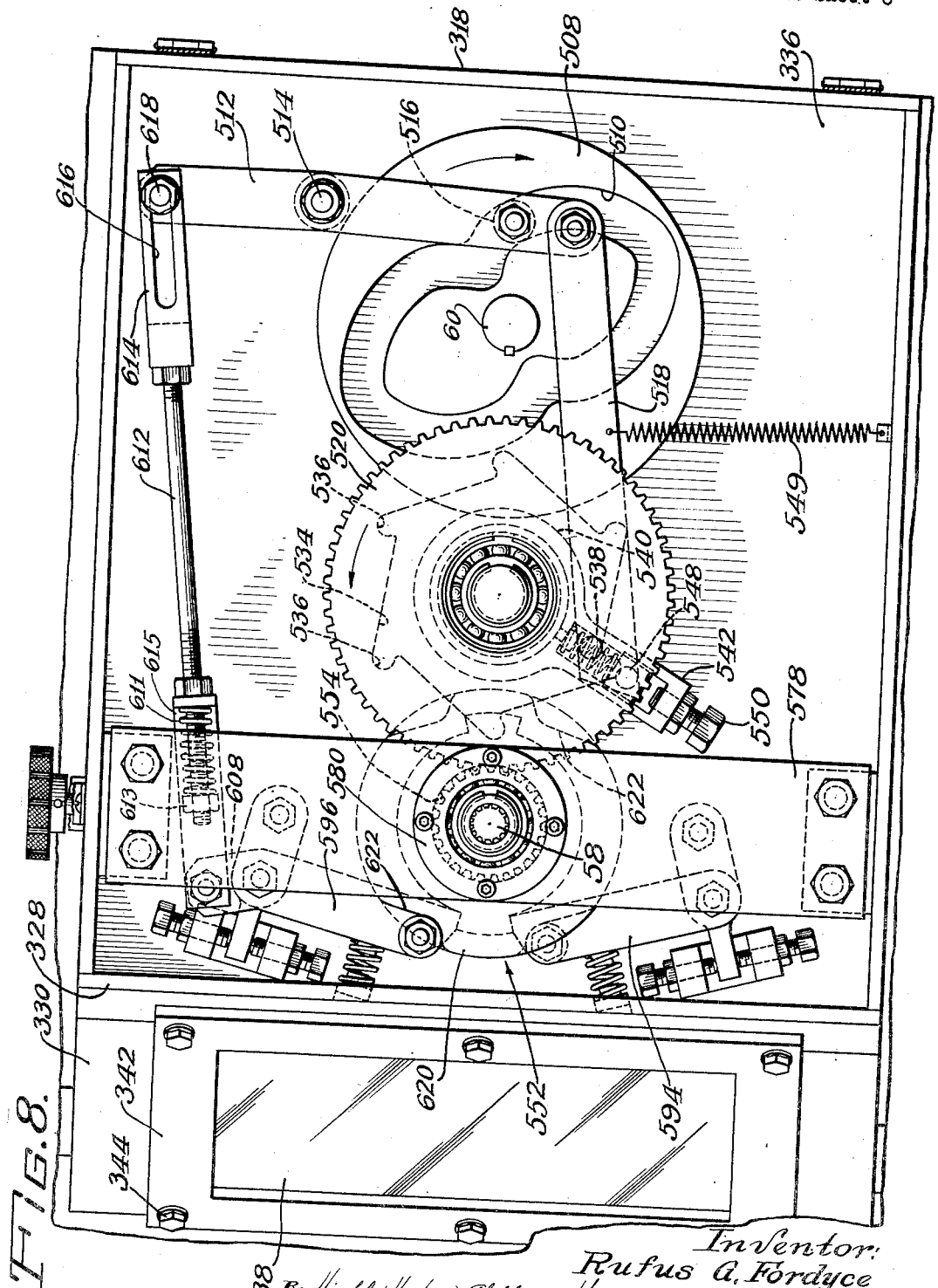

Dec. 15, 1953 R. G. FORDYCE 2,662,470
STENCILING MACHINE
Filed May 12, 1949 18 Sheets-Sheet 7
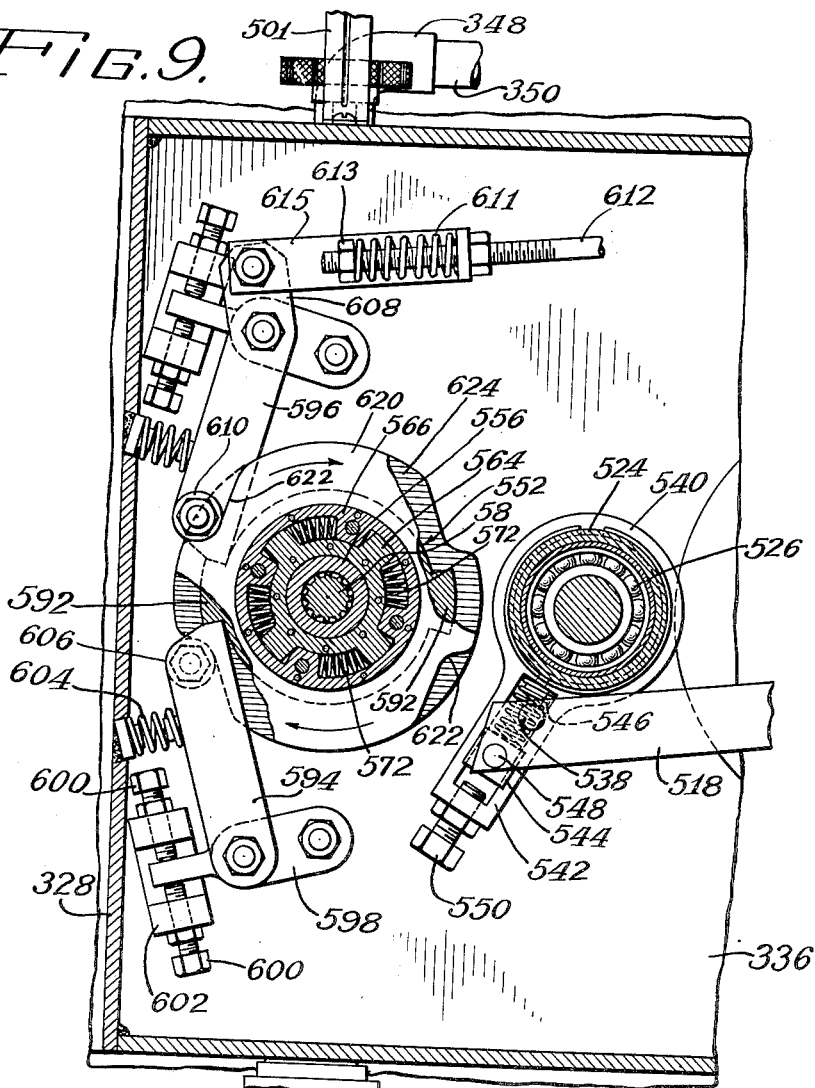
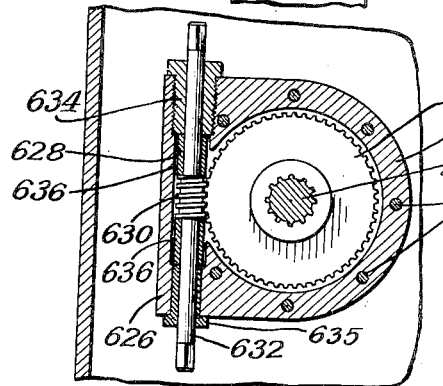
Inventor:
Rufus G. Fordyce
By Hinkle, Horton, Ahlburg, Harrmann & Wuppen
Attys.

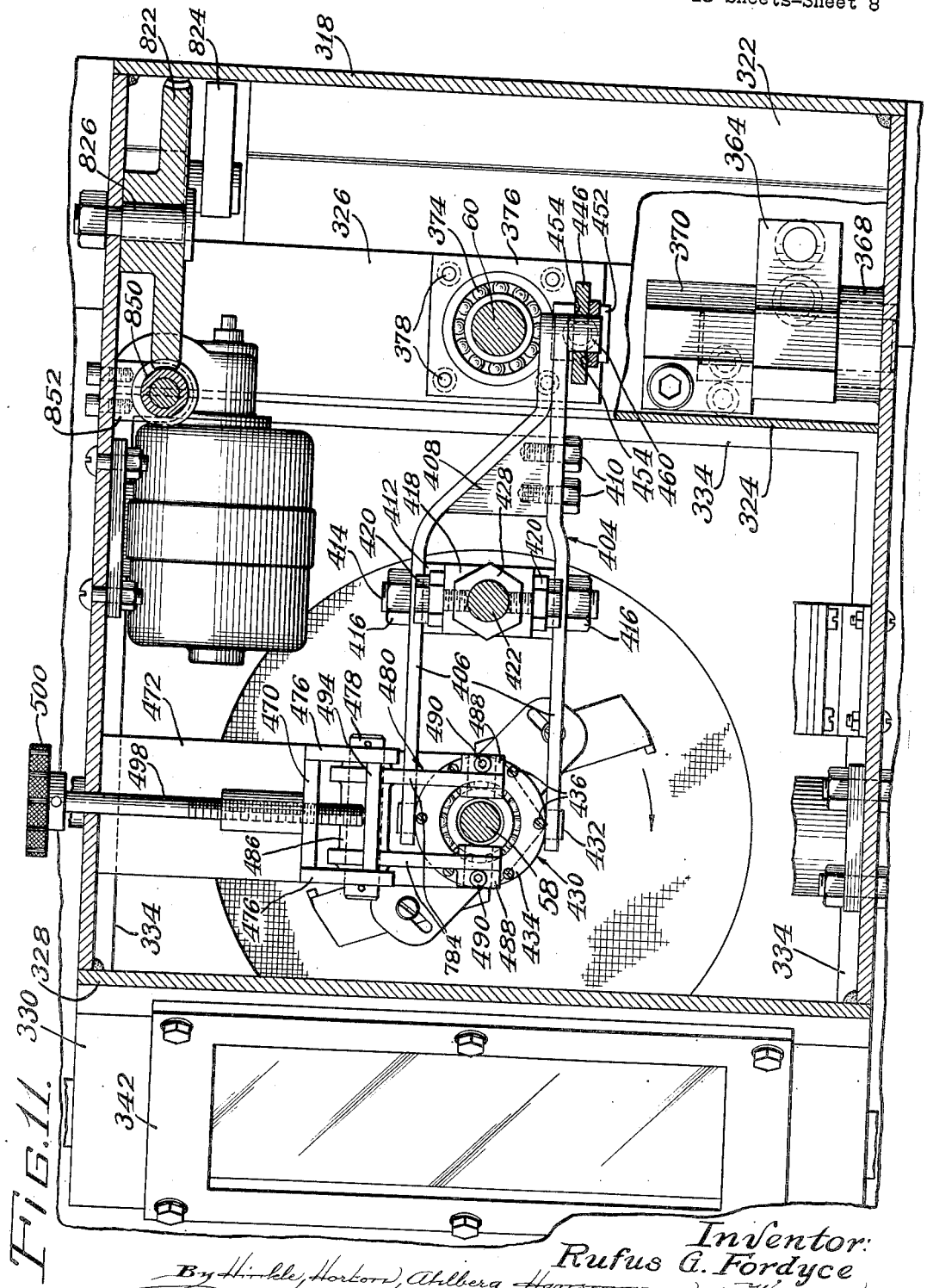

Dec. 15, 1953   R. G. FORDYCE   2,662,470
STENCILING MACHINE
Filed May 12, 1949   18 Sheets-Sheet 9
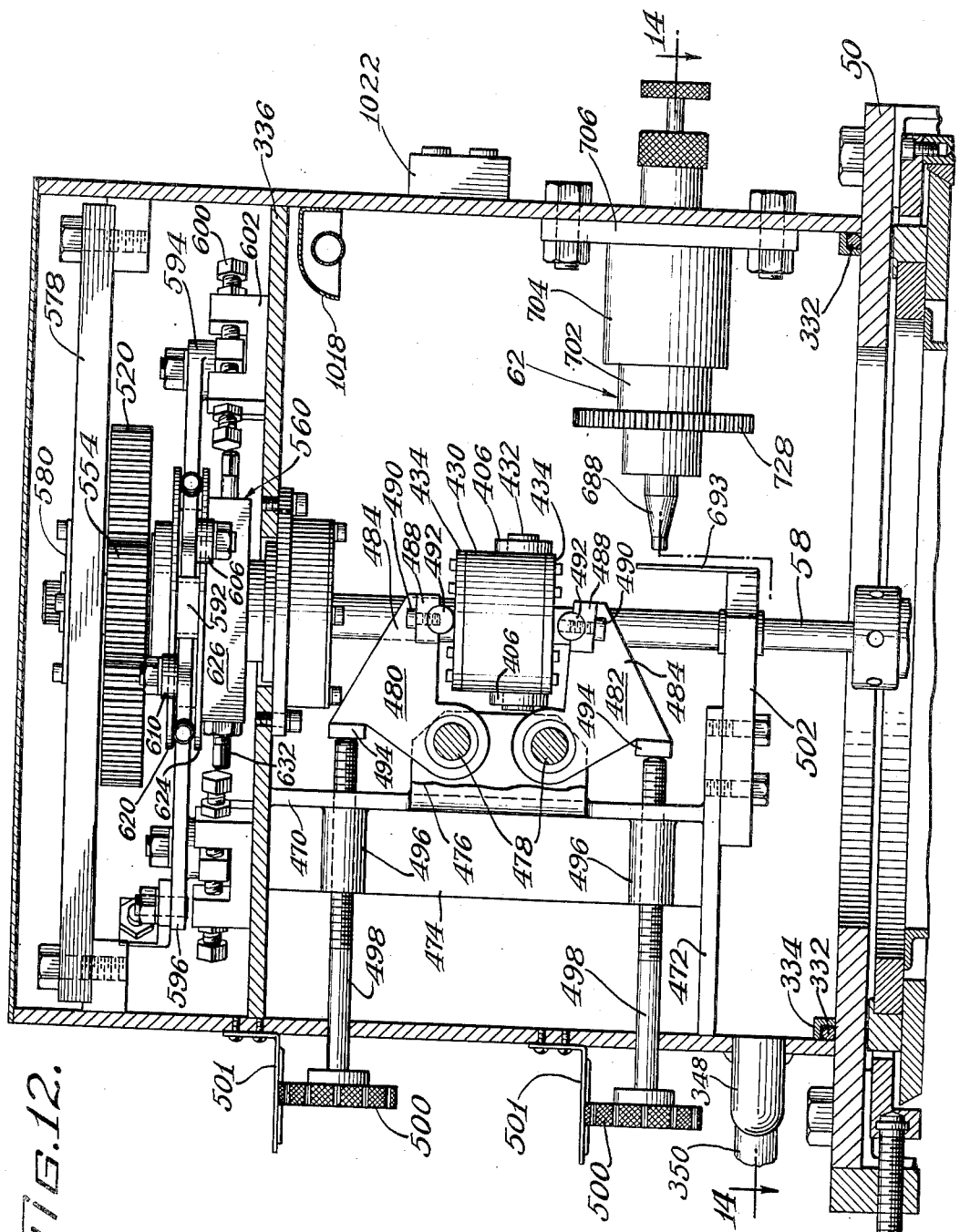
Inventor:
Rufus G. Fordyce
By Hinkle, Horton, Ahlberg, Harrsmann & Wupper
Attys.

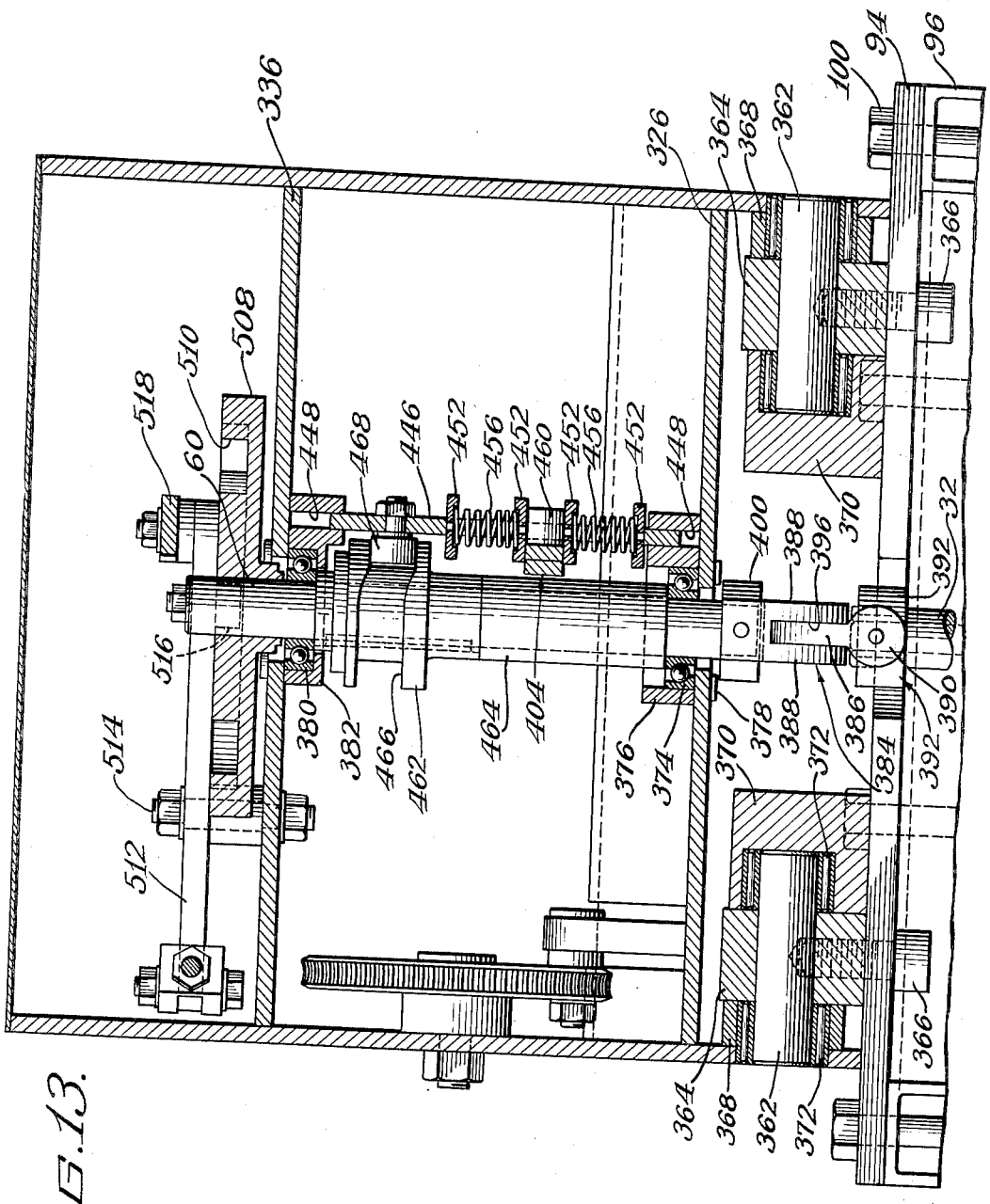

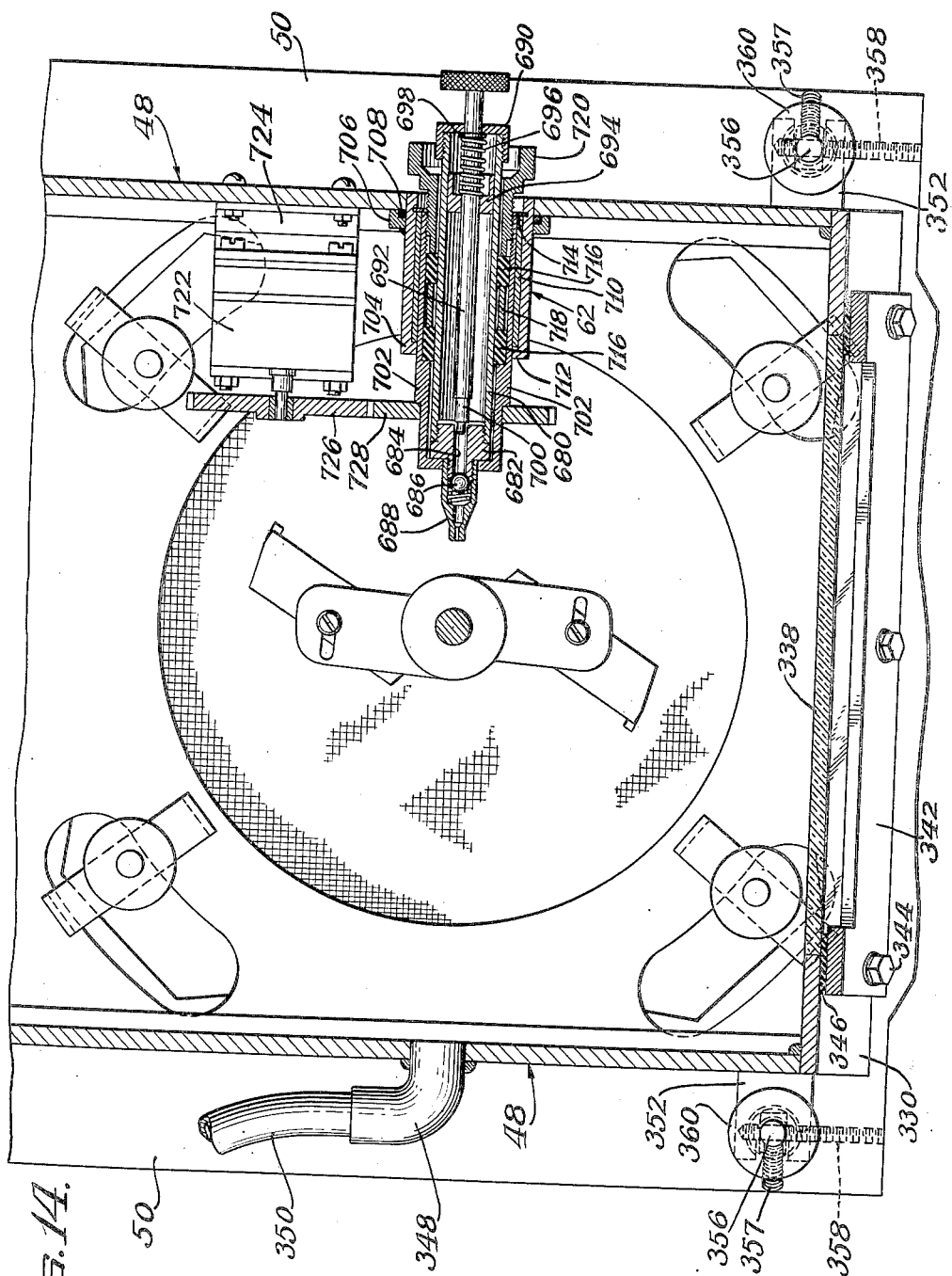

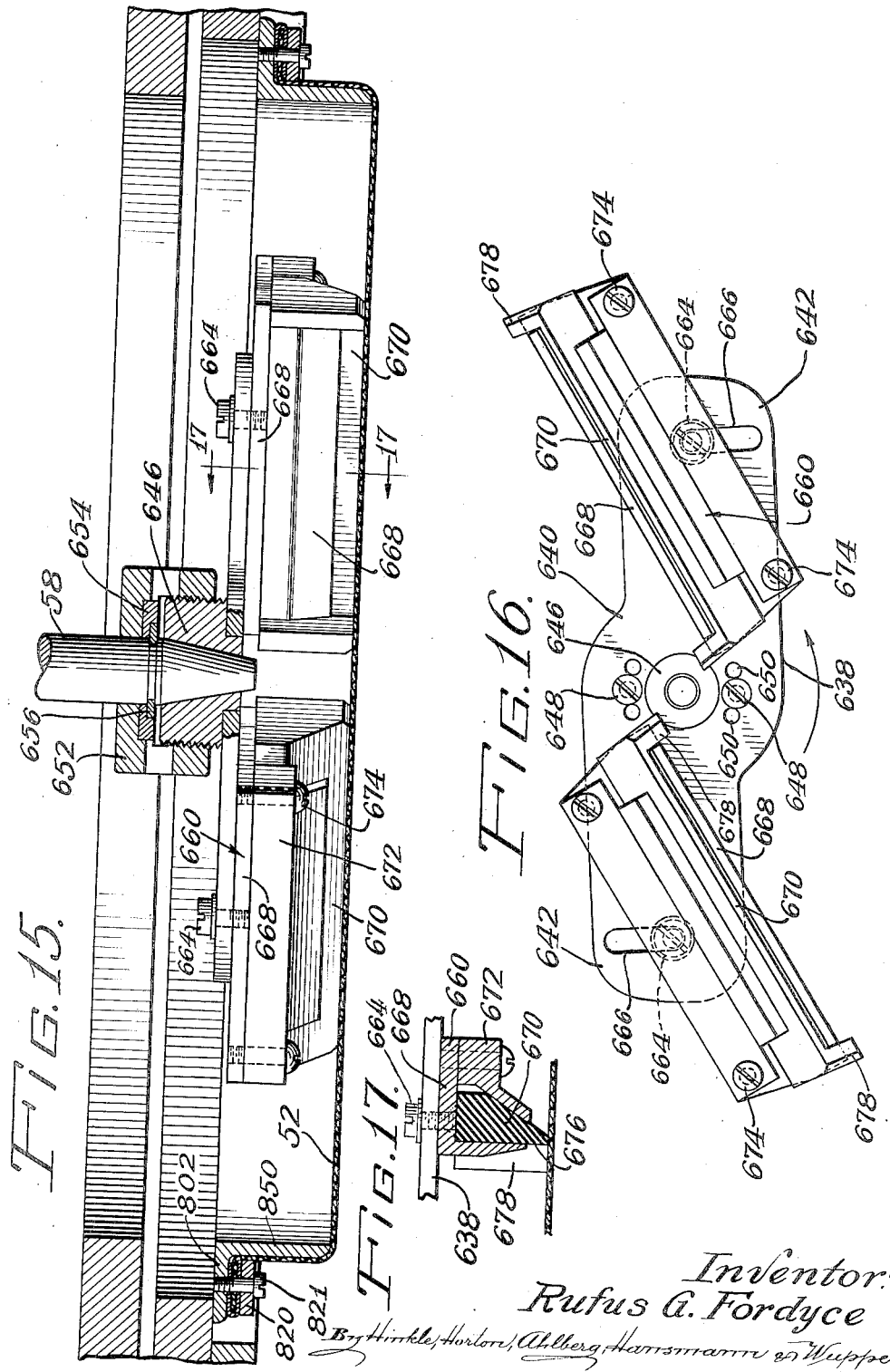

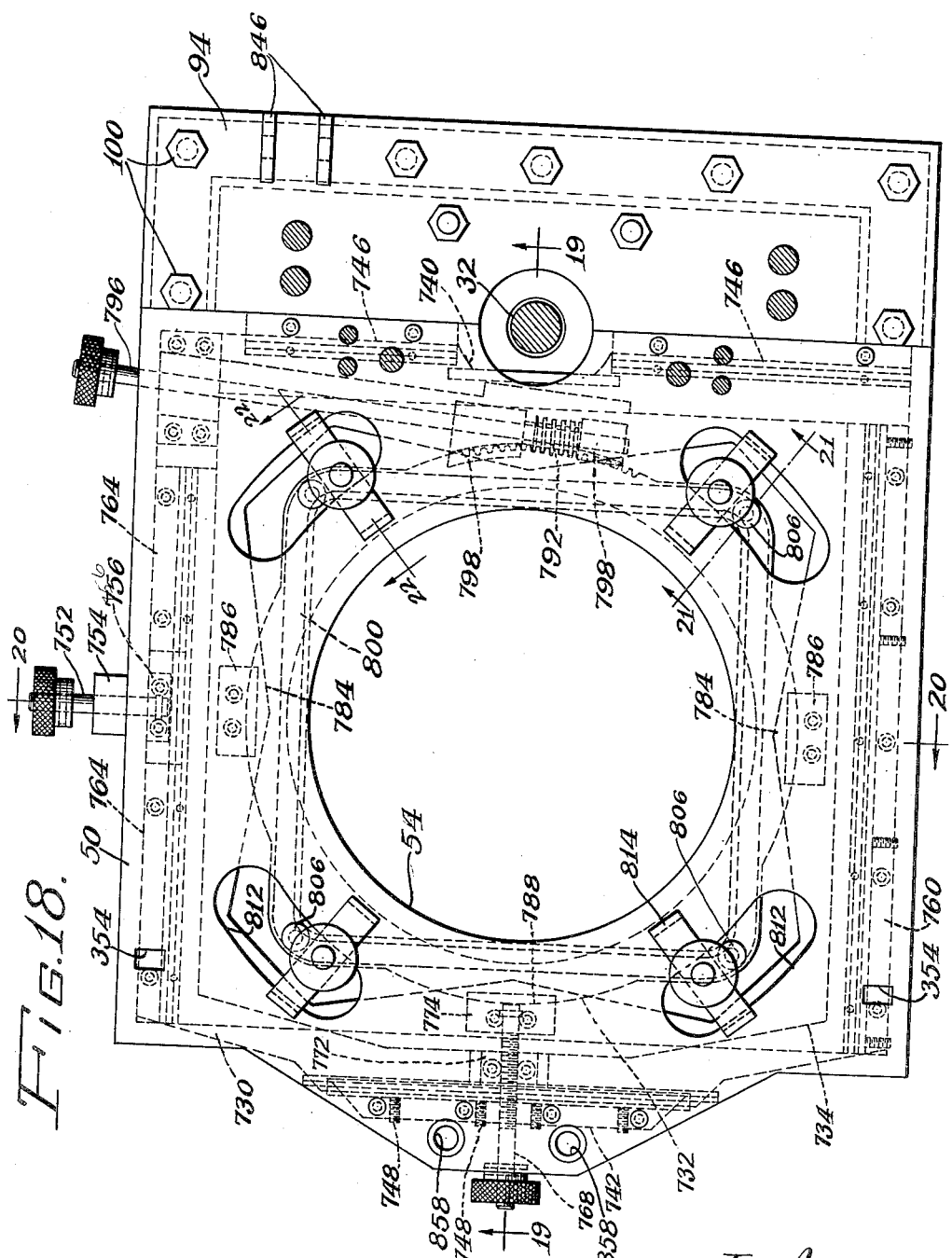

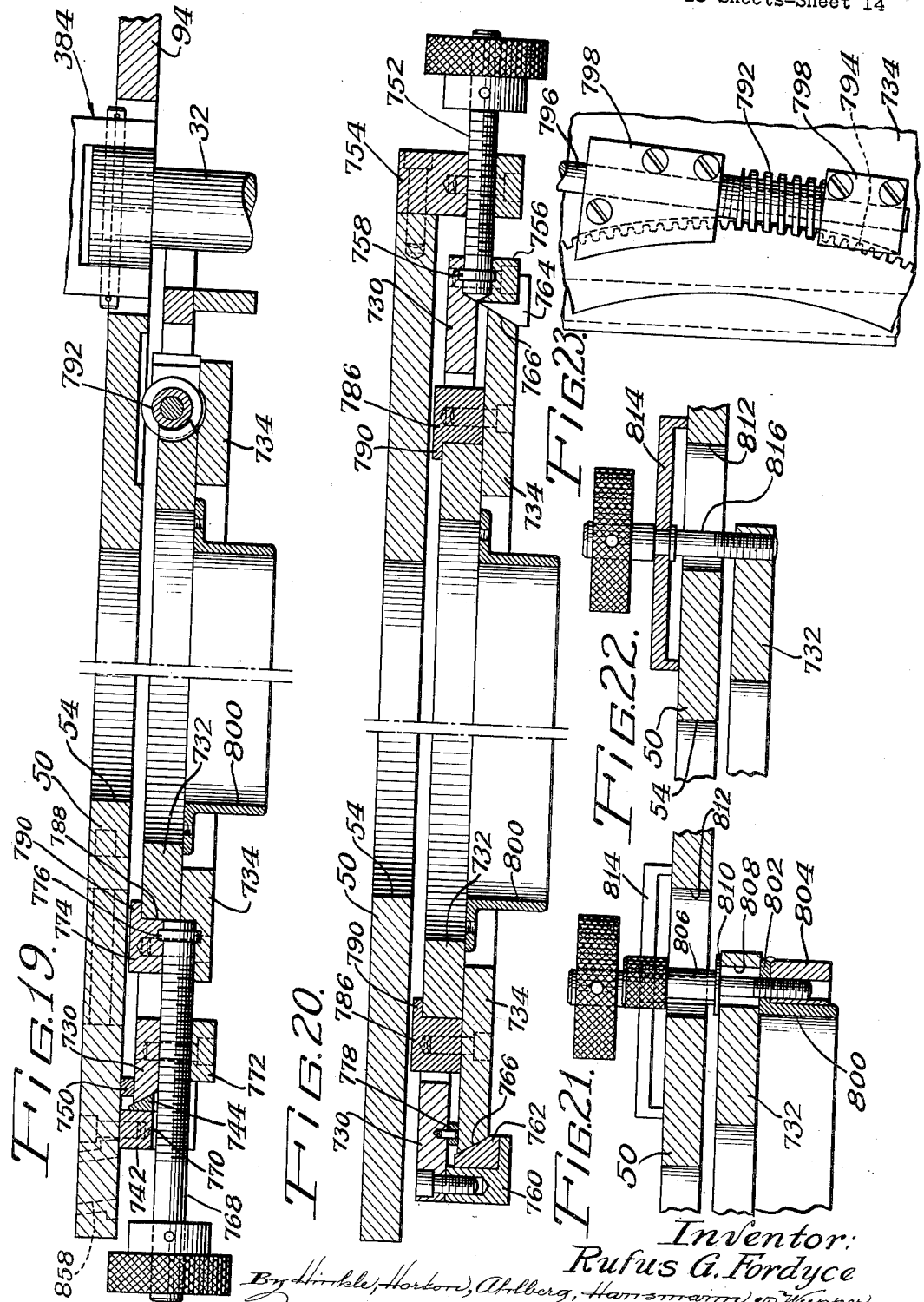

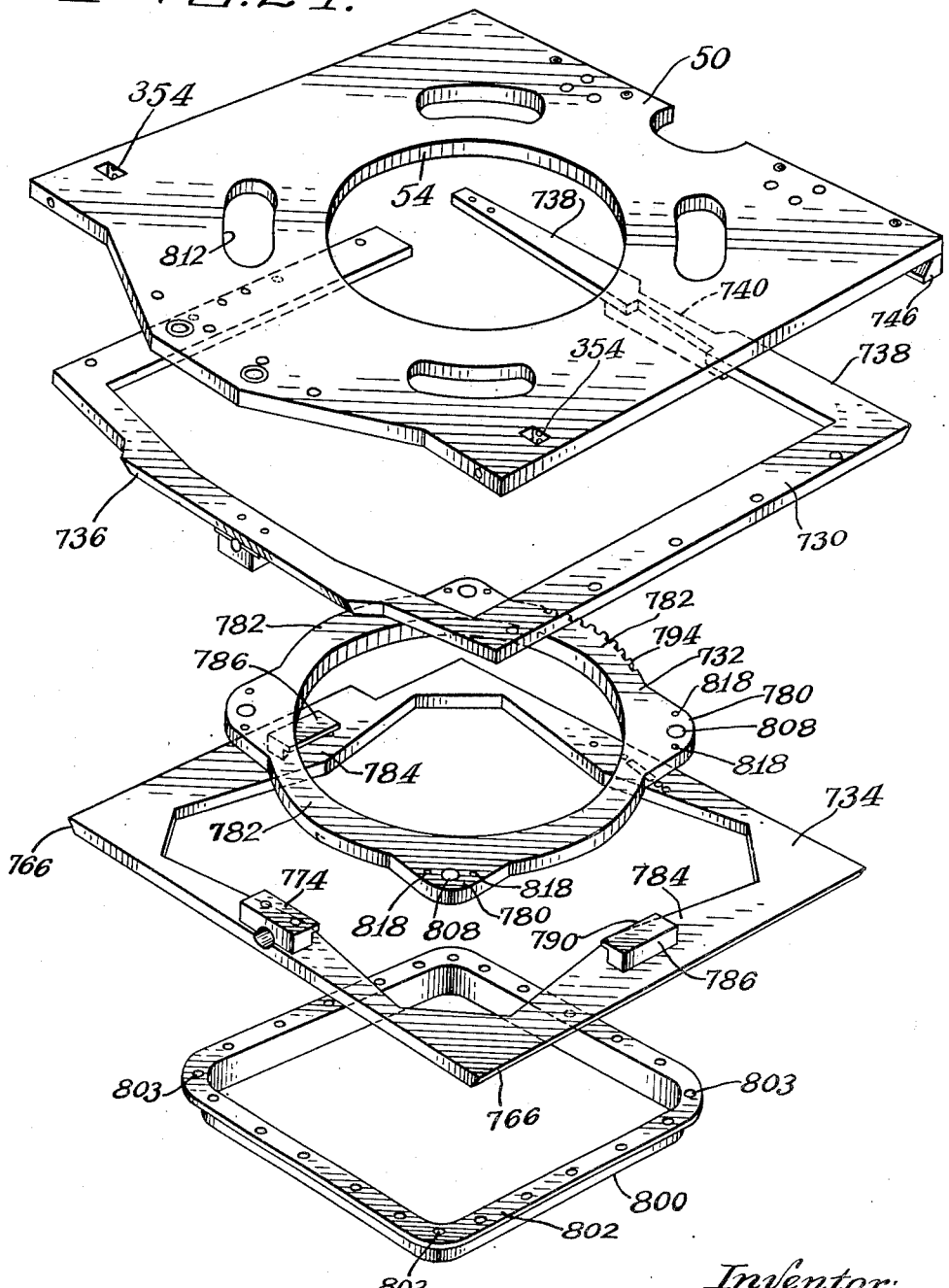

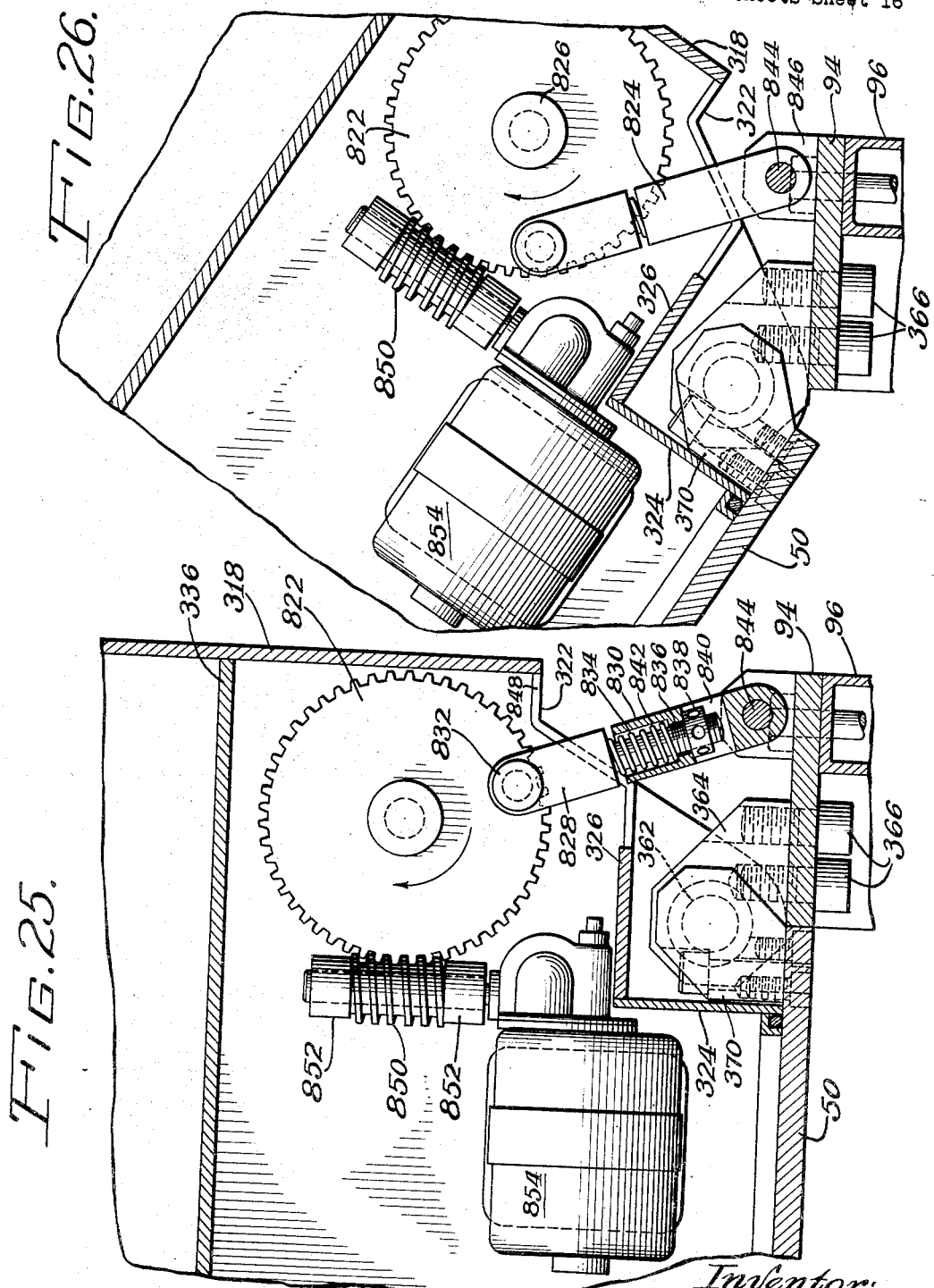

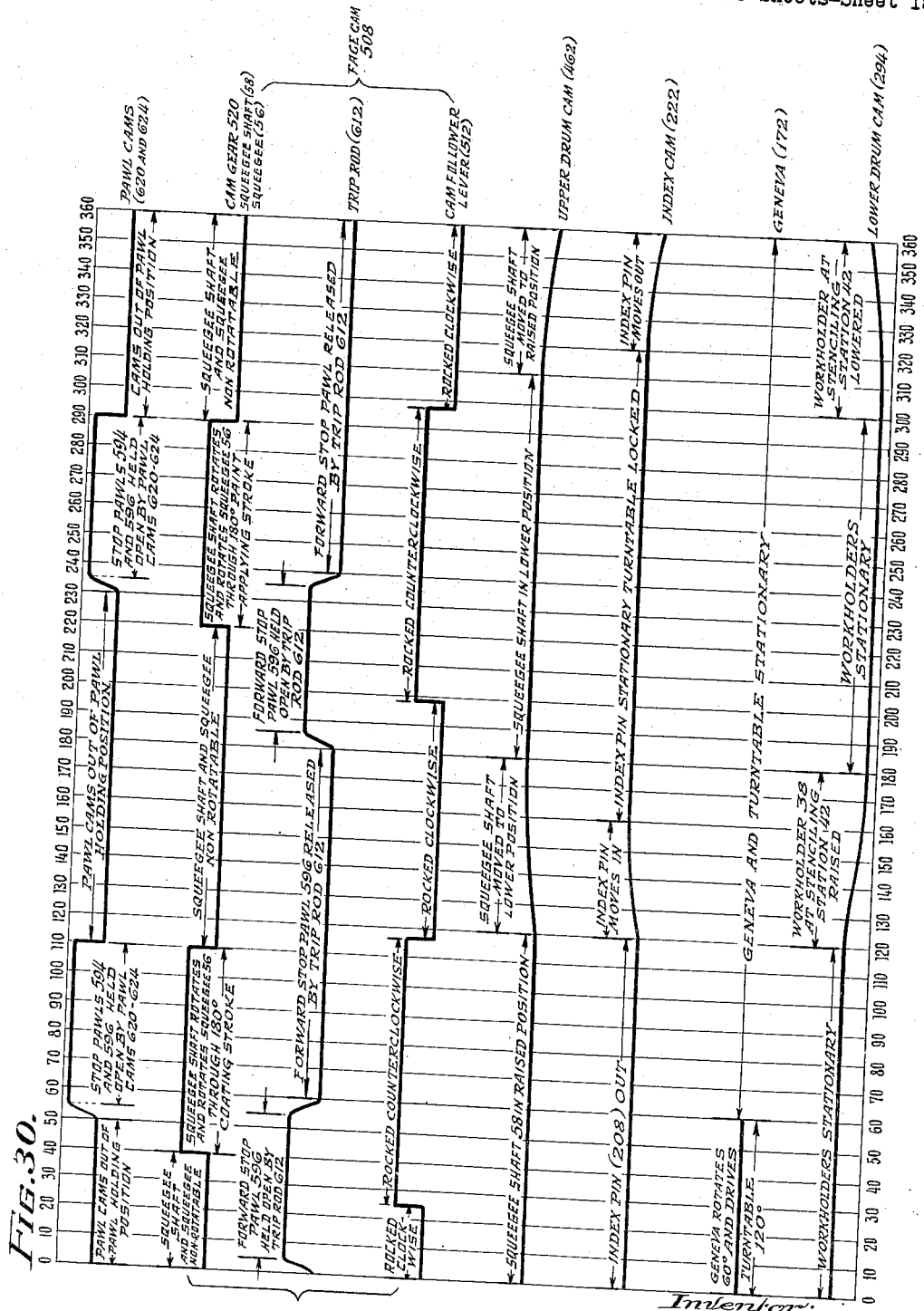

Patented Dec. 15, 1953

2,662,470

UNITED STATES PATENT OFFICE 2,662,470

STENCILING MACHINE

Rufus G. Fordyce, Glencoe, Ill., assignor to Luminous Processes, Inc., Chicago, Ill., a corporation of Delaware Application May 12, 1949, Serial No. 92,851

50 Claims. (Cl. 101—123)

The present invention relates to stenciling apparatus and more particularly to a stenciling machine that is fully automatic in operation.

An object of the invention is to provide a new and improved stenciling machine which except for manual loading and unloading of the work is fully automatic in operation.

Another object of the invention is to provide a new and improved stenciling machine adapted saimultaneously to stencil a plurality of articles or workpieces.

A further object of the invention is to provide a stenciling machine having improved conveyor or carrier means for successively bringing work to be stenciled into stenciling relationship with the screen and removing it therefrom.

An object ancillary to the object last set forth is to provide a new and improved means for holding the work and screen in stationary stenciling contact during the stenciling stroke of the squeegee.

A still further object of the invention is to provide a stenciling machine having a work conveyor in the form of a turntable and novel indexing means for the turntable.

Another object of the invention is to provide a new and improved squeegee for a stenciling machine.

Yet another object of the invention is to provide a stenciling machine having improved means operable to move the squeegee toward and from the screen between predetermined positions and to cause the squeegee to move over the screen at both positions so as first to spread a film of paint on the screen and then to force the paint through the screen onto the work being stenciled.

An object ancillary to the object last stated is to provide means for accurately controlling initiation and termination of both types of movement of the squeegee and for adjusting the position at which the squeegee stops relative to the screen.

A further object of the invention is to provide a stenciling machine having improved means for shifting or adjusting a stencil screen rotatably and linearly in normal directions while maintaining the screen in substantially the same plane.

A still further object of the invention is the provision of a novel paint dispenser for a stenciling machine which is adapted to agitate the paint constantly while the machine is in use.

Still another object of the invention is to provide a new and improved stenciling machine in which the operating mechanism is divided into subunits that are relatively movable to expose the operating mechanism, squeegee and screen for repair and adjustment and cleaning.

An object ancillary to that last set forth is the provision of novel means for moving the subunits of the stenciling machine relatively.

Another object of the invention is to provide a novel stenciling machine in which a stencil screen, a squeegee and a work positioning means are relatively movable between paint spreading and paint applying positions so that paint is spread on the screen when the screen is swept by the squeegee at one position and is applied through the screen when it is swept by the squeegee at the other relative position of the parts.

A further object of the invention is to provide a stenciling machine which has means for trapping fumes that may rise from the screen and paint dispenser so that the machine is particularly adapted for stenciling with luminous paint from which radioactive gases may arise.

A more general object of the invention is to provide a novel stenciling machine capable of greatly increased output as compared to the machines now on the market.

Another general object of the invention is to provide a novel stenciling machine of sturdy construction which is extremely simple to operate once it has been set up, and which is capable of being very minutely adjusted so that even the finest work can be done extremely accurately.

A further object of the invention is to provide a novel stenciling machine particularly adapted for stenciling clock, watch or other dials with luminous paint.

These and other objects, advantages and capabilities of the invention will become apparent from the following description wherein reference is had to the accompanying drawings, in which:

Fig. 3 is a view partly in section and partly in plan in the direction of the arrows on the line 3—3 of Fig. 1 showing the work holding means, turntable and part of the indexing means for the latter;

Fig. 4 is a horizontal sectional view taken on the line 4—4 of Fig. 1 and showing the turntable indexing means in plan;

Fig. 5 is a fragmentary vertical sectional view taken on the line 5—5 of Fig. 1;

Fig. 6 is a horizontal view of the lower portion of the lower subunit taken on the line 6—6 of Fig. 1 showing the drive means for the main drive shaft in plan;

Fig. 7 is a horizontal view partly in section and partly in plan taken on the line 7—7 of Fig. 1 and showing the workholder advancing and retracting means;

Fig. 8 is a fragmentary top plan view of the upper sub-unit of the stenciling machine showing in plan the mechanism for rotating the squeegee shaft step by step;

Fig. 9 is a fragmentary horizontal sectional view of a portion of the squeegee shaft rotating mechanism taken in the line 9—9 on Fig. 2;

Fig. 10 is a fragmentary horizontal sectional view of the means for adjusting the position at which the squeegee comes to rest relative to the screen taken on the line 10—10 of Fig. 2;

Fig. 11 is a horizontal view partly in section taken on the line 11—11 of Fig. 2 and showing in plan the mechanism for supporting the squeegee shaft and moving the same axially along with certain auxiliary mechanism;

Fig. 12 is a vertical transverse view through the front end of the housing taken in the direction of the arrows on the line 12—12 on Fig. 2 and showing the squeegee shaft rotating mechanism and the means for determining the limits of axial movement of the squeegee shaft in plan;

Fig. 13 is a vertical transverse sectional view on the line 13—13 of Fig. 2 showing a portion of the mechanism for rocking the squeegee shaft vertically and the means for securing the two subunits together;

Fig. 14 is a horizontal sectional view taken on the line 14—14 of Fig. 12 showing the novel paint dispensing and agitating means;

Fig. 15 is a fragmentary vertical sectional view on an enlarged scale of the novel squeegee and a portion of the stencil screen supporting means;

Fig. 16 is a bottom plan view of the squeegee;

Fig. 17 is a transverse sectional view of the squeegee taken on the line 17—17 of Fig. 15;

Fig. 18 is a top plan view of the table which forms part of the lower subunit of the stenciling machine;

Fig. 19 is a fragmentary vertical fore and aft sectional view of the stencil screen supporting and adjusting means taken on the line 19—19 of Fig. 18;

Fig. 20 is a fragmentary vertical transverse sectional view of the stencil screen supporting and adjusting means taken on the line 20—20 of Fig. 18;

Fig. 21 is a fragmentary vertical sectional view of a portion of the stencil screen supporting and adjusting means taken on the line 21—21 of Fig. 18;

Fig. 22 is a fragmentary vertical sectional view of another part of the stencil screen supporting and adjusting means taken on the line 22—22 on Fig. 18;

Fig. 23 is a top plan view of a portion of the stencil screen adjusting means;

Fig. 24 is an exploded view of the stencil screen supporting and adjusting means;

Fig. 25 is a fragmentary vertical view through the upper subunit housing showing the novel means for tilting this subunit relative to the lower subunit;

Fig. 26 is a view similar to Fig. 25 showing the upper subunit in one tilted position;

Fig. 27 is a fragmentary view partly in section and partly in end elevation taken in the direction of the arrows on the line 27—27 of Fig. 4 showing a safety device for the machine;

Fig. 28 is a fragmentary rear elevational view of the device shown in Fig. 27;

Fig. 30 is a diagrammatic view illustrating graphically the manner in which operation of the various operating mechanisms is controlled by the angular position of a series of controlling cams driven from a common drive shaft.

Figure 1:
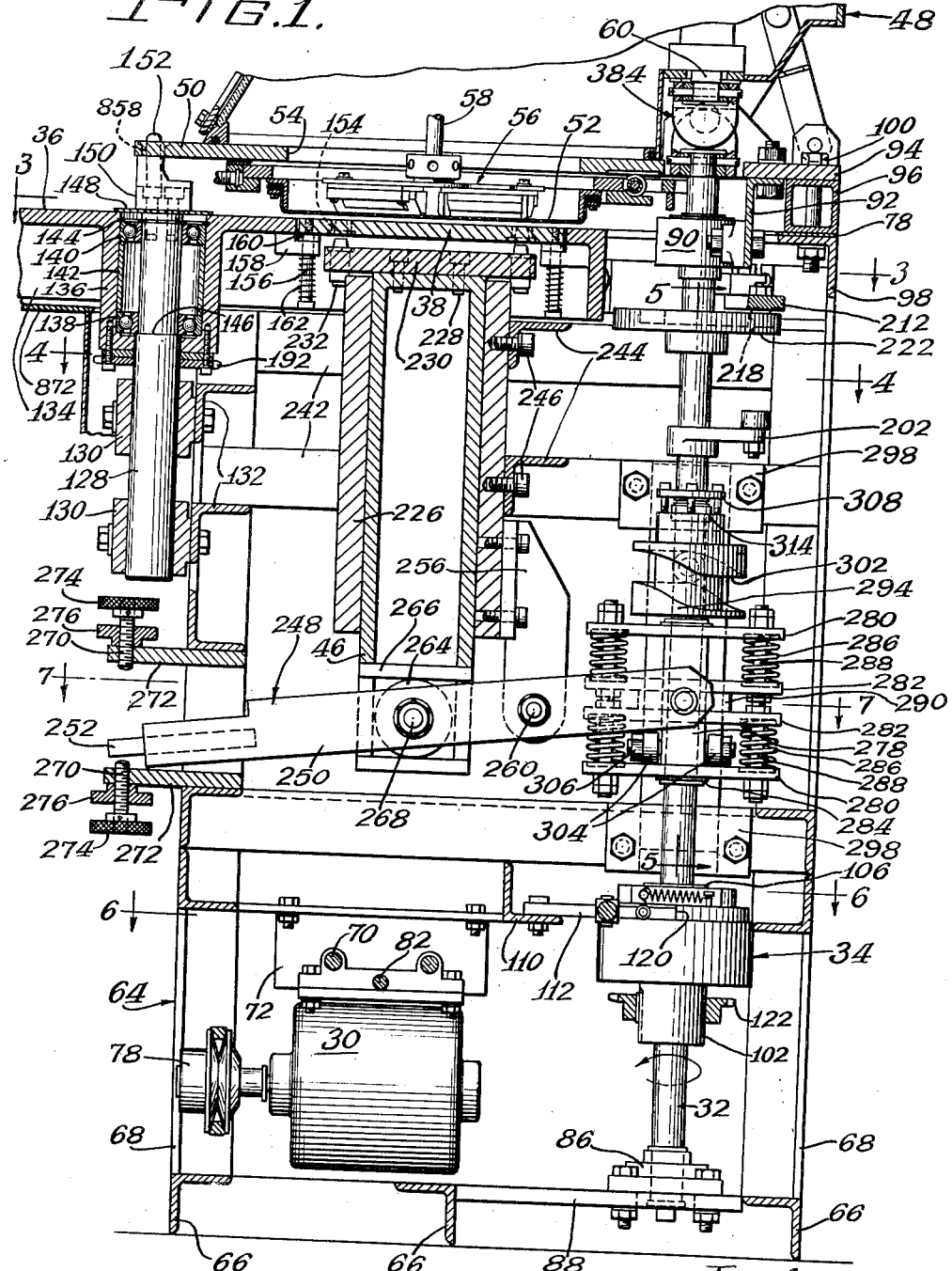
Fig. 1 is a vertical sectional view of the lower subunit of my improved stenciling machine taken on a substantially medial fore and aft plane.

A machine particularly adapted for stenciling luminous indicia on watch, clock or other dials is shown in the drawings and will be described for the purpose of disclosing the underlying principles of the invention. Certain features of the invention are particularly applicable to machines for that purpose because of the peculiar characteristics of the luminous paint used for such purposes as compared with other stenciling compounds. However, it is to be distinctly understood that the underlying principles of the invention are equally applicable to machines for doing other types of stenciling work.

To assist in an understanding of the machine of the present invention a brief general description of its organization and operation will first be set forth. For convenience, the machine may be divided into a work handling subunit and a squeegee operating subunit. The mechanism in these units is driven from a single motor which drives a main drive shaft through a one revolution clutch. The work handling means includes a carrier in the form of a turntable supporting a plurality of work holders. An indexing means is provided for this turntable successively to bring the work holders carried thereby underneath a stencil screen. Means is also provided for moving the work holder which is underneath or opposite the screen axially toward and from the same to bring the work carried thereby into and out of stenciling relationship with the stencil screen at predetermined times in each revolution made by the main drive shaft.

The squeegee operating means includes mechanism for moving the squeegee axially relative to the stencil screen between upper and lower positions. This means is adjustable so that the limits of axial movement may be varied.

Mechanism is also provided for causing the squeegee to make a complete sweep over the screen at each of these axial positions. When the squeegee sweeps the screen at its upper position it spreads a coat of paint thereon, and when it sweeps the screen at its lower or stenciling position it forces the paint through the pervious areas in the screen onto the work to be stenciled. This latter mechanism includes means for adjusting the position at which the squeegee stops in its sweep over the screen.

Other mechanism operating more or less independently of the above mechanism is also provided in the machine of the present invention for improving its operation and will be described in detail hereinafter.

When the machine is at rest the work holders are all in retracted position and thus out of stenciling relationship with the screen. The turntable indexing means is about to become effective to move the turntable forward and the means for moving the work holders axially is in inactive position. At this time the squeegee is at its elevated position relative to the stencil screen and the mechanism for rotating the same is about to become effective. While the turntable is at rest the work holder which will next be brought underneath the stencil screen by movement of the turntable may be loaded with blank work.

During initial movement of the main drive shaft after the one revolution clutch has been energized the turntable indexing means is actuated to move the turntable sufficiently to position the work holder containing blank work underneath the screen and then to lock the turntable against rotation. At the same time the squeegee, which remains in its raised position during this period, is rotated sufficiently to make a complete sweep of the stencil screen and then is arrested. A coat of paint is thus spread on the screen.

Upon continued rotation of the main drive shaft the work holder underneath the screen is moved axially relative to the turntable to bring the work carried thereby into stenciling relationship with the stencil screen. Substantially simultaneously the squeegee is moved axially relative to the screen to lower it into impressing or paint applying relation with the screen.

During the next increment of rotation of the main shaft the squeegee is moved through a complete sweep of the screen to force the paint through the screen onto the work being stenciled and is then locked against movement. In this interval the rest of the machine remains stationary.

In the remaining interval while the main drive shaft is completing one revolution the work holder is retracted to move the work out of stenciling relationship with the stencil screen. Simultaneously, the squeegee is raised relative to the screen to its paint spreading position. At the same time, the turntable indexing means returns to its initial position so that the turntable is ready to be advanced when the clutch is next engaged. The operating mechanisms of the machine are thus returned to the initial position previously described so that the cycle will be repeated when the clutch is next energized.

*General organization and operation*

For convenience in describing the machine of the present invention it may be divided into a lower subunit which is shown in Fig. 1 and an upper subunit (Fig. 2) supported thereby. The lower subunit includes a main driving motor 30. This motor drives a vertically extending main drive shaft 32 through a one-revolution clutch 34. Mechanism driven from the main drive shaft 32 drives or indexes a horizontal turret or carrier in the form of a turntable 36 through 120 degrees each time the main drive shaft is rotated through one revolution. This occurs each time the clutch 34 is engaged. Jigs or workpiece holders 38 carried by the turntable are moved in 120 degree steps upon successive movements of the main drive shaft 32 through one revolution and consequent movements of the turntable 36. For example, a work holder at a position which may be designated the loading position or station and which is indicated at 40 in Fig. 3 will be moved successively to a stenciling position indicated at 42 and from the latter to an unloading station or position indicated at 44 and then back to the loading station. A plunger 46 reciprocated vertically by mechanism driven from the main drive shaft 32 is provided for raising a workholder 38 at the stenciling station to move the work carried thereby into stenciling position.

The upper subunit includes a box-like housing 48. This housing rests on a table 50 forming part of the lower subunit. A stencil screen 52 (Fig. 1) is supported from the underside of the table 50 below a central aperture 54 therein. A squeegee 56 is mounted above the stencil screen upon a squeegee shaft 58. It extends into the central aperture 54 in the table. Mechanism driven from an upper main drive shaft 60 (Fig. 2) is provided in the housing 48 for rotating the squeegee in 180 degree stages or steps in coordinated relation with the movement of the turntable 36 and the plunger 46. Other mechanism also driven from the upper drive shaft 60 is provided for moving the squeegee shaft 58 axially between an upper and lower position. Since the squeegee 56 is attached to the shaft 58 it moves correspondingly. When rotated at its upper position the squeegee is adapted to spread a film of paint on the stencil screen 52. When rotated at its lower position the squeegee forces the paint through the pervious areas in the screen and onto workpieces held below the stencil screen by the workholder at the stenciling station. Also supported within the housing 48 is a paint dispenser 62 (Fig. 14) and certain auxiliary mechanism which will be described in detail subsequently.

The mechanism forming the lower subunit is supported by a main frame 64 of angle iron members. This frame includes base members 66 (Fig. 1) and four vertical legs 68 (Fig. 4). The legs are tied together by horizontally extending frame members suitably located to support the various operating mechanisms in operative relation. These various frame members may be secured together by welding or other suitable means.

*The driving means for the main drive shaft*

The main driving motor 30, which may be of approximately one-third horsepower, is suspended on one side of the main frame from a pair of rods 70 (Figs. 1 and 6) carried by depending angle brackets 72. These brackets are bolted to suitably located frame members in the main frame 64. On the side of the main frame opposite the motor 30 a speed reducer 74 (Fig. 6) is fixedly secured. This reducer is driven from the motor 30 by means of a V-belt 76 passing over a variable pitch diameter pulley 78 on the shaft of the motor and a pulley 80 on the driven shaft of the speed reducer.

The tension in the belt 76 when the pitch diameter of the drive pulley 78 is changed can be adjusted by adjusting the position of the motor longitudinally of the supporting rods 70. Such adjustment is made by turning a rod 82 which has threaded engagement with apertures extending through any convenient fixed part on the housing for the motor 30. Adjacent its outer end this threaded rod 82 is fixed against longitudinal movement by suitable means carried by the outer fixed depending bracket 72. As a result, when it is turned it will advance or retract motor 30 depending on the direction in which it is turned. A hand wheel 84 on the outer end of the threaded rod 82 facilitates turning of the same.

The main drive shaft 32 is rotatably supported at its lower end in a suitable bearing 86 (Fig. 1) bolted to a frame member 88 in the base of the main frame 64. Adjacent its upper end the shaft 32 rotates in a suitable bearing in a pillow block 90 carried by a depending bearing bracket 92. Conventional means such as shims may be interposed between the pillow block 90 and bracket 92 for accurately adjusting the position of the drive shaft. Bearing bracket 92 is bolted to a main top cross piece 94 at the rear of the main frame 64 to which the table 50 is also secured. This cross piece is spaced above the top of the main frame 64 by means indicated at 96 including a tubular spacer of rectangular transverse cross section and a second flat spacer. These spacers and the cross piece 94 are fixed to a transverse angle iron 98 on the top rear side of the main frame 64 by a plurality of bolts 100 (Figs. 1 and 18). Space is thus provided between the top of the turntable 36 and the underside of the table 50. The stencil screen 52 is disposed in this space above the turntable.

The one-revolution clutch 34 previously mentioned may be of conventional construction. One form of clutch of this type which has been found to be satisfactory is more or less diagrammatically shown in Figs. 1 and 6. Briefly, this clutch has a driving element 102 freely rotatable on the main drive shaft 32. The driving element comprises a bushed sleeve to which a shell-like housing is attached. The driven element, indicated at 104 in Figs. 1 and 6, is keyed to the main drive shaft 32 and comprises a hub 106 which carries tripping mechanism including a trip cam 108. Pivotally secured at one end to a cross member 110 in the main frame 64 is a trip lever 112 which is urged by a spring 114 in a direction to engage the face of trip cam 108. It is moved in opposition to the spring 114 by a solenoid 116 connected to the trip lever by a plunger 118. Energization of the solenoid causes the trip lever 112 to be moved from engagement with a step 120 on the trip cam. When this occurs, mechanism in the clutch automatically engages the driving and driven elements thereof and thus causes the main drive shaft to be rotated.

The number of revolutions made by the driven element 104 of the clutch can, of course, be adjusted, however the present machine is so designed that one complete stenciling operation will be performed for each revolution of the main drive shaft 32. For this reason, a switch to be described is provided in the circuit of the solenoid 116 for de-energizing the same almost immediately after the main shaft 32 starts rotating. When the solenoid is de-energized, spring 114 causes the trip lever 112 to ride on the face of trip cam 108 so that the lever contacts the end of step 120 at the end or approximately the end of one revolution of the driven element 104 and the main drive shaft 32. When this occurs the clutch is automatically released and remains released until solenoid 116 is again energized.

Since the driving element 102 of the clutch rotates freely on the main drive shaft 32 it may be permanently connected to the speed reducer 74. This driving connection is established through a pinion 122 (Fig. 1) keyed to the driving element 102 and a pinion 124 fixed on the driven shaft of the speed reducer (Fig. 6). A sprocket chain 126 between these two pinions drives the driving element of the clutch continuously while the motor 30 is operating.

The turntable

The turntable 36 is rotatably supported upon a vertical shaft 128 (Figs. 1, 3 and 4) fixedly secured to the front of the main frame 64 medially thereof. Spaced anchor blocks 130 are provided for fixedly securing the lower end of the turntable shaft. These blocks may be secured to suitably located transverse frame members 132 on the front side of the main frame.

Preferably the turntable is cast from an aluminum alloy. It is circular in shape (Fig. 3) and has a depending peripheral skirt 134 (Fig. 1) and a depending hollow generally cup-shaped hub 136. Antifriction bearings including a lower bearing 138 and an upper bearing 140 are fixed in the hub 136. The lower bearing is held against the end of the hub 136 by a cylindrical spacer 142 between the outer race of this lower bearing and the outer race of the upper bearing 140. The latter bearing is fixedly secured against the upper end of the spacer by a snap ring 144. When the turntable is mounted on its shaft 128 the inner race of the lower bearing 138 abuts against a shoulder 146 on the turntable shaft. Since this bearing is fixed in the hub the turntable is thus supported on its shaft 128.

To prevent the entrance of foreign material into the hub 136 a cover plate 148 is provided for closing its upper end. This plate rests on the top side of the turntable and the upper end of the turntable shaft 128. A positioning block 150 resting on the cover plate 148 is secured to the upper end of the turntable shaft and the cover plate is secured in position by cap screws passing through the positioning block and the cover plate and threaded into the end of the shaft as shown in Fig. 3. This block 150 forms a base upon which the front end of the table 50 and the upper housing 48 are supported when they are in operative position. It also forms a base for a pair of positioning dowels 152 which project upwardly therefrom at a slight angle to the vertical for a purpose to be described.

The workholders

Three jigs or workholders 38 are provided in the turntable 36. Referring to Fig. 3 it will be noted that these workholders are substantially square in shape and are disposed in three equidistantly spaced openings in the top of the turntable. Each workholder comprises a steel plate having four positioning apertures provided with frustoconical shaped bushings 154. The workholders are each secured to the turntable by means of four shouldered screws 156 (Fig. 1) threaded into their underside. These screws pass freely through apertures in oppositely disposed brackets 158 cast integrally with the underside of the turntable and through spacers 160 between the top side of the brackets 158 and the underside of the workholders 38.

Due to the fact that the screws 156 are of relatively extended length and pass freely through the apertures in the brackets 158 the workholders are capable of being raised relative to the turntable. However, they are urged to their lowermost position by which they are flush with the top side of the turntable by coil springs 162 on the screws 156 between the heads thereof and the underside of the brackets 158.

In view of the fact that three workholders are provided on the turntable (Fig. 3) the latter normally is moved or indexed counterclockwise in 120 degree steps or stages. This brings the workholders successively to the three stations. Therefore, for the sake of convenience, the completed work preferably is removed at the station marked 44 while blank work is loaded on the empty workholders at the station marked 40. Stenciling is of course done at the third position or station which is marked 42 as previously explained. However, it is to be understood that unloading of finished work and loading of blank workpieces could both be done at either of the stations marked 44 and 40 in Fig. 3.

Since a dial stenciling machine is being described by way of disclosing the invention, clock or watch dials 164 are shown on the workholders 38 in Fig. 3. These dials may be held in place on the workholder by conventional means. As shown, such means includes two pins 166 fixed in and projecting upwardly from the top side of the workholders. One of these pins is adapted to extend through the center shaft opening in the dials and the other through the shaft opening for the secondhand. Conventionally circular recesses or slots 168 are provided in the face of the workholder in which the rims of the dials are adapted to engage. A recess 170 allows one edge of the dials to be lifted with a finger or suitable tool so that the dials are readily removable. Other holding means may be used.

While four dials are shown on the workholder in Fig. 3, it will be understood that the number carried by a workholder will depend both on the size of the dials being stenciled and upon the size of the machine. Fig. 3 shows the parts in the initial position, i. e., the position they assume upon completion of a stenciling operation. As there indicated, the dials on the workholder at the stenciling station 42 are stenciled. The workholder at the unloading station 44 has been almost completely unloaded of stenciled dials while that at the loading station 40 is loaded with blank dials.

Turntable indexing means

The novel turntable indexing mechanism includes a Geneva wheel 172 (Figs. 4 and 5) having six driving slots. A drive sprocket 174 is fixed to the top side of the Geneva wheel 172 by means of cap screws 176. The Geneva wheel 172 and drive sprocket 174 are held in spaced relation by spacers 178 through which the cap screws 176 pass. Relative angular adjustment between the Geneva and sprocket 174 is provided for by arcuate slots 180 in the sprocket for receiving the cap screws 176.

This assembly is fixed upon an auxiliary shaft 182 rotatable in suitable bearings carried in upper and lower pillow blocks 184 (Fig. 5). The pillow blocks 184 are bolted to suitably located frame members 188 on one side of the main frame 64 adjacent its rear end. To provide for accurate adjustment of the pillow blocks 184 shims may be interposed between the blocks and the frame members 188.

The turntable 36 is driven from the drive sprocket 174 by a sprocket chain 190 (Fig. 4) engaged upon this sprocket and a sprocket 192 fixed to the lower end of the hub 136 on the turntable (Figs. 1 and 4). Idler sprockets 194 are provided on opposite sides of the main frame for guiding the chain around the other mechanism in the base of the machine and for making minute rotational adjustments between the turntable 36 and Geneva 172. Each idler sprocket 194 is carried upon an idler shaft rotatably supported in suitable bearings carried in mounting blocks 196. At one end these blocks 196 pivot upon shafts 198 fixedly secured to the main frame 64. Eyebolts 199 suitably secured to the other ends of the mounting blocks 196 pass through apertures in fixed side frame members in the main frame 64. Adjusting and lock nuts indicated at 200 on the outer ends of the eyebolts 199 control movement of the mounting blocks 196. By tightening or loosening these nuts the idlers may be adjusted inwardly or outwardly relative to the main frame so that the chain 190 may be kept taut by moving one idler outwardly an amount corresponding substantially to the amount the other is moved inwardly. When this is done the position of the Geneva 172 relative to the turntable 36 will be moved angularly an amount dependent on the adjustment of the idlers. Minute angular adjustments may thus be made to cause the turntable to stop at a desired position.

During each revolution of the main drive shaft 32 the Geneva wheel 172 is advanced 60 degrees by a drive lug 202 keyed to the main drive shaft. Since the drive sprocket 174 is advanced the same amount it will be apparent that this sprocket and the sprocket 192 on the turntable must have a two to one ratio to effect movement of the turntable through 120 degrees for each revolution of the main drive shaft 32.

Preliminary adjustment of the position at which the turntable stops is effected by loosening the cap screws 176 and adjusting the drive pinion 174 relative to the Geneva wheel 172. Safety mechanism to be described is also provided releasably to hold the Geneva in the proper position accurately to present a drive slot to the drive lug 202.

The novel turntable indexing means also includes means to insure that the turntable is held at the exact location at which the workholder at the stenciling position will be picked up by the plunger 46 and brought accurately into stenciling relationship with the stencil screen 52 when the plunger is raised. On its inner periphery the skirt 134 of the turntable is provided with three equidistantly spaced internal bosses 204 (Fig. 3). These bosses have accurately located bushed radial apertures 206. At the rear of the main frame 64 is an indexing pin 208 having a pointed forward end. This pin is slidable in an endwise direction in spaced tubular guide members 210. Both of these guide members are welded or otherwise suitably secured to a base plate 211 which is bolted to suitably located frame members in the main frame 64. The indexing pin 208 and bushed apertures 206 in the turntable are so located that one aperture is brought into substantial axial alignment with the pin each time the turntable stops after advancing 120 degrees.

The indexing pin 208 is advanced into the aperture 206 aligned therewith after the turntable stops rotating and is retracted before the next movement of the turntable by an actuating bar 212. At one of its ends this bar is secured to the indexing pin 208 by means of a pivot bolt 214 and at its opposite end it is pivoted at 216 to a fixed part of the main frame. Intermediate its ends the actuating bar is provided with a depending cam follower 218 (Figs. 3 and 5). This follower engages in a cam groove 220 in the upper face of a cam 222 fixed upon the main drive shaft 32. Referring to Fig. 3 it will be seen that this groove 220 is conformed to advance and retract the index pin 208 once during each revolution of the main drive shaft 32. Furthermore it will be held in advanced and retracted positions for an interval. The exact point in the cycle of operation of the machine at which the index pin is advanced and retracted will be described in greater detail when the operation of the machine is described.

Axially movable work holder moving means

Another feature of the invention is the novel means which has been provided for moving a work holder at the stenciling station 42 axially of the turntable to bring the work into and out of stenciling relationship with the stencil screen 52. Referring to Figs. 1 and 4 it will be seen that the plunger 46 is located below the turntable at the stenciling station. This plunger is reciprocably supported in an elongated guide 226. Since both the guide 226 and the plunger 46 are non-circular in cross section, movement of the plunger about its longitudinal axis is prevented. Affixed to the upper end of the plunger by means of cap screws 228 is a square plate 230. Frusto-conical positioning dowels 232 are fixed in the plate adjacent its corners. When the plunger is raised these dowels engage in the frusto-conical bushings 154 in that work holder which at the time is at stenciling position so that the latter is accurately positioned relative to the plunger.

The plunger guide 226 consists of complementary half sections 234 joined together on a diagonal (Fig. 4). Opposed apertured bosses 236 are provided on the confronting edges of these sections and the sections are secured together by bolts or screws 238 passing through these apertures and suitably locked. Shims indicated at 240 may be interposed between the confronting faces of the bosses 236 to allow for adjustment of the guide so that the plunger 46 is firmly but slidably held thereby. However, instead of shims it may be preferable from the standpoint of ease of adjustment to have set screws alternating with the bolts or screws 238 and passing through one of the sections 234 and engaging against the confronting face of the other half-section. By tightening or loosening these set screws the position to which the half-sections 234 can be drawn toward each other by the screws 238 may be varied.

The guide 226 is supported adjacent its upper end and intermediate its ends by frame members 242 (Fig. 1) extending from front to back of the main frame 64 and transverse frame members 244 normal to the frame members 242. A plurality of cap screws 246 which extend through apertures in these frame members are threaded into tapped apertures in the guide and securely fix the same in position.

Lubrication of the plunger 46 may be effected through a continuous oil groove (not shown), formed in the walls thereof and extending from top to bottom of the plunger.

The plunger 46 is reciprocated by a rocker 248 (Figs. 1 and 7). This rocker has two generally parallel arms 250 converging at their rear ends and secured together at their forward ends by a plate 252 welded to the inner sides of the arms 250. To the rear of its center the rocker 248 is pivoted to a journal block 254 (Fig. 7) carried by a depending bracket 256 (Fig. 1). Preferably the journal block 254 has an Oilite bushing 258 and the rocker is pivotally secured thereto upon a shouldered pin or shaft 260 held in position by jam nuts 262. The bracket 256 is secured to the plunger guide 226 by means of cap screws extending through the base of the bracket and threaded into the rear wall of the guide.

Pivotal connection between the rocker 248 and the lower end of the plunger 46 is effected through a roller 264 (Fig. 1) housed in a slightly elongated hollow guide block 266 fixed to the lower end of the plunger. This roller is rotatably supported upon a pin 268 (Fig. 7) fixedly secured between the arms 250 of the rocker at a point forward of the pivot axis of the rocker. It will be observed in Fig. 1 that the internal dimensions of the guide block 266 are such that the roller 264 is locked against vertical movement in the guide block. However, it is free to move horizontally to a limited extent. This construction prevents binding between the plunger 46 and the pivot axis of the rocker 248 when the latter reciprocates the plunger while at the same time preventing vertical play between the plunger and the rocker.

In order positively to limit the stroke of the rocker 248 opposite vertical adjusting screws 270 (Fig. 1) are provided at the front of the machine above and below the plate 252 which extends between the arms of the rocker. These screws are threaded into vertically aligned apertures in a pair of forwardly projecting spaced plates 272 fixed to the main frame 64. A handwheel 274 may be provided on the outer end of each screw and a lock nut 276 is provided for fixedly securing the screws at a position of adjustment.

The rocker 248 is rocked once for each revolution of the main shaft by the novel mechanism shown in Figs. 1, 5, and 7. Loosely mounted upon the main drive shaft 32 is a sleeve 278 (Figs. 1 and 5), and loosely mounted upon this sleeve are two pairs of spring pads including outer pads 280 and inner pads 282 (Fig. 1). The outer pads 280 engage snap rings 284 on the sleeve. A pair of compression springs 286 is lodged between each pair of spring pads. These springs urge the outer pads against the snap rings and the inner pads toward each other. A positive limit to the distance the inner pads can separate from the outer pads is provided by bolts 288 extending between the inner and outer pads at opposite ends thereof. The springs are held in position by these bolts and by cylindrical recesses in the confronting faces of the inner and outer pads in which the ends of the springs engage.

Lodged between the two inner pads 282 and fitting loosely on the sleeve 278 is a collar 290 (Fig. 7). This collar has trunnions 292 projecting from diametrically opposite sides thereof. These trunnions are journaled in bushed apertures in the converging rear ends of the arms 250 forming the rocker 248 so that the collar and rear end of the rocker are thus pivotally joined together.

Vertical reciprocatory movement of the collar 290 therefore will cause the rocker 248 to be rocked on its shaft 260 and to reciprocate the plunger 46. The collar 290 is reciprocated vertically through the springs 286. A yieldable or lost motion connection between the sleeve 278 and the rocker 248 is thus provided. As a result, if the stroke of the rocker is positively limited by the adjusting screws 270 to less than the extent of the vertical reciprocatory movement of the sleeve 278 one or the other of the pairs of springs 286 will yield, depending upon the direction of motion of the sleeve.

The sleeve 278 is reciprocated vertically by means driven from the main drive shaft 32 (Fig. 5) keyed to the main drive shaft above the sleeve 278. To one side of the main drive shaft a cam follower bar 296 (Fig. 5) is supported for vertical reciprocatory movement in upper and lower guide blocks 298. The guide blocks are bolted to suitably located members in the main frame 64. A cam follower 300 adapted to engage in a circumferential cam slot 302 in the drum cam 294 is secured to the cam follower bar 296. The contour of the cam slot is designed to cause the cam follower bar to be reciprocated through one complete stroke during each revolution of the main drive shaft 32 with intervals of rest at the end of both the forward and return movements of the bar.

Adjacent its lower end the cam follower bar 296 has a pair of projecting lugs 304 fixed thereto (Figs. 1 and 5). A set screw 306 provided with a lock nut is threaded into an aperture adjacent the outer end of each of these lugs 304. These set screws have reduced tips which project into diametrically opposite apertures adjacent the lower end of the sleeve 278. Since this connects the sleeve and cam follower bar 296 together and the latter is reciprocated through one complete stroke by the cam 294 during each revolution of the main shaft 32 it will be apparent that the rocker 248 will be rocked once and the plunger 46 moved through one forward and return stroke for each revolution of the main drive shaft 32.

Since the vertical position of the drum cam 294 on the main drive shaft will affect the stroke of the cam follower bar 296, sleeve 278, and rocker 248, means is provided for varying its position axially of the drive shaft. Above the upper end of the hub of the cam 294 is an adjusting ring or washer 308 (Figs. 1 and 5) which is held in position by a snap ring 310 in one of several spaced circumferential grooves in the main shaft. A plurality of cap screws 312 passing through the ring 308 are threaded into the upper end of the hub of the drum cam 294 and draw the cam upwardly toward the washer 308 as they are advanced. Upward movement of the cam is limited by a spacer 314 located between the hub of the cam and a snap ring 316. This ring engages in one of the plurality of circumferential grooves in the main shaft below that in which is fixed the snap ring 310 holding the adjusting washer 308. By changing the grooves in which the snap rings 310 and 316 are secured and readjusting the cap screws 312 the position of the cam 294 can be adjusted vertically of the main drive shaft.

*Upper subunit housing*

Figure 2:
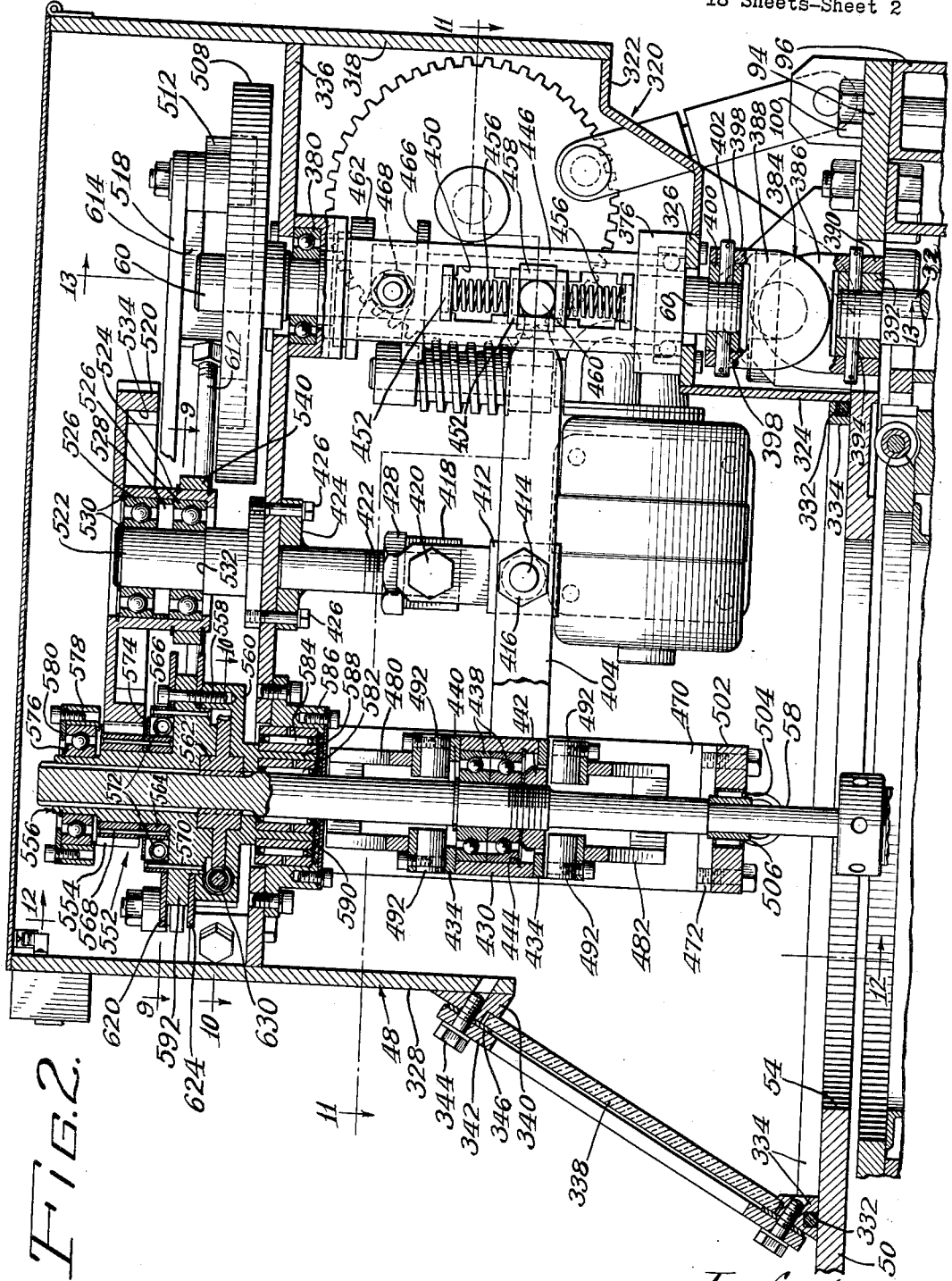
Fig. 2 is a vertical sectional view of the upper subunit of my improved stenciling machine taken on a medial fore and aft plane.

As previously set forth the housing 48 for the mechanism of the upper subunit rests upon the table 50 when they both are in operative position as shown in Figs. 1 and 2. Since radioactive gases may be given off by the luminous paint used in painting a luminous clock or watch dials, it is essential that the space above the aperture 54 in the table 50 be sealed to confine these gases and prevent injury to operators of the machine.

The housing 48 therefore is made from metal plates welded together along their adjoining edges. Its rear wall 318 (Fig. 2) terminates short of the bottom edge of its side walls. At their rear ends these side walls are cut away or recessed forwardly below the lower edge of the rear wall 318 as indicated at 320. The opening thus left at the rear of the housing is closed by transverse plates 322 and 324 and a transverse supporting strap 326 (Figs. 2 and 11). The reason for this construction will appear subsequently.

The front end of the housing includes a vertical plate 328 and an inclined plate 330 (Figs. 2 and 11). In order to prevent the escape of radioactive gases between the table 50 and the bottom edge of the housing 48 when these parts are clamped together, a round sealing strip or gasket 332 (Fig. 2) of suitable compressible material is provided along the bottom edge of the housing. This gasket 332 is held in position by molding strips 334 (Fig. 11) welded to the inner sides of the housing. The top of the housing is closed by a top plate 336 (Figs. 1 and 8) welded to its opposite side walls and to the vertical front and rear walls 328 and 318 respectively.

So that operation of the squeegee can be observed when the machine is in use, the inclined front wall is provided with a sight opening over which a leaded glass plate 338 (Figs. 2 and 11) is secured. The glass plate is supported along its top and bottom edges. These edges rest in grooves in the front gasket molding 334 and in an upper molding strip 340 welded along the upper edge of the sight opening. The opposite ends of the plate engage the opposite ends of the sight opening in the inclined front plate 330 (Fig. 14). A bezel plate 342 held down by means of a plurality of cap screws 344 holds the glass plate in position. Preferably a gasket 346 is provided under the bezel plate 342 to form a seal.

If desired a pipe connection or elbow 348 (Fig. 12) may be secured to one side wall of the housing 48. This pipe connection may be coupled to a conduit 350 connected to a vacuum pump (not shown) so that harmful gases rising from the stencil screen 52 may be evacuated from the housing. It may be preferable to have an intake nozzle or extension (not shown) on the pipe connection 348 opening in the region above the stencil screen 52. This evacuating means is particularly desirable in a machine for stenciling with luminous paint but may be omitted when other types of paint are to be used in the machine.

*Housing and table hinging structure*

At their rear ends both the table 50 and the housing 48 are hinged to the top crosspiece 94 on the main frame so that they may be moved independently of each other or together. Near the forward end of the housing a pair of slotted clamp lugs 352 (Fig. 14) are welded to the opposite side walls thereof. Aligned with the slot in these clamp lugs 352 the table 50 is provided with apertures 354 (Fig. 24). An eyebolt 356 is secured in each of these apertures upon screws 358 threaded into apertures extending from the front edge of the table. The inner ends of the screws 358 pass through the eyes in the bolts 356 to secure the eyebolts for lateral pivotal movement into and out of the slots in the clamp lugs 352. Coil springs 357 may be provided normally to urge the eyebolts 356 outwardly. A knob 360 is threaded on the outer end of these eyebolts. When they are moved into the slots in the clamp lugs 352 and the knobs 360 are turned down, the table 50 and housing 48 will be firmly clamped together.

Both the housing 48 and table 50 are pivotally secured upon opposite ends of pivot shafts 362 (Figs. 13 and 25) press fitted in pivot blocks 364. These blocks are fixed to the forward edge of the top crosspiece 94 on the main frame by means of cap screws 366 passing through apertures in the crosspiece and threaded into the pivot blocks.

Adjacent the bottom of that part of the cutaway rear portion of the side walls of the housing which is outside the rear closing plates or members 322, 324 and 326, a collar 368 (Figs. 11 and 13) is welded to the inner sides of these side walls in alignment with apertures therein. The opposite collars 368 engage upon the outer ends of the opposite pivot shafts 362 to secure the housing to the fixed pivot blocks 364.

The table 50 is secured upon the inner ends of the pivot shafts 362 for movement independently of the housing 48 by means of pivot blocks 370 (Figs. 13 and 25). These blocks are firmly secured adjacent the rear edge of the table 50 by cap screws suitably located and anchored. Preferably suitable anti-friction bearings 372 (Fig. 13) are provided on the opposite ends of the pivot shafts 362. Since these pivot shafts are fixed in the main pivot blocks 364 while the collars 368 on the housing and the pivot blocks 370 on the table are loosely received on the opposite ends of these shafts, it will be apparent that the housing and table may be pivoted independently of each other. Interference between the main frame 64 and the housing is avoided when the latter is tilted backwardly due to the fact that the lower rear portion of the housing is recessed forwardly at 320 as previously explained. Furthermore, due to the fact that the pivot structure above described is all secured outside of the plates or members 322, 324 and 326 which close the lower rear end of the housing, interference between the housing and this pivot structure is avoided when the housing is tilted.

*Upper drive shaft*

All of the squeegee shaft operating mechanism is driven from the upper drive shaft 60. This shaft extends vertically of the housing 48 adjacent its rear end and passes through apertures in the rear supporting strap 326 and the top plate 336 (Fig. 13). Adjacent its lower end the upper drive shaft is rotatably supported in an anti-friction and thrust bearing 374 (Figs. 11 and 13) carried in a lower bearing block 376 fixed to the strap 326 by suitable means such as cap screws 378. An upper bearing 380 for the shaft is secured in an upper bearing block 382 fixed to the underside of the top plate 336.

The upper drive shaft 60 is driven from the main drive shaft 32 in the lower subunit through a universal joint indicated in its entirety at 384 (Figs. 2 and 13). This joint includes a driving member 386 and a driven member 388. The driving member 386 comprises a semicircular plate having depending lugs 390. These lugs engage upon chordally extending flattened areas on a sleeve 392 resting on a shoulder adjacent the upper end of the main drive shaft 32. A pin 394 (Fig. 2) suitably fixed in position as by cotter pins through its opposite ends passes through the lugs 390, sleeve 392 and main drive shaft 32 and secures the driving member 386 loosely to the main drive shaft.

The driven member 388 is also semicircular in shape and has a slot 396 (Fig. 13) for loosely receiving the semicircular end of the driving member 386. It is recessed opposite its semicircular side to provide opposite lugs 398. These lugs engage chordal sides on a sleeve 400 upon the lower reduced end of the upper drive shaft 60. The sleeve 400 and driven member 388 are held on the upper drive shaft by a pin 402 passing through the parts and suitably secured at its opposite ends. This mounting of the driving and driven members 386 and 388 allows both these members to swing freely on the axis of their respective mounting pins 394 and 402. By reason of this construction, active driving engagement between the two shafts 32 and 60 is maintained whether the housing 48 is in operative position or is tilted backwardly.

*Rockable squeegee shaft supporting means*

The novel means supporting the squeegee shaft for both axial and rotational movement includes a rocker 404 (Figs. 2 and 11) having a pair of arms 406 that converge at their rear ends. A block 408 is welded to one of these arms and the other arm is secured to the block by cap screws 410 so that the arms are rigidly secured together. The rocker 404 is pivotally secured intermediate its ends to the base of a U-shaped link 412 by means of a shouldered pin 414 passing through a bushed opening in the base of the link. This pin is held in position by jam nuts 416 threaded on its opposite ends. The arms of the link 412 are pivotally secured to a mounting block 418 (Fig. 11) by means of a pair of shouldered screws 420 passing through the arms and threaded into the block 418.

This mounting block has a tapped vertical bore which is received upon the lower threaded end of a depending supporting rod 422. Rod 422 is fixed in a base 424 secured to the underside of the top plate 336 by cap screws 426. By reason of the threaded connection between the rod and block vertical adjustment of the block and rocker 404 may be made. A nut 428 may be provided on the rod for locking the block at a position.

In Fig. 12 a housing or bearing cage 430 is shown surrounding the squeegee shaft 58 intermediate its ends. This cage is pivotally secured to the front end of the rocker arms 406 (Fig. 11) by means of pins 432 fixed in the cage. Referring to Figs. 2 and 11, it will be seen that the cage is generally cylindrical and has ring-like end plates 434 secured to its opposite ends by cap screws 436. Within the cage 430 and surrounding the squeegee shaft 58 is a pair of anti-friction and thrust bearings 438. These bearings are held in fixed position relative to the squeegee shaft by a snap ring 440 on the shaft and a lock nut 442 engaged upon a threaded portion of the shaft. They are fixed relative to the cage 430 by the top ring 434 and a snap ring 444 in the cage. It will be observed, therefore, that the squeegee shaft 58 may rotate relative to the cage 430 but is held against axial movement relative thereto. In view of the fact that the cage is carried by the rocker 404 and the squeegee shaft 58 is carried by the cage, the rocker forms a support for the squeegee shaft.

The rocker is rocked by mechanism actuated by the upper drive shaft 60 and now to be described. To one side of the upper drive shaft is a cam follower bar 446 (the front side in Fig. 2). This bar is reciprocably supported in aligned slots 448 in the upper and lower bearing blocks 382 and 376 respectively (Figs. 11 and 13). An irregular shaped opening 450 is provided in the cam follower bar (Fig. 2) having opposite end parts and an intermediate part of reduced width. Secured within this opening 450 are two pairs of spring pads 452. These pads may be formed from square metal plates (Fig. 11) of widths approximately equal to the width of the widest part of the opening 450. They are provided with notches 454 in opposite ends, and these notched ends interfit with the reduced portions of the opening 450 in the cam follower bar.

The inner and outer pads in each pair are urged apart by a compression spring 456. Opposite ends of these springs seat in recesses in the confronting faces of the pads in each pair. Expansion of the springs 456 is limited by engagement of the outer pad in each pair of pads against the end of the opening 450 and by engagement of the inner pads of each pair with the opposite ends of a pair of stops 458 (Fig. 2) fixed to the opposite sides of the opening 450 intermediate its ends.

On its rear end the rocker 404 has a finger 460 (Figs. 2 and 11) which engages between the inner pads of the two pairs of spring pads. The springs 456 are sufficiently resistant to contraction to cause the rocker 404 normally to be rocked when the cam follower bar 446 is reciprocated. However, if movement of the rocker is positively limited, one or the other of the springs 456 will yield, depending on the direction of movement of the bar 446 so that the latter can complete its full stroke. The springs 456 thus provide a cushion or lost motion connection between the bar 446 and the rocker 404.

The cam folower bar 446 is driven from the upper drive shaft 60 by a drum cam 462 keyed upon that shaft above a spacer 464. This cam has a circumferential groove 466. A follower 468 rotatably secured upon a shaft fixed in the cam follower bar, rides in the cam groove 466. It will be noted that the contour of the cam groove 466 is such that the cam follower bar 446 is driven through one stroke each time the upper drive shaft rotates once. As a result the squeegee shaft 58 is raised and lowered once by the rocker 404 during each revolution of the upper drive shaft. It will also be noted that the cam groove 466 has opposite vertically spaced flat portions so that the cam follower bar, rocker and squeegee rest for an interval at their upper and lower positions. Furthermore, the cam 462 on the upper drive shaft and the cam 294 on the main drive shaft 32 are symmetrical and are symmetrically arranged so that the squeegee shaft 58 and the work raising plunger 46 will be reciprocated substantially simultaneously and in the same direction relative to the screen 52.

*The means for limiting axial movement of the squeegee shaft*

A lost motion connection between the upper drive shaft 60 and squeegee shaft 58 of the type just described, or of some other type, is necessary to provide for adjustment of the extent of axial movement of the squeegee shaft. Such adjustments must be made due to the fact that the factors determining the proper position of the squeegee 56 relative to the stencil screen 52 on the paint spreading and on the paint applying strokes may vary. Adjustment of the limits of axial movement of the squeegee 56 may become necessary because of the condition of the paint used. For example, the consistency or viscosity of luminous or other paint is affected by the temperature at which it is used, or its age, or for other reasons and furthermore it is very viscid. Adjustment of these limits may also be necessary because of differences in the work. If the work presents a convex or concave surface to the stencil screen, the squeegee must be moved farther down upon the screen to obtain a perfect impression than for work presenting a flat surface to the screen. However, in any case, the differences in the extent of movement are relatively small. This necessitates the provision of means for readily, accurately and minutely adjusting the limits of movement of the squeegee shaft. The novel means which I have provided for this purpose will now be described.

Referring to Figs. 11 and 12, it will be seen that a vertically extending supporting plate 470 is secured in the housing 48. This plate 470 is welded at its upper end to the underside of the top plate 336, and at its lower end to a transverse plate 472. A gusset 474 welded to the top plate 336, transverse plate 472, and vertical plate 470, may be provided for rigidifying the structure. Journal brackets 476 are welded to the opposite edges of the vertical supporting plate 470 intermediate its ends. These journal brackets 476 support a pair of pivot pins 478 upon which upper and lower bell crank levers 480 and 482, respectively, are journaled.

Each of these bell crank levers comprises duplicate body members 484 secured in spaced relation by a hub 486 which forms a journal for the bell cranks and to which the body members are fixed. The body members 484 each have a forwardly extending arm, to the outer end of which is welded a mounting block 488 having a semicircular seat. Cap screws 490 passing through the mounting blocks 488 and threaded into circular abutment members 492 secure the latter in the seats in the outer face of the mounting blocks 488. Each of the body members 484 in the bell cranks also has a vertically extending edge (Fig. 12) spaced above the forwardly extending arm thereof. A stop bar 494 is welded at opposite ends to these vertically extending edges of the opposite body members in the bell cranks.

Welded to the vertical supporting plate 470 and the gusset 474 is a pair of threaded sleeves 496. Adjusting rods 498 having outer ends which project through the side walls of the housing 48 are threaded into the sleeves 496. The inner ends of these rods 498 extend through the supporting plate 470 substantially in line with the stop plates 494 on the upper and lower bell cranks 480 and 482. They thus form stops to limit backward pivotal movement of these bell cranks. Adjustment of the rods 498 is facilitated by hand knobs 500 on their outer ends. These knobs may have serrated or grooved peripheries, and spring fingers 501 are provided on the side of housing 48 to engage in the serrations or grooves to lock the adjusting rods in position.

Referring to Figs. 11 and 12, it will be seen that the forwardly extending arms of the upper bell crank 480, and the opposite abutment members 492 carried thereby, straddle the squeegee shaft 58 on the upper side of the bearing cage 430. The corresponding parts of the lower bell crank 482 likewise straddle the squeegee shaft 58 but on the lower side of the bearing cage 430. It will be noted, therefore, that the vertical distance between the abutment members 492, as determined by the position of the adjusting rods 498, determines the limits of vertical or axial movement of the bearing cage 430 and thus determines the limits of axial movement of the squeegee shaft 58. This distance can of course be varied readily by advancing or retracting the adjusting rods 498.

Since the front end of the rocker 404 is fixed to the bearing cage 430, the extent of movement of the rocker will also be determined by the adjustment of the bell cranks. If this movement of the rocker is less than the cam follower bar 446 is capable of moving the rocker as a result of its being reciprocated by the cam 462, the springs 456 compensate for this difference. Under these circumstances one or the other of the springs 456, depending upon the direction of movement of the cam follower bar 446, yields to permit the bar to complete a full stroke.

Support for the lower end of the squeegee shaft 58 is provided by a plate 502 (Fig. 12) fixed to the inner end of the transverse plate 472. A bearing 504 (Fig. 2) for the squeegee shaft is fixed in the plate 502. Preferably a bushing 506 is fixed on the lower end of the squeegee shaft and is of sufficient length to present a bearing surface to the bearing 504 irrespective of the axial position of the squeegee shaft.

While the mechanism described above is designed to move the squeegee shaft axially between variable fixed positions and thus move the squeegee between fixed positions at which it is respectively in paint spreading and paint applying relationship to the screen, the same result may be accomplished in some cases in another manner. Since the screens conventionally used in stenciling machines are resilient, it will be appreciated that the screen, instead of the squeegee, may be moved between paint spreading and paint applying position relative to the squeegee. If this is to be done, the squeegee shaft is set to hold the squeegee fixed at paint spreading position relative to the screen when the machine is at rest. The forward stroke of the work raising plunger 46 is then increased sufficiently so that the plunger on its forward stroke raises the work holder at stenciling position far enough so that not only is it brought into engagement with the underside of the screen 52 but the screen is forced upwardly thereby. By proper adjustment of the forward stroke of the work raising plunger 46 the stencil screen may be raised far enough to bring it into stenciling relationship with the squeegee. The limit of the return stroke of the plunger 46 need not be altered and therefore on this stroke the screen will return to paint spreading relationship with the squeegee and the work holder carried by the plunger will be lowered to a position flush with the top of the turntable. In other respects the operation of the machine may be the same.

Squeegee shaft rotating mechanism

Mechanism for rotating the squeegee shaft and squeegee in half turns is driven from the upper drive shaft 60. The upper end of this shaft projects through an opening adjacent the rear end of the top plate 336 (Fig. 2). Keyed upon this projecting end of the shaft is a face cam 508 (Figs. 2, 8 and 13) having a cam groove 510. A cam follower lever 512 pivoted intermediate its ends upon a pivot 514 fixed in the top plate 336 has a follower 516 which engages in the cam groove 510. A gear actuating lever 518 is pivotally secured to the cam follower lever 512 on the same side of its pivot axis as the cam follower 516.

This lever 518 actuates a cam gear 520 (Figs. 2 and 8) rotatably mounted upon a stub shaft 522 fixed to the top plate 336 preferably by means of the cap screws 426 which secure the base 424 of the depending rod 422 to the underside of the top plate. The cam gear 520 has a hollow hub 524 in which upper and lower anti-friction bearings 526 are fixed. The outer race of the lower bearing engages a shoulder in a hub 524, and the upper bearing is held in spaced relation to the lower by a spacer 528. A pair of snap rings 530 which hold the upper bearing against the spacer 528 thus lock the two bearings in position in the hub of the cam gear. Since the inner race of the lower bearing engages a shoulder 532 on the stub shaft 522 the gear is thus supported on this shaft.

On its underside the cam gear 520 has a cam groove 534 which includes six equidistantly spaced notches 536. The actuating lever 518 has a vertical drive pin 538 (Figs. 8 and 9) on its upper side which is adapted to engage in these notches. Each time the actuating lever 518 is moved through one stroke by the face cam 508, the cam gear 520 is driven through one-sixth of a revolution, or 60°. The camway 510 in the cam 508 is conformed to cause this to occur twice during each revolution of the upper drive shaft 60 and cam 508.

In order positively to engage the pin 538 on the actuating lever in the notches 536, means, which will now be described, is provided for biasing the actuating lever outwardly. Loosely secured upon the hub 524 of the gear, by snap rings, is a retaining member 540 (Figs. 2 and 9). This member has a slotted radially extending arm 542. A slide block 544 is slidably secured in the slot in this arm and is urged outwardly by a spring 546. This slide block is connected to the outer end of the actuating lever 518 by a depending pin 548 on the lever extending into an aperture in the slide block. Since the spring 546 constantly urges the slide block outwardly of the arm 542 the actuating lever is biased correspondingly so that the drive pin 538 is held in firm engagement with the cam groove 534 in the same gear 520. Outward movement of the slide block is limited by an adjusting screw 550 held in position by a lock nut. If desired an additional biasing force may be applied to the lever 518 by a coil spring 549 attached at opposite ends to the side of the housing and to an intermediate part of the lever.

The cam gear 520 is engaged with and drives a drive assembly for the squeegee shaft indicated in its entirety at 552 in Fig. 2 through a pinion 554. This pinion has teeth engaging with the teeth on the periphery of the cam gear. Drive assembly 552 includes a base member 556 fitting loosely upon the splined upper end of the squeegee shaft 58. The pinion 554 is rotatable on this base member 556. Clamped against the bottom end of this base member, by means of cap screws 558, is a worm wheel housing 560 also free upon the squeegee shaft 58. A worm wheel 562 which has splines interfitting with splines on the upper end of the squeegee shaft 58 is loosely enclosed by this housing 560. The worm wheel may be locked against rotation relative to the base member 556 and worm wheel housing to form a driving connection between the drive assembly 552 and squeegee shaft by means which will be described subsequently.

A driving connection between the pinion 554 and the base member 556 is established through inner and outer star wheels 564 and 566, respectively (Figs. 2 and 9). The inner star wheel 564 is fixed to the lower side of the pinion 554 by a plurality of rivets 568 (Fig. 2). The outer star wheel 566 is fixed to the base member 556 by a plurality of rivets 570. A resilient driving connection is established between the inner and outer star wheels by means of coil springs 572 (Fig. 9) engaged between the confronting faces of the adjacent teeth on the inner and outer wheels. These springs are held in position by a retaining cap 574.

Since the inner star wheel 564 and the pinion 554 are fixed to each other the latter upon being rotated drives the inner star wheel. Rotation of the inner star wheel is imparted to the outer star wheel 566 through the cushioned driving connection provided by the springs 572. This outer wheel being fixed to the base member 556 drives the latter. Since the worm wheel 562 normally is locked against rotation relative to the base member 556 it will be rotated when the base member rotates. Finally, since the worm wheel 562 is splined to the squeegee shaft 58 the latter will be rotated whenever the worm wheel rotates. The particular advantages of this cushioned or resilient driving connection will be described in detail subsequently. In view of the fact that the machine of the present invention accomplishes its purposes by rotation of the squeegee in half turns the cam gear 520 which rotates 60° when actuated and the pinion 554 on the drive assembly bear a 3 to 1 ratio.

To reduce friction, an anti-friction bearing 576 (Fig. 2) is provided for the upper end of the base member 556. This bearing is carried in a transverse strap 578 (Figs. 8 and 12), in the upper end of the housing, fixed to suitable brackets on the side walls thereof. The bearing is held in place between a peripheral shoulder on the bottom of a bearing recess in the strap 578 and a retaining plate 580 fixed to the upper side of the strap by cap screws or the like.

At its lower end the drive assembly 552 rotates in inner and outer bearings 582 and 584, respectively. These bearings are carried in a cup-like housing 586 secured to the underside of the top plate 336. The inner bearing 582 is disposed between the squeegee shaft 58 and a depending cylindrical part 588 on the worm wheel housing 560 and thus provides a bearing between the housing 560 and the upper end of the squeegee shaft. The outer bearing 584 is disposed between the outer wall of the cylindrical part 588 and the bearing housing 586, thus locating the upper end of the drive assembly and squeegee shaft and providing a bearing between the drive assembly and the bearing housing 586. At its lower end the bearing cup is closed by a bottom plate. Preferably an oil-soaked felt washer 590 is interposed between the bottom plate and the ends of the bearings 582 and 584 for lubricating the latter.

*Squeegee shaft rotation arresting means*

Since the squeegee 56 is double bladed (Fig. 11) a complete sweep of the stencil screen is made by it each time the squeegee shaft is rotated through one-half revolution. Thus it is necessary to rotate the squeegee through only one-half turn when it is in axially raised position to coat the screen with a film of paint. Likewise, after the squeegee shaft and squeegee have been lowered axially to paint applying position the squeegee need be rotated through only one-half turn to complete the application of a design to the work. As a matter of fact, arrest of the movement of the squeegee shaft precisely at the end of each half turn is quite important because any overrun on the strokes of the squeegee may cause overlapping of paint material on the design applied to the work. The means for arresting rotary movement of the squeegee shaft precisely at the end of each half turn will now be described. This means also operates to hold the shaft rigidly against forward or backward rotary movement while the shaft is being moved axially.

Referring to Figs. 2 and 9, it will be seen that the base member 556 is provided with diametrically opposite stop lugs or ratchet teeth 592. The opposite sides of these teeth are adapted to be engaged by oppositely disposed return and forward stops or pawls 594 and 596, respectively, rigidly to lock the drive assembly 552 against rotary return or forward movement, respectively. The return stop pawl 594 has a tooth at its forward end. At its rear end it is pivotally secured to an intermediate part of a mounting lug 598. This lug in turn is pivotally secured at one end to the top side of the top plate 336 in the housing 48. Its other end is locked between oppositely extending adjusting screws 600 threaded into the opposite arms of a U-shaped mounting bracket 602 fixed to the top plate 336. A coil spring 604 between the back side of the return stop pawl 594 and a plug in the front wall 328 of the housing, biases the pawl to operative position. The pawl 594 also has a depending roller 606 adjacent its forward end for a purpose which will be described.

The forward stop pawl 596 is similar to the return stop pawl except for the fact that it has a crank arm 608 on its rear end and an upstanding roller 610 adjacent its forward end instead of a depending roller. This forward stop pawl pivots on a mounting lug similar to the lug 598. The position of this lug may be adjusted by cooperating adjusting screws similar to the screws 600 threaded into the opposite arms of a U-shaped mounting bracket like the bracket 602. A spring biases the forward stop pawl 596 to closed position.

This forward stop pawl is opened by a trip rod 612 (Fig. 8) of adjustable effective length having a lost motion connection with the crank arm 608 through a spring 611 between a lug on a link 615 swiveled to the rear end of the crank arm and a nut 613 on the forward end of the trip rod. At its rear end this rod is fixed to a connecting clevis 614 which has elongated slots 616 in its arms. This slotted clevis is connected to the outer end of the previously described cam follower lever 512 by means of a pin or shouldered screw 618 slidably received in the slot 616.

By opening and closing the forward stop pawl 596 in coordinated relation with the movement of the squeegee shaft rotating means previously described, overlapping on either the paint-spreading or paint-applying strokes of the squeegee is avoided. It is also essential that the stop pawl opening and closing means and squeegee rotating means operate in timed relation with the means for raising and lowering the squeegee shaft so that the shaft is locked against rotation when it is being moved axially. Operation of the several means which cooperate at one time to rotate the squeegee shaft and thereafter to lock the same against rotation and move it axially in the aforesaid manner, is obtained in the present machine, as will appear in detail below. Furthermore, this mechanism in the upper subunit must operate in cordinated relation with the mechanism in the lower subunit.

This is essential in order that the work holders 38 and squeegee 56 shall both be moved axially relative to the screen into stenciling relationship therewith at substantially the same time and be held at this axial position until the squeegee is driven through a half revolution to complete a paint-applying stroke. The sequence of operation of the parts in the upper subunit will now be explained. To simplify this explanation, and a later explanation of the operation of the machine as a while, the parts in all of the views are shown at the position they assume when the machine is at rest. In other words, they are at the initial or starting position.

In Figs. 2 and 8 the squeegee shaft rotating mechanism is shown at the position it assumes when the turntable indexing mechanism and work holder actuating means are in the position shown in Figs. 1, 3 and 5, namely when the work holders are down and will remain so for an interval and the turntable is about to index. In the upper subunit the cam 508 and the lever 512 operated by it are at a position which causes the drive pin 538 on the gear actuating lever 518 to be held short of one of the notches 536 in the cam face 534 in the cam gear 520. At the same time the screw 618 connecting the cam follower lever 512 and the trip rod 612 is at the rear end of the slot 616 in the connecting member 614 and this rod is about to open the forward stop pawl 596. It is also to be noted that the squeegee shaft rocking means previously described is in the position shown in Figs. 2 and 13 so that the squeegee shaft is at its raised position. Due to the fact that the drum cam 462 has been brought to a position at which the follower 468 is entering the lower portion of the groove 466 in the cam the squeegee shaft will be held in raised position for an interval after the operation of the machine is initiated.

When the clutch 34 is engaged by energizing the solenoid 116, the main drive shaft 32 will be rotated and will rotate the upper drive shaft 60 and face cam 508 in a clockwise direction, as indicated in Fig. 8. Upon initial movement of the cam 508 the cam follower lever 512 will be rocked in a clockwise direction, thus moving the trip rod 612 in a direction to open the forward stop pawl 596 and free the drive assembly 552 and squeegee shaft 58 for forward or clockwise rotation. At the same time the cam gear actuating lever 518 is moved to a position to bring its drive pin 538 opposite the notch 536 in the cam face in the cam gear 520 toward which it had previously been moved as the stop pawl 596 opens.

Due to the contour of cam groove 510, rotation of the cam 508 soon causes the direction of rocking movement of the cam follower lever 512 to be reversed so that it moves in a counterclockwise direction. Thereupon it actuates the cam gear-actuating lever 518 in a direction to engage the drive pin 538 thereon in the notch 536 in the cam gear 520 opposite which it was previously moved so that the cam gear 520 is driven counterclockwise. This gear drives pinion 554 and the drive assembly 552 in a clockwise direction. After rotation of the drive assembly is initiated the trip rod 612 is released by continued counterclockwise movement of the cam follower lever 512, so that the forward stop pawl 596 is free to move toward its operative position under the influence of its biasing spring. However, it is held open by upstanding roller 610 riding on a cam 620 (Figs. 2 and 8) rigidly secured to the base member 556 on the upper side of the stop lugs 592 when the drive assembly 552 is not in its at rest position.

This cam has diametrically opposite notches 622 in its periphery. From the contour of the notches 622 in this cam 620, as seen in Figs. 8 and 9, it will be apparent that almost immediately after the drive assembly 552 starts to move forward, the cam 620 will be moved to a position to block return of the forward stop pawl 596 to operative position. It will be held open by this cam until the drive assembly completes half a turn regardless of the fact that the trip rod 612 has been released.

Return or reverse rotation of the drive assembly 552 is prevented by the return stop pawl 594 which moves to operative position as the forward stop pawl moves to operative position. It is held in retracted position while the drive assembly is rotating forwardly by depending roller 606 riding on the periphery of a cam 624 similar to the cam 620. The periphery of this cam 624 has diametrically opposite notches similar to notches 622 in cam 620. Cam 624 is fixed to the underside of the stop lugs 592 on the base member 596 with its notches offset from the notches in the forward stop pawl holding cam 620 so that the return stop pawl 594 will be allowed to move to operative position as the forward stop pawl moves to operative position. As a result, the drive assembly 552 and squeegee shaft will be abruptly stopped and rigidly held against rotation in either direction. Overrun of the mechanism driving the drive assembly or jarring caused by the abrupt stopping of the same is absorbed by the resilient driving connection provided by the star wheel drive already described.

*Adjustable means for varying the resting position of the squeegee*

To lessen the likelihood of overlapping of paint on the stenciled work, it is desirable to have the squeegee complete its impressing or paint-applying stroke when the blades are on a portion of the stencil screen which is impervious. One position relative to the stencil screen and work holders at which the blades might be stopped is shown in phantom by way of example in Fig. 3. Four dials have been shown in this view on the work holders. When dials of other sizes are to be stenciled the work holders may carry a greater or lesser number of dials. It may be necessary, therefore, to change the position relative to the screen at which the squeegee comes to rest if it is to stop over an impervious area on the screen. Means is therefore provided for rotationally adjusting the squeegee shaft 58 relative to the drive assembly 552 to vary the position relative to the screen at which the squeegee comes to rest as desired.

Referring to Fig. 10, it will be seen that the worm wheel housing 560 in the drive assembly has an enlarged forwardly projecting part 626. This part has a bore 628 in which a worm 630 is housed. This worm is fixed upon a shaft 632 and engages the worm wheel 562. One end of the bore 628 is closed by a bushing 634 threaded therein and having an axial bore in which one end of the worm shaft 632 is rotatably supported. The opposite end of the worm shaft 632 is rotatably supported in an eccentric bushing 635 in the opposite end of the bore 628. Spacers 636 between the worm and the inner ends of the bushings 634 and 635 prevent axial movement of the worm shaft 632 when it is rotated, such axial play as is present being adjustable by adjusting the bushing 634. By virtue of the eccentricity of the bushing 635 it may be rotated to a position at which the worm 630 is brought into binding engagement with the worm wheel 562. Back lash is thereby eliminated and the worm wheel is locked against rotation relative to the rest of the drive assembly 552. A driving connection between the drive assembly and squeegee shaft 58 is thus established.

Although the worm wheel 562 is locked against independent movement by the means described above during the normal operation of the machine it should nevertheless be loose enough so that it can be rotated to adjust the same. For this purpose the projecting opposite ends of the worm shaft are conformed to receive a key for turning the shaft, and suitably located apertures (not shown) are provided in the housing 48 through which the key may be inserted to rotate the shaft. Preferably, the unoccupied space in the worm wheel housing is packed with lubricant for an obvious purpose.

To adjust the position of the squeegee shaft 58 relative to the drive assembly 552 the worm wheel is rotated in the desired direction by turning the worm shaft 632 in one direction or the other. In the meantime the drive assembly other than the worm wheel is fixed against rotation by the forward and return stop pawls 596 and 594 and therefore remains stationary. Because of the splined connection between the worm wheel and squeegee shaft and due to the fact that the latter is free to rotate relative to the rest of the drive assembly, rotation of the worm wheel rotates the squeegee shaft relative to the drive assembly 552. In this manner the position at which the squeegee comes to rest on the stencil screen may be varied. All of the above operations may be performed from the outside of the housing 48, and the worm shaft may be turned from either end, depending on which end is accessible to the key. Adjustment of the squeegee shaft is, therefore, facilitated.

The squeegee assembly

The squeegee 56 fixed to the lower end of the squeegee shaft 58 comprises a supporting member 638 (Fig. 16) having a central hub-like part 640 and opposite generally radially extending arms 642. This member is carried by a hub 646 (Fig. 15) fixed upon the lower conically tapered end of the squeegee shaft 58. The hub 646 is externally threaded and has a frusto-conical bore which engages upon the conically tapered lower end of the squeegee shaft. Supporting member 638 is fixed to the lower reduced end of the hub 646 by diametrically opposite screws 648 passing through apertures in the supporting members and threaded into the lower end of the hub. To provide for angular adjustment between the hub 646 and supporting member 638, the latter has a plurality of equidistantly, angularly spaced screw openings 650 for receiving the screws 648 (Fig. 16) arranged in diametrically opposite pairs.

The hub 646 is drawn into firm frictional engagement with the conical lower tip of the squeegee shaft by a capstan nut 652. This nut has threads for engaging the threads on the hub. A stop consisting of a retaining ring 654 abutting against a snap ring 656 in the squeegee shaft 58 limits movement of the nut toward the lower end of the squeegee shaft. By turning the capstan nut the hub may be drawn into firm frictional engagement with the squeegee shaft.

Carried by the arms 642 on the supporting member is a pair of squeegee blade holders or carriers 660. Referring to Figs. 15 and 17 it will be seen that each blade carrier comprises an elongated generally L-shaped body member 668 and a clamping plate 672. This clamping plate is fixed to the underside of the horizontal portion of the L-shaped member by a pair of screws 674. The carriers 660 are fixed to the underside of the oppositely extending arms 642 on the supporting member by cap screws 664. These screws extend through slots 666 in the arms 642, and by tightening these screws the blade carriers 660 may be frictionally clamped against the underside of the supporting member 638. By virtue of this construction the blade holders and blades may be adjusted transversely of the arms 642 on the supporting member and angularly upon the axis of the cap screws 664. Since the cap screws are disposed to one side of the axis of the supporting member the blade holders can be adjusted so that the outer ends of the blades precede the inner ends when the squeegee is rotated. Excess paint on the stencil screen is thus directed inwardly by the blades rather than outwardly.

Squeegee blades 670 of rubber or synthetic rubber-like material are clamped between the L-shaped members 678 and the clamping plates 672. As best seen in Fig. 17, each blade 670 has a vertically extending leading edge 676 which engages against the vertical side of the L-shaped member 668 and an inclined trailing edge which is engaged by the clamping plate 672. The lower marginal edge of the blade extends below the bottom edge of these portions of the carrier 660 so that it has flexibility. Extensions 678 on the opposite ends of the blades project forwardly from the leading edge thereof. Thus, when the squeegee is rotated, paint collecting along the leading edge of the blade is confined between these extensions 678 and cannot escape to the outer edge of the stencil screen.

Paint agitating and dispensing means

Because of the relatively high cost of luminous paint, it constitutes a large factor of expense in the total cost of luminous dials. Prevention of waste in the distribution of this paint, and a means for accurately controlling feeding of the paint so that an excess is not fed to the stencil screen, therefore, are important. Furthermore, since the paint may be radioactive, it should be confined in such a manner that it can be readily handled and the machine refilled with paint without undue exposure to the same. A novel paint dispensing means which is particularly suitable for use in dispensing luminous paint is shown in Fig. 14.

The dispensing means includes a paint dispenser or reservoir and a holder for the dispenser. The latter has a cylindrical barrel 680 of approximately 30 cc. capacity, closed at its forward end by a threaded plug 682 having a metering bore 684 therein. A valve seat is formed at the outer end of this bore and a spring pressed ball check valve 686 carried in a nozzle 688 threaded on the outer end of the plug 682 controls communication through the bore 684. The rear end of the barrel 680 is closed by a cap 690 threaded thereon. A piston rod 692 extends through this cap 690 and has a knob on its outer end for manipulating the same. Slidable in the barrel 680 on the piston rod 692 is a follower piston 694. This follower is urged in a direction to feed paint to the metering bore 684 by a spring 696 between the back of the follower and an abutment 698 fixed on the piston rod. The spring, therefore, also urges the piston rod to retracted position.

A tip 700 on the piston rod 692 is finished to form a piston for ejecting paint from the metering bore 684. When the piston rod 692 is in the retracted position, shown in Fig. 14, paint in the barrel in front of the follower piston 694 is forced by the latter into the metering bore. Since the spring 696 does not exert enough pressure on the follower piston to force the paint past the check valve 686 the bore merely fills with paint. However, when the piston rod 692 is moved forward, its finished tip 700 entering bore 684 forces the paint therein past the check valve and out of the nozzle 688. Preferably the metering bore is of sufficient capacity so that five or six drops of paint are forced from the bore each time the piston rod 692 is operated. Ordinarily, this will be sufficient for several stenciling operations, although requirements will vary with the total area of the design being covered with paint. Preferably, a deflector 693 is welded or secured in any other suitable manner to the inner end of plate 502 (Fig. 12) to guide the paint discharged from the nozzle 688 toward the screen.

Luminous paint requires constant agitation if it is to remain in the best condition for use. For this reason the paint reservoir holder is mechanically agitated throughout the time the machine is in operation. As best seen in Fig. 14, this holder comprises an inner tubular shell 702 and an outer tubular shell 704. The outer shell projects through an aperture in one side wall of the upper unit housing 48 below the top plate 336. Adjacent its outer end it is welded to a flat base plate 706 (Figs. 12 and 14) and this plate is bolted to the inner side of the side wall of the upper unit housing 48. Preferably a ring-like gasket 708, nested in a groove in the base plate 706 circumscribing the outer shell of the holder, is provided to seal the joint between the base plate and the side wall of the upper unit housing. The inner side of the outer shell 704 is provided with a bearing sleeve or bushing 710 of suitable material held in position by a forward end flange 712 on this shell and a snap ring 714 adjacent the rear end of the shell.

The inner shell 702 is of generally cylindrical shape and is adapted to be rotatably received in the bearing sleeve 710. The paint reservoir 680 is loosely received in the inner shell 702 with the nozzle 688 projecting from the inner end thereof. It is held in position therein frictionally by a pair of rubber collets 716. The inner collet abuts against an internal shoulder in the inner shell, while the outer collet is spaced from the inner collet by a spacer 718. A hollow thimble or packing nut 720 threaded into the outer end of the inner shell 702 holds these parts in position and may be tightened sufficiently to deform the collets 716 so that the inner shell and reservoir are frictionally secured against relative movement. Thus when the inner shell 702 is rotated in the outer shell 704, the reservoir 680 will be rotated correspondingly.

The inner shell 702 is driven by a small motor 722, for example of ½₀₀₀ horsepower. This motor is bolted to a bracket 724, in turn bolted to the inner side wall of the upper unit housing 48. Motor 722 drives a gear 726 preferably through a speed reducer and this gear is engaged with a pinion 728 fixed on the inner end of the inner shell 702.

*Stencil screen supporting and adjusting means*

In view of the fact that the plunger 46 and the work holder 38, which is moved thereby into and out of stenciling position are fixed against adjustment in a plane parallel to the stencil screen 52, means has been provided for adjusting the stencil screen in its own plane to register the pattern cut in the screen perfectly with the work carried by the holders. To obtain absolutely perfect registry between the screen and work, the screen must be adjustable rotationally and in normal directions linearly. The means for accomplishing these adjustments is best seen in Figs. 18–24.

This adjusting means includes three adjusting plates depending from the underside of the table 50. These plates are best seen individually in Fig. 24. As there indicated, the adjusting means includes an upper adjusting plate 730, an inner adjusting plate 732, and a lower adjusting plate 734. The upper plate 730 is in the form of a generally square open frame. It is tapered along its front edge 736 and its rear edges 738 which extend on opposite sides of a notch or recess 740 formed therein. This recess provides clearance for the universal joint 384 connecting the main drive shaft 32 and the upper drive shaft 60.

A transversely extending angle bracket 742 (Figs. 18 and 19) is staked to the underside of the table 50 adjacent its front end by means of countersunk cap screws. This bracket supports a gib 744. Along its rear edges 738 a pair of transversely extending gibs 746 (Fig. 18) are staked to the underside of the table. The gibs may be made from brass or other suitable bearing metal, and the front gib 744 and rear fixed gibs 746 are tapered complementary to the front and rear tapered edges, respectively, of the upper plate 730. These gibs form a support for the upper plate along which it is slidable transversely of the table 50. To provide for adjustment of the space between the gibs, the front gib 744 preferably is adjustable fore and aft of the bracket 742 by means of set screws 748 extending through the front side of the bracket. Preferably brass wear plates, one of which is seen at 750 in Fig. 19, are fixed to the top side of the upper plate 730 to hold the same in spaced relation to the table 50.

The upper plate 730 is moved transversely of the table by an adjusting screw 752 (Figs. 18 and 20) having a hand knob fixed on its outer end. This screw extends through and has threaded engagement with a two-piece block 754 separable on the horizontal diametrical plane of the screw aperture formed between the two parts. The upper portion of the block is staked to one side of the table 50 by means of countersunk cap screws. The lower portion is staked to this upper portion (Fig. 20). Thus when the adjusting screw 752 is turned by means of its hand knob it will advance or retract in a transverse direction relative to the table depending on the direction in which it is turned.

Adjacent its inner end the adjusting screw 752 is rotatable in a cylindrical recess formed in part in the underside of the upper plate 730 and in part in an anchor block 756 (Fig. 20) staked to the underside of the upper plate. A circumferential rib 758 on this inner end of the screw 752 is received in a complementary groove in the recess formed between the upper plate and the anchor block. The upper adjusting plate and adjusting screw are thus connected together so that the upper plate is moved transversely relative to the table whenever the screw 752 is turned.

The lower adjusting plate support includes a gib supporting angle bracket 760 secured by countersunk cap screws (Figs. 18 and 20) to the underside of the upper adjusting plate 730 along its lower side edge, as seen in Fig. 18. This bracket adjustably supports a gib 762 (Fig. 20) in the same manner that the front gib 744 of the upper adjusting plate is supported. On the underside of the opposite side edge of the upper adjusting plate 730 gibs 764 are staked on each side of the anchor block 756. The gibs 762 and 764 have inwardly tapered faces upon which complementarily tapered opposite sides edges 766 (Fig. 24) on the lower adjusting plate 734 engage. The lower adjusting plate is thus supported from the upper adjusting plate 730 and is slidable in a fore and aft direction relative thereto. Inasmuch as it is carried by the upper adjusting plate, it moves transversely with the latter when the latter is adjusted.

Fore and aft movement is imparted to the lower adjusting plate by an adjusting screw 768 (Figs. 18 and 19) having a hand knob on its outer end. This screw passes through a recess 770 on the underside of the front gib bracket 742 and front gib 744 (Fig. 19) secured to the underside of the front side of the table 50. It has threaded engagement with a recess formed in part in the underside of the upper adjusting plate 730 and in part in a block 772 staked to the underside of this plate by means of cap screws.

The inner end of the adjusting screw is rotatable in a cylindrical recess formed in part on the upper side of the lower adjusting plate and in part in the lower side of a combined anchor block and guide member 774 staked to the upper side of the lower adjusting plate 734. A circumferential rib 776 on the inner end of the adjusting screw 768 is received in a complemental groove in the recess formed between this lower plate and guide member 774. Thus, when the adjusting screw 768 is turned, it will be advanced or retracted relative to the upper adjusting plate 730, depending on the direction it is turned, and will advance or retract the lower adjusting plate. Wear plates, one of which is seen at 778 in Fig. 20, may be secured to the underside of the upper adjusting plate 730 adjacent its opposite side edges. These wear plates space the upper and lower adjusting plates.

The upper and lower adjusting plates just described provide for transverse and for fore and aft adjustment of the stencil screen 52. The inner adjusting plate 732 now to be described provides for angular or rotational adjustment of the stencil screen. This plate is of ring-like shape, as seen in Fig. 24, and has four equidistantly spaced projections 780 on its outer periphery and arcuate portions 782 extending therebetween. These arcuate portions 782 rest upon the apexes of four rectangularly arranged inwardly projecting triangular formations 784 on the inner edges of the lower adjusting plate 734 (Fig. 18). The inner plate is thus supported by the lower adjusting plate wholly within the confines of the inner sides of the upper adjusting plate 730.

The inner plate 732 is held in position relative to the lower plate by oppositely disposed hub caps or guide members 786 (Fig. 18) and by the guide member 774 previously mentioned. This latter guide member has an arcuate inner edge 788 concentric with the arcuate portions of the inner plate. A flange 790 (Fig. 19), on this arcuate edge, engages the top side of the inner plate 732 loosely to hold the plate upon the lower adjusting plate 734. The guide members 786 are staked to the top side of the lower adjusting plate at the apexes of the triangular formations 784 on opposite sides of the lower adjusting plate. These guide members 786 each have an arcuate inwardly facing edge similar to the arcuate edge of guide member 774 and concentric with the arcuate portions 782 of the inner plate. A flange 790 on these guide members (Fig. 20) engages loosely upon the top side of the inner plate 732 to hold the same upon the lower plate.

The inner adjusting plate is rotated in opposite directions by a worm 792 which engages gear teeth 794 formed on the outer edge of the rear arcuate part of the inner plate (Figs. 18 and 23). Worm 792 is fixed upon a shaft 796 which is rotatable in bearing blocks 798 fixed to the top side of the lower adjusting plate 734 by means of screws. These bearing blocks have flanged arcuate inwardly facing edges which engage the rear arcuate portion of the inner plate to hold the same in position. The outer end of the shaft 796 projects through an opening in the side of the upper adjusting plate 730 and has a hand knob on its outer end for turning the same. From the above description it will be apparent that the bearing blocks 798 together with the guide members 774 and 784 secure the inner plate 732 against lateral movement relative to the lower plate 734 but do not impede angular or rotational movement of this inner plate.

Since the inner adjusting plate 732 is carried by the lower adjusting plate 734, it will move in a fore and aft direction whenever the lower adjusting plate is adjusted. Moreover, since the lower adjusting plate is carried by the upper adjusting plate 730 and moves transversely with it, the inner plate will also be moved transversely when the upper adjusting plate is adjusted. Thus the inner adjusting plates moves with every adjustment of the upper or lower plates and is movable angularly relative thereto. Since the stencil screen 52 is carried by a frame 800 (Fig. 24) attached to the inner adjusting plate 732, this screen will be moved whenever any one of the plates is moved an amount corresponding to the movement of the plate and in the same direction as the plate is moved.

The screen frame 800 (Fig. 24) is generally square and of angle iron construction. It has a horizontal flange 802 which has apertures 803 located at its four corners. On the underside of the flange 802, aligned with these apertures, a threaded nut or sleeve 804 (Fig. 21) is welded to the frame 800.

The frame 800 is fixed to the underside of the inner adjusting plate 732 by four screws 806 (Figs. 18 and 21) having knurled heads. These screws have lower reduced ends which pass through enlarged apertures 808 in the four projections 780 (Fig. 24) on the periphery of the inner adjusting plate and are threaded into the threaded sleeves 804 at the four corners of the frame 800. Enlarged washers 810 (Fig. 21), abutting against the shoulder at the base of the reduced portion of the screw, engage the top side of the inner adjusting plate 732 when the screws are tightened. As a result, the frame 800 is firmly drawn against the underside of the inner adjusting plate 732. Small adjustments in the position of the screen frame relative to the inner plate can be made by virtue of the fact that the apertures 808 are larger than the screws 806.

Releasable means is also provided for immovable clamping the three adjusting plates for the screen to the underside of the table. This table has four arcuate shaped equidistantly spaced apertures 812 concentric with the circular central opening 54 therein. Inverted U-shaped clamping members 814 on the upper side of the table straddle the openings 812 (Figs. 18 and 22). These clamping members are each fixed intermediate their ends to the intermediate part of clamping screws 816 in such a manner that the screws may be rotated relative to the clamping members but the latter are held against endwise movement relative to the screws. The lower ends of these screws extend through the arcuate openings 812 and are threaded into one or the other of two apertures 818 in the four projections 780 on the inner adjusting plate 732.

On their outer ends the screws 816 have hand knobs for turning the same. When they are tightened, the three adjusting plates are drawn firmly against the underside of the table and may thus be locked against movement after they have been properly adjusted. A convenient means is thus provided for locking the adjusting plates at a desired position of adjustment. Furthermore, due to the fact that the clamping screws 816 may engage in either of the openings 818 in the inner plate 732, the possible range of adjustment of the adjusting plates is increased. Moreover, the relatively large area of the arcuate openings 812, through which the supporting screws 806 and clamping screws 816 extend, provides room for a relatively wide range of adjustment of the position of the stencil screen frame 800 angularly, transversely, and in a fore and aft direction.

Before finishing the description of this portion of the machine, the manner of securing the stencil screen 52 to the screen frame 800 should be described. This screen may be of any of the mesh materials commonly used in stencil screens. It is somewhat larger in dimensions than its frame so that its peripheral edges may be drawn up along the underside of the horizontal flanges 802 on the screen frame (Fig. 15). A metal edging strip may be doubled around each of the peripheral edges of the screen and secured thereto to prevent fraying. Each edging strip has apertures adapted to register with apertures in the horizontal flanges 802 on the screen frame (Fig. 24). The screen is drawn taut across the bottom edges of the frame 800 by means of cap screws 821 which extend through the apertures in the edging strips on the screen and are threaded into the registering apertures in the horizontal flanges 802 on the screen frame. Preferably an elongated plate 820 is interposed between the heads of the cap screws 821 and the edging strips on the screen to prevent damage to these strips by the screws.

Housing tilting mechanism

In adjusting the stencil screen to register the same with the workpieces on the work holder at stenciling position, the upper unit housing 48 and mechanisms carried thereby is tilted backwardly. Then, with the table 50 in horizontal position, the stencil screen 52 may be viewed from directly above. As a result, adjustment of the position of the screen is facilitated, and can be done more accurately because the pervious areas or pattern in the screen can be more accurately aligned with the work on the work holder under the screen. Moreover, when the housing alone is tilted back, the mechanism in this housing under the top plate 336 including the squeegee is exposed so that it is readily accessible for adjustment. If it is desired to make adjustments in the mechanism located in the upper end of the lower subunit, this may be done much more readily if both the housing and table are tilted backwardly. The housing and table are tilted by mechanically driven means, best seen in Figs. 11, 25, and 26.

Tilting of the housing 48 is effected by a rotatable worm wheel 822 (Figs. 25 and 26) connected by a link 824 to a fixed part of the main frame 64. Worm wheel 822 is rotatably secured upon a shouldered bolt 826 fixed to one side wall of the housing 48 (Fig. 11). The link 824 includes an upper and a lower end part 828 and 830, respectively (Fig. 25). Upper end part 828 is pivotally secured upon a shouldered screw 832 fixed in the worm wheel 822. This upper end part has a threaded stem which is received in an enlarged cylindrical opening 834 in the lower end part 830. The end of the stem projects through a coaxial reduced opening 836 and the the two parts are secured together by a capstan nut 838 threaded on the lower end of the stem. This nut is received in a transverse recess 840 in the lower end part of the link. The position of this nut on the stem of part 828 determines the maximum length of the link, which may of course be adjusted by changing the position of the nut. A spring 842 normally urges the two parts 828 and 830 apart.

The lower end of the link is pivotally secured at 844 (Fig. 25) between a pair of upright pivot brackets or plates 846 fixed to the top crosspiece 94 on the main frame (Fig. 18). It will be noted, therefore, that the worm wheel 822 and the link 824 form a toggle connection between the fixed frame 64 and the housing 48. The opposite or outer pivot points of this toggle connection are respectively at the fixed pivot 844 on the main frame and the pivot bolt 826 for the worm wheel while the bolt 832 forms the middle pivot of the toggle connection. When the worm wheel 822 is rotated for example from the position shown in Fig. 25 to the position shown in Fig. 26 a force is exerted upon the worm wheel pivot bolt 826 which tilts the housing backwardly as shown. If the table 50 is clamped to the housing at this time then it too will be tilted backwardly. If it is not clamped to the housing it will remain in a horizontal position.

Interference between the housing 48 and its pivotal supporting means and the main frame is avoided due to the fact that the lower rear end of the housing is recessed, as previously described. The transverse closing plate 322 for this rear portion has a slot 848 (Fig. 25) through which the link 824 extends. Preferably a flexible boot or sleeve (not shown) is received upon the link and attached to the transverse closing plates at the rear of the housing to seal the slot 848 so that radioactive gases cannot escape therefrom.

The worm wheel 822 is rotated by a motor driven worm 850. This worm is fixed upon a worm shaft supported adjacent opposite ends in journal blocks 852 fixed to one side wall of the housing 48 (Fig. 11). The worm is driven by a small reversible motor 854 of, for example, 1/25 horsepower, preferably through a speed reducer. Motor 854 is bolted to the same side wall of the housing 48 as the bearing brackets 852 (Fig. 11).

Operation of the motor 854 is controlled by a manually operated reversing switch 856 (Fig. 29) conveniently located on the upper portion of the front side of the housing 48. By means of this switch the housing 48 may be moved to any desired tilted position merely by stopping the motor 854 when the housing has reached such position. The minimum length of the link 824 is somewhat less than the distance between the fixed pivot 844 and the bolt 832 when the bolt is at the dead center position shown in Fig. 25. By adjusting the capstan nut 838 the maximum length of the link can be adjusted to that desired. This should be somewhat greater than the distance between the fixed pivot 844 and the bolt 832. Then if the worm wheel rotates far enough to carry the bolt 832 to dead center position the parts will not jam. This adjustment of the link also insures lowering of the housing 48 into firm engagement with the table 50.

In order accurately to locate the table 50 when it is in lowered position relative to the main frame 64 the table is provided with bushed apertures 858 adjacent its front edge. The previously mentioned positioning dowels 152 engage in these apertures when the turntable is lowered onto the positioning blocks 150.

*Protective covering*

Preferably the outer sides of the main frame 64 are closed by sheet metal cover plates including a rear cover plate 860 (Fig. 4), opposite side cover plates 862, and a front cover plate 864. The rear and opposite side cover plates are bolted to the upright legs 68 in the main frame. However, the front cover plate 864 is preferably secured along one edge to one of the front legs by means of a piano hinge 866. At its opposite edge it is provided with conventional friction latching means indicated at 868 for releasably holding the front cover in closed position. If desired, a cover shown in Fig. 2 may be hinged to one of the upper edges of the housing 48 for closing the top of this housing.

A loop 870 of strap metal (Fig. 3) is provided as a cover for the portion of the periphery of the turntable 36 which extends beyond the edges of the main frame 64. At its opposite ends this strap is fixed to horizontal members in the main frame. The underside of the portion of the turntable which projects beyond the main frame is enclosed by a metal plate 872, a portion of which is shown in Fig. 1. This plate is generally circular in shape and is cut out to fit against the front of the machine so that it covers the bottom side of the portion of the turntable extending beyond the main frame. Along its periphery it may be attached to the bottom edge of the loop 870.

At the loading station 40 (Fig. 3) this cover plate may be provided with an opening (not shown) corresponding approximately in size with the size of one of the work holders 38 in the turntable. The anchor screws 156 are accessible through this opening so that the work holders may be removed if desired. A door (not shown) hinged to one side of this opening and held in closed position by a conventional friction catch may be provided for closing the same.

*Control system and safety devices*

Figure 29:
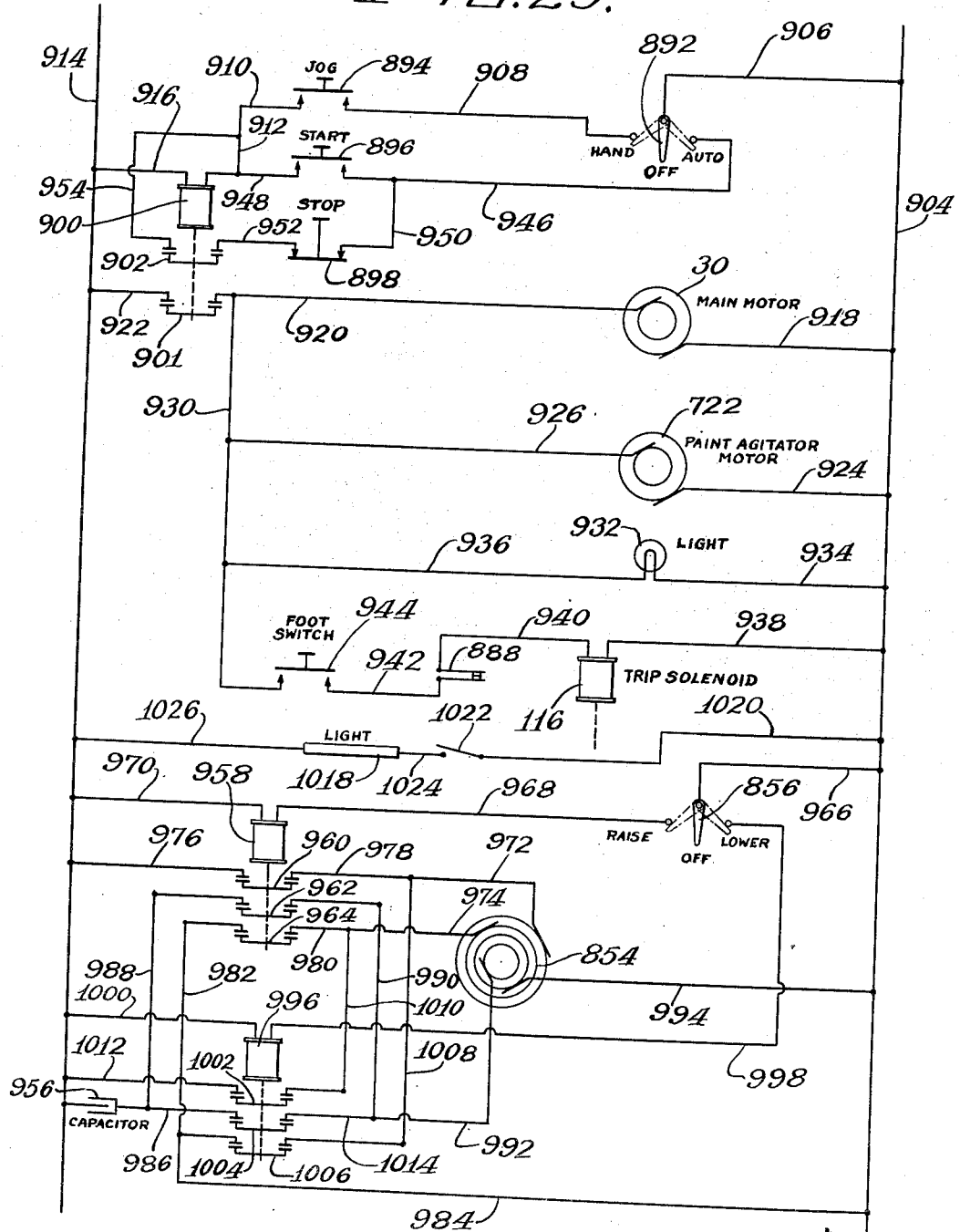
Fig. 29 is a schematic wiring diagram of a control system for the stenciling machine.

A control system schematically illustrated in Fig. 29 is provided for the machine together with certain safety features best seen in Figs. 3, 4, 27 and 28.

As previously explained, the Geneva drive 172 for the turntable is rotated through 60° by the drive lug 202 (Fig. 4) each time the main drive shaft 32 rotates through one complete turn. In order to make certain that the drive slots in the Geneva are accurately presented to the drive lug, the improved locking and safety device, best seen in Figs. 27 and 28, has been provided. This device comprises an elongated arm 874 which has a collar 876 welded thereto intermediate its ends. The collar 876 is rockably received upon a shaft or pin 878 secured to transversely extending frame members in the main frame 64, as best seen in Fig. 28. A roller 880 of somewhat larger diameter than the width of the drive slots in the Geneva 172 is journalled adjacent one end of the arm 874 as indicated at 882 in Figures 4 and 27. The arm 874 is biased by a spring 884 in a direction to cause the roller 880 to engage the periphery of the Geneva 172. This spring is carried by a depending generally cup-shaped carrier 886 secured to the main frame 64.

Since the roller 880 is too large in diameter to pass into the drive slots in the Geneva 172, the latter is not positively locked against rotation thereby, and when a positive driving force is applied to the Geneva by the drive lug 202, the Geneva will be rotated. However, if the Geneva stops upon termination of the application of the driving force thereto a little beyond or short of the position at which it should stop properly to present one of its drive slots to the drive lug 202, the roller 880 will engage one edge only of the drive slot brought opposite it by rotation of the Geneva. The biasing force of the spring 884 acting through the arm 874 and roller 880 should be sufficient to cause the Geneva to back up or move forward to its proper stopping position.

In addition to its function above described, the rockable arm 874 also operates to close the contacts of a microswitch 888 which is connected in the circuit of the solenoid 116 as seen in Fig. 29. For this purpose the rockable arm 874 has a depending stem 890 which carries an abutment for engaging the button on the microswitch 888 to close the contacts of the latter. This switch may be carried by a bracket suitably fixed to the main frame 64. Since the microswitch 888 is biased to open position, the circuit to the clutch solenoid 116 can be completed only when the roller 874 is in one of the slots in the Geneva so that the latter is in the proper position to have one of its drive slots engaged by the drive lug 202. Thus the clutch 34 cannot be engaged unless the Geneva is at the proper position. Furthermore, almost immediately after the circuit to the solenoid 116 is closed it is opened so that the trip lever 112 in the clutch will be returned by the spring 114 to a position to engage the trip cam 108 after the driven element 104 and shaft 32 have completed one revolution.

Referring to Fig. 29, it will be noted that the control system includes a control circuit having a manually operated switch 892, a momentary contactor jog switch 894, and start and stop switches 896 and 898, respectively. Also in this control circuit is a relay 900 for closing a pair of normally open contacts 901 and 902. Current is supplied to the control circuit from the right side of the line indicated at 904 by a conductor 906 connected to switch 892. This switch has a contact for manual operation as indicated connected to one side of the normally open jog switch 894 by conductor 908. The other side of the jog switch 894 is connected to one side of the relay 900 by conductors 910 and 912, and the opposite side of the relay is connected to the opposite or left hand lead indicated at 914 by a conductor 916.

It will be apparent, therefore, that when switch 892 is set for manual operation and the jog switch 894 is closed, the relay 900 will be energized and will close normally open contacts 901 and 902. Contacts 901 close a circuit to the main driving motor 30 which may be traced from the line 904 through conductors 918 to the motor 30. A conductor 920 connects the motor to one side of contacts 901 and a conductor 922 connects the contacts 901 to the line 914. At the same time a circuit to the paint dispenser agitating motor 722 is closed. This circuit extends from the lead 904 through a conductor 924 to one side of the motor 722. The opposite side of the motor is connected to the contacts 901 by conductors 926.

The contacts 901 also close a circuit to a constantly energized signal light 932 through a conductor 934 connected to the lead 904 and the lamp and a conductor 936 connected to the lamp and the conductor 930. Lastly an energizing circuit for the solenoid 116 for tripping the clutch lever 112 is connected to be energized through the relay contacts 901. This circuit includes a conductor 938 connected to lead 904 and one side of the solenoid 116. The other side of the solenoid is connected by a conductor 940 to one side of the microswitch 888 previously mentioned. If the turntable driving mechanism has come to rest at the proper position, this switch will be in closed position. This switch is connected by a conductor 942 to one side of a normally open switch 944 which has its other side connected to conductor 930 as indicated. Switch 944 preferably is a conventional foot operated treadle switch.

Since the jog switch 894 is biased to open position and snaps open as soon as it is released, it will be seen that when switch 892 is set for manual operation the circuits energized through relay contacts 901 will be energized only as long as the jog switch 894 is held in closed position. This makes it possible to inch the machine forward.

By moving the switch 892 to its off position, the control circuit is rendered ineffective to energize any of the circuits controlled by it. Movement of the switch 892 to the automatic position does not immediately close any circuits. It is first necessary to close the start switch 896 momentarily. Closing this switch energizes the relay 900 through a circuit including the conductor 906, switch 892, a conductor 946, start switch 896, a conductor 948, and part of conductor 912 to one side of the relay. Conductor 916 connects the other side of the relay to the lead 914. Energization of the relay closes both of its normally open contacts 901 and 902.

As a result, the circuit to the main driving motor 30 previously described is closed along with the previously described circuits to the paint holder agitating motor 722 and the lamp 932. The circuit to the solenoid 116 is also conditioned for energization in the event the treadle switch 944 is operated provided, however, that the switch 888 is also closed. In other words, this solenoid energizing circuit can be closed only if the Geneva 172 is at the proper position to be driven by the drive lug 202.

A holding circuit for the relay 900 is also closed when this relay is energized. This circuit includes the conductor 948 leading from the automatic contact of switch 892, a conductor 950, the normally closed stop switch 898, a conductor 952, relay contacts 902, a conductor 954, and conductors 912 and 916. As a result, once the relay is energized by closing the start switch 896 momentarily, it will remain energized until the stop switch 898 is opened, and all of the circuits above described will remain closed so that the main motor 30, paint agitator motor 732, and light 932 are energized constantly once the start switch 896 has been closed.

However, the operating mechanism of the machine can be driven from the main motor 30 only when the clutch 34 is energized. Since energization of the solenoid 116 which effects engagement of the clutch is under the control of microswitch 888 and foot switch 944 it will be seen that operation of the machine can be effected at any time it is at rest by closing the foot switch 944 momentarily provided the switch 888 is also closed. The machine will then be driven through one complete cycle and will stop when it has been returned to initial position. It is necessary therefor to press the foot switch 944 each time a stenciling operation is to be performed so that an operator has complete control of the operation of the machine.

As previously explained, the housing 48 is raised and lowered by a motor driven worm wheel 822 preferably driven by an induction motor 854 of the reversible capacitor type. The capacitor for this motor is indicated at 956 in Fig. 29. This motor may be energized independently of the other portions of the machine. The circuit for energizing the motor in a direction to raise the housing 48 includes the reversing switch 856 and a relay 958 which closes three sets of normally open contacts 960, 962 and 964 when it is energized.

The relay 958 is energized through a circuit including a conductor 966 connecting reversing switch 856 to the line 904. A conductor 968 is connected to the other side of this switch and to one side of relay 958 while the other side of the relay is connected to lead 914 by a conductor 970. Thus, when the movable contact of switch 856 is moved to the raised position, the relay 958 is energized and closes the three sets of contacts controlled by it.

The motor 854 has a pair of leads 972 and 974. When the motor is to be operated in a direction to raise the housing, lead 972 is connected to the line 914 through a conductor 976, relay contacts 960, and a conductor 978 which connects to the lead 972. A circuit from the lead 974 on the motor to the line 904 is completed through a conductor 980 connected to this lead, relay contacts 964, a conductor 982, and a conductor 984.

The capacitor is energized through the other contacts in the relay 958, its circuit from the line 914 including conductors 986 and 988, relay contacts 962, conductors 990 and 992, motor 854, and a conductor 994 which is connected to lead 904. Thus, when the switch 856 is set at raised position, the motor 854 drives the worm wheel 822 in a direction to cause the housing 48 to be raised. After the housing has been raised to the desired angle, the switch 856 may be moved to off position.

To lower the housing 48 the movable contact of switch 856 is engaged with its lowering contact. This energizes a relay 996 through a circuit including conductor 966, switch 856 and conductors 998 and 1000. Energization of relay 996 closes the normally open relay contacts 1002, 1004 and 1006. Thereupon the lead 972 on the motor 854 is connected to the right side of the line 904 through the conductor 984, a portion of the conductor 982, relay contacts 1006, and a conductor 1008. The other side of the motor 854 is connected to the left lead wire 914 through a conductor 1010, relay contacts 1002 and a conductor 1012. The capacitor 956 is energized through conductor 994, motor 854, conductor 992, a conductor 1014, relay contacts 1004 and conductor 986. Motor 854 is thus energized to rotate in a direction to cause the housing 48 to be lowered. When it reaches fully lowered position, the switch 856 may be turned to off position.

The switches and relays used in the control system have not been described in detail because they may be of conventional construction. However, it is to be understood that the relays 958 and 996 are mechanically interlocked to prevent accidental simultaneous closing of the contacts controlled thereby.

Preferably the main driving motor switch 892, jog switch 894, start and stop switches 896 and 898, respectively, and the reversing switch 956 for controlling operation of the housing raising and lowering motor 854 are secured in the control panel or box 858 on the front of the housing 48. The signal light 932 may also be secured in the front side of this box so as to be visible at all times.

In order to facilitate adjustment, repair and cleaning of the machine a suitable light 1018 such as a fluorescent lamp is mounted within the housing 48 upon one of its side walls (Fig. 12). This lamp is energized from the line directly by a conductor 1020 connected to lead 906 and a manual switch 1022 (Fig. 29). A conductor 1024 connects the switch to one side of light 1018 while the other side of the light is connected to lead 914 by conductor 1026. Thus the light may be operated independently of the operation of the machine.

Operation

During the course of the description of the construction of the various operating mechanisms, the manner in which they are operated individually from the main drive shaft 32 or the upper drive shaft 60 was described. Collectively these parts operate in synchronism automatically to stencil work in a manner which will now be described.

In the drawings the various operating mechanisms are shown in the position they assume when the machine is at rest. Specifically the main drive shaft 32 has been rotated to a position at which the index cam 222 on this shaft has caused the operating arm 212 to move the index pin 208 to retracted position so that the turntable 36 is free to rotate as indicated in Figs. 3 and 30. Furthermore, the roller 880 on the end of the arm 874 of the safety device is engaged in one of the slots in the Geneva 172 (Fig. 4). At this position of the parts the switch 888 is closed. One of the drive slots in the Geneva is in the proper position to be engaged by the drive lug 292 rotated by the main drive shaft 32 and the drive lug is about to enter into driving engagement with the Geneva as seen in Fig. 4.

The same movement of the main drive shaft 32, which brought the turntable indexing means to the position described above, has moved the drum cam 294 to a point at which the follower 300 on the reciprocating bar 296 is just entering the upper portion of the cam groove 302 in the drum cam 294 (Figs. 1 and 30). At this position of the parts the bar 296 has just completed its upward or forward stroke. As a result plunger 46 is in its lowermost position so that the work holder 38 at the stenciling station 42 and the work carried thereby are both in their lowermost position.

While the work positioning operating mechanisms in the main frame 64 are at the initial position described above, the squeegee shaft operating means in the upper subunit assumes the initial position described below. The upper drive shaft 60 will have been moved to a position at which the drum cam 462 (Fig. 2) fixed upon the same has been advanced to a point at which the follower 466 on the cam follower bar 448, which operates the squeegee shaft supporting rocker 404, has just entered the lower portion of the groove 466 in the drum cam 462. The squeegee shaft 58 and the squeegee 56 are therefore held in their uppermost position by the rocker 404.

It will be recalled that the face cam 598 (Fig. 8) in the upper subunit during the course of its rotation rocks the cam follower lever 512 in opposite direction. This lever in turn reciprocates trip rod 612 and thereby causes the forward stop pawl 596 to open at predetermined times. It also reciprocates the cam gear operating lever 518 and thereby periodically drives cam gear 520 which in turn drives the drive assembly 552 for the squeegee shaft 58 and the pawl cams 620 and 624 fixed to the drive assembly. Movement of the squeegee 56 over the screen is thus effected at predetermined times.

Referring to Fig. 8, it will be seen that the face cam 598 initially is at a position at which clockwise rotation thereof will cause the cam follower lever 512 to rock in a clockwise direction. The pin 618 connecting this lever to the trip rod 612 is at the rear end of the slot 616 in the connecting clevis 614 on this rod. The operating lever 518 for the cam gear 520 has been moved forwardly to a point at which the driving pin 538 thereon is short of one of the notches 536 in the cam gear. It will also be noted that the pawl cams 620 and 624 on the drive assembly are in inoperative position. In other words they are not in a position to hold the stop pawls 594 and 596 open. The drive assembly is therefore locked against rotation in either direction.

Assuming that the switch 892 is set at its automatic position and that the start switch 896 has previously been actuated, then the main driving motor 30 and the paint dispenser agitating motor 722 will be operating in the normal course of events. Paint may be fed to the screen 52 by a forward stroke of the plunger 692 in the paint dispenser 690. While the parts are stationary the stenciled dials from the previous operation of the machine may be removed from the work holder at the unloading station 44 and blank dials loaded on the empty work holder at the loading station 40.

If the treadle switch 944 is closed even momentarily the solenoid 116 is energized and retracts the trip lever 112 on the clutch 34. Thereupon the driving and driven elements of the clutch automatically engage to cause the main drive shaft 32 and the upper drive shaft 60 to be rotated in a clockwise direction. The various driving mechanisms described above are so related that the following sequence of operation occurs. This sequence can best be explained by reference to Fig. 30.

Initially the cam follower lever 512 is rocked in a clockwise direction by the cam 598 and causes the forward stop pawl 596 to open during the first five degrees of movement of the main drive shaft 32. Thereafter the cam follower lever continues to rock in a clockwise direction until the main drive shaft has moved forward approximately 25 degrees. During this first 25 degrees of movement the trip rod 612 is moved rearwardly a distance greater than necessary to open the forward stop pawl 596. Should the free end of this pawl strike the front wall of the housing 48 as it customarily will do, the spring 611 provides sufficient lost motion for the trip rod to complete its rearward movement. When the cam 598 completes 25° of forward movement the groove 510 is brought to a position at which the direction of rocking movement of the cam follower lever 512 is reversed, thus reversing the direction of movement of the trip rod 612 and actuating lever 518. This change in the direction of movement of the cam follower lever has been indicated by the abrupt step in the line representing the movement of the cam follower lever in Fig. 30.

After the main drive shaft has been driven through approximately 40°, the cam 508 will have rocked the cam follower lever 512 counterclockwise far enough to have drawn the cam gear operating lever 518 rearwardly sufficiently to bring the drive pin 520 on its forward end into engagement with the notch 536 in the cam gear toward which it had previously been moved so that continued movement of these parts in the same direction actuates the cam gear 520 in a counterclockwise direction. Cam gear 520 (Fig. 2) drives drive assembly 552, pawl cams 620 and 624, squeegee shaft 58 and squeegee 56 in a clockwise direction, thus starting the paint spreading stroke of the squeegee.

This counterclockwise movement of the cam follower lever 512 causes the trip rod 612 to move forwardly or in other words in a direction to release the forward stop pawl 596. However, before release occurs, the drive assembly 552 will have been moved forward far enough so that the periphery of the pawl cam 620 blocks return of the forward stop pawl 596 to operative position until the squeegee shaft 58 has completed a half turn. The cam 620 becomes effective as above described after approximately 50° of movement of the main drive shaft 32 and the trip rod 612 releases the forward stop pawl 596 by the time the main drive shaft has moved through 60°, as is clearly indicated in Fig. 30.

During this initial 60° of movement of the main drive shaft 32 the drive lug 202 drives the Geneva 172 a corresponding distance in a counterclockwise direction. The Geneva 172 drives the turntable 30 counterclockwise through 120° thus advancing each of the work holders one station. During this initial interval the lower and upper drum cams 294 and 462 respectively and the index cam 222 are not actively operative so that the lifting plunger 46 for the work holders remains in its lowermost position. The squeegee remains in its raised paint applying position and the index pin 208 remains retracted. Since the squeegee shaft is rotated for at least a portion of this initial period, at least a portion of the paint applying stroke of the squeegee occurs during the time that a work holder loaded with blank work is being brought opposite the stencil screen 52.

After the main drive shaft has moved approximately 60°, the drive lug 202 passes out of the drive slot in the Geneva 172 so that the Geneva and turntable stop. As previously explained, the roller 880 on the arm 874 of the safety device entering one of the slots in the Geneva accurately determines the stationary position of the Geneva and also closes the switch 888.

As the main drive shaft moves beyond 60°, movement of the cam follower lever 512 in a clockwise direction continues under the influence of cam 508 so that rotation of the drive assembly 552 and the parts rotated thereby also continues. At approximately the time the main drive shaft 32 completes 110° of movement, the drive assembly, squeegee shaft and squeegee complete one-half a turn. The forward pawl cam 620 and return pawl cam 624 are simultaneously brought to a position at which the stop pawls 594 and 596 are released thereby for movement to operative position under the influence of their biasing springs. Rotation of the squeegee shaft and squeegee is thus abruptly arrested. During the next few degrees of movement of the main drive shaft 32 the face cam 508 is brought to a position at which the direction of rocking movement of the cam follower lever 512 is again reversed so that it again moves in a clockwise direction and causes the lever 518 to move forward and the pin 612 to travel toward the rear of the lost slot 616 in the clevis on trip rod 612. The lost motion star wheel drive previously described absorbs any overrun of the parts after the pawls 594 and 596 move to operative position.

At substantially 120° the drum cam 294 and the index cam 222 on the main drive shaft 32 and the drum cam 462 on the upper drive shaft 60 become operative against their respective followers. As a result both the work holder at stenciling position and the squeegee shaft and squeegee are moved toward the screen simultaneously. At the same time the index pin 208 starts to move to locking position. These movements are completed by the time the main drive shaft has made half a turn and all of these parts thereafter remain stationary until this shaft completes approximately 300° of forward movement.

It will also be noted by reference to Fig. 30 that at approximately 180° the cam follower lever has moved far enough in a clockwise direction again to open the forward stop pawl 596. At approximately 198° the direction of rocking movement of the cam follower lever 512 changes to counterclockwise. As a result the actuating lever 518 is again brought into driving engagement with the cam gear 520. This occurs after approximately 220° of forward movement of the main drive shaft 32 and thus starts the paint applying stroke of the squeegee over the screen.

Continued movement of the cam follower lever 512 counterclockwise causes the trip rod 612 to release the forward stop pawl 596. Release of this pawl occurs after approximately 235° of movement of the main drive shaft. However, shortly prior to this the pawl cam 620 will have been moved ahead far enough to prevent return of the stop pawl 596 to operative position. Forward rotation of the drive assembly, squeegee shaft and squeegee therefore continues until a one-half turn is completed at which time the squeegee will have made a complete sweep of the screen at its lowermost or paint applying position. At this time the pawl cams 620 and 624 are brought to a position to release the stop pawls 596 and 594 for movement into engagement with the lugs 592 on the drive assembly 552. Movement of the latter and the parts driven thereby, including the squeegee, thus is abruptly arrested. At this time the main drive shaft has advanced approximately 290°.

Immediately thereafter the face cam 508 is brought to a position at which the direction of rocking movement of the cam follower lever 512 is reversed so that it again rocks in a clockwise direction while the main drive shaft completes one revolution. During this last interval of movement of the main drive shaft the lever 512 is returned to initial position. While this is occurring the cams 294, 462 and 222 become effective. Cam 294 causes the work holder at stenciling position to be lowered while drum cam 462 causes the squeegee to be raised to its paint applying position relative to the screen. Face cam 222 actuates the operating arm 212 in a direction to retract the index pin 208.

This last interval of movement of the main drive shaft also brings the drive lug 202 directly opposite one of the drive slots in the Geneva 172 so that the parts of the machine are at their initial position. Immediately prior to the time the main drive shaft completes one revolution, the step 120 on trip cam 108 in the clutch 34 is brought into engagement with the trip lever 112. The driving and driven elements of the clutch are thereby disengaged so that the machine stops moving and will remain at rest until the treadle switch 244 is again closed.

It may be desirable to have the index pin 208 in locking position relative to the turntable 36 when the machine is at rest to make it more certain that the turntable will not be moved accidentally. This can be done readily by making the contour of the cam slot 220 in the index cam 222 slightly different so that it has not moved the index pin 208 completely out of locking position when the machine comes to rest. In such a case it should move to nonlocking position during the first interval of movement of the main drive shaft. It, therefore, will be necessary to back up the drive lug 202 somewhat so that it does not become operative until the index pin is in nonlocking position.

Since the many advantageous features of the present stenciling machine have been mentioned in connection with the description of the various operating mechanisms, they will not be repeated here. While specific mechanisms have been described for performing specific operations in the present machine, it will be realized that the invention is not limited to the particular mechanisms described but may assume numerous other forms. It is to be understood, therefore, that the invention includes all modifications, variations and alternatives coming within the scope of the appended claims.

The paint agitator and dispenser disclosed herein is claimed in my divisional application Serial No. 298,105, filed July 10, 1952, and the stencil screen supporting and adjusting apparatus disclosed herein is claimed in my divisional application Serial No. 298,106, filed July 10, 1952.

I claim:

1. Stenciling apparatus comprising a stencil screen, a squeegee at one side of said screen, work carrier means at the other side of said screen, means for substantially simultaneously moving said squeegee and the work carried by said carrier means relatively in a direction axially of the squeegee toward and away from said screen between fixed positions at which the parts are respectively in paint spreading relationship and in stenciling relationship, means for rotating the squeegee alternately with movement of said squeegee in the plane of one of said parts at both fixed positions of the squeegee and work carrier means to completely sweep the squeegee across the screen and thereby cause paint to be spread on the screen when the parts are in paint spreading relationship and to be applied through the screen onto the article being stenciled when the parts are in stenciling relationship, a single power driven shaft for driving all of said means automatically to complete a stenciling operation, and means for interrupting operation of the shaft each time a stenciling operation is completed.

2. Stenciling apparatus comprising a stencil screen, a squeegee at one side of said screen, work carrier means at the other side of said screen, means for substantially simultaneously moving said squeegee and the work carried by said carrier means relatively in a direction axially of the squeegee toward and away from said screen between fixed positions at which the parts are respectively in paint spreading relationship and in stenciling relationship, means for rotating the squeegee alternately with movement of the squeegee at both fixed positions of the squeegee and work carrier means to completely sweep the squeegee across the screen and thereby cause paint to be spread on the screen when the parts are in paint spreading relationship and to be applied through the screen onto the article being stenciled when the parts are in stenciling relationship, a single drive shaft for driving said means for moving the squeegee, screen and work carrier means relatively into and out of stenciling relationship and said means for relatively moving said squeegee and screen transversely at each of said positions, and including a continuously operating source of power, and clutch means for disconnecting the shaft from the source of power each time the aforesaid means have been driven through a complete cycle and returned to non-stenciling relationship.

3. Stenciling apparatus comprising a stencil screen, a squeegee movably mounted at one side of said screen, work carrier means at the other side of said screen, means for substantially simultaneously moving said squeegee and the work carried by said carrier means in a direction axially of the squeegee toward and away from said screen to fixed positions, and means to alternate relative movement of the squeegee and work carrier means with rotation of the squeegee in its own plane sufficient to effect a complete sweep of the squeegee over the screen at each of said fixed positions to which the parts are relatively movable first to cause paint to be spread on the screen and then to be applied through the screen onto the articles being stenciled, and means for stopping rotation of the squeegee in its own plane upon termination of one complete sweep of the screen at either fixed position to which the squeegee and work carrier means are relatively movable while the said parts move to the other relative position.

4. Stenciling apparatus comprising a stencil screen, a rotatable squeegee at one side of said screen, work carrier means at the other side of said screen, means for substantially simultaneously moving said squeegee and the work carried by said carrier means in a direction axially of the squeegee toward and away from said screen to fixed positions, means to rotate said squeegee through a complete sweep of the screen alternately with the movement of said squeegee and work to the fixed positions to cause paint to be spread on the screen and then to be applied through the screen onto the article being stenciled, means for arresting rotational movement of the squeegee and screen each time a sweep of the screen is completed, and means for varying the transverse position relative to the screen at which the squeegee comes to rest upon termination of its rotational movement.

5. Stenciling apparatus comprising a stencil screen, a rotatable squeegee at one side of said screen, means for intermittently moving said squeegee toward and away from said screen in a direction axially of the squeegee between a paint spreading and a paint applying position, work carrier means at the other side of said screen, means for moving the work carried by said work carrier means toward and away from said screen to bring the work into and out of stenciling relation with the screen substantially simultaneously with the movement of said squeegee into and out of paint applying relationship, and means for rotating said squeegee through a complete sweep of the screen at each of the positions it assumes to cause paint to be spread on the screen when the work is out of stenciling relationship with the screen and to cause paint to be applied through the screen onto the work being stenciled when the work is in stenciling relationship with the screen.

6. In a stenciling apparatus having a stencil screen, a rotatable squeegee on one side of said screen, means for moving said squeegee toward and away from said screen between paint spreading and paint applying positions, means for rotating said squeegee through a complete sweep of the screen at each of said positions alternately with the movement of said squeegee, a movable carrier supporting a plurality of work holders on the other side of said screen, means for intermittently shifting the position of said carrier to move successive work holders opposite said screen, means for advancing and retracting the work holders relative to said screen while the carrier is stationary to move the work carried thereby into and out of stenciling relationship with the screen, and means synchronized with the work holder advancing and retracting means to move the squeegee and screen relatively into and out of paint applying position substantially simultaneously with the movement of the work holder opposite the screen into and out of stenciling position.

7. In a stenciling apparatus including a stencil screen, a rotatable squeegee at one side of said screen, means for intermittently moving said squeegee axially toward and away from said screen, means for rotating said squeegee to cause paint to be spread on the screen after the squeegee has been moved away from the screen and to cause paint to be applied through the screen onto the work being stenciled after the squeegee has been moved toward the screen, rotatable and axially movable carrier and work holding means to move work into and out of stenciling relationship with said screen, and intermittently operable means to rotate said carrier substantially simultaneously with the rotation of said squeegee at its paint spreading position and to move said work holding means axially toward and from the screen substantially simultaneously with movement of the said squeegee toward and from the screen, said work holding means remaining stationary while said squeegee is rotated at paint applying position.

8. Stenciling apparatus comprising a stencil screen having pervious areas conforming to the design to be applied to an article, means for holding articles in stenciling position relative to said screen, a movable squeegee having a blade disposed contiguous to the screen, means for intermittently moving said squeegee and screen relatively from each other and toward each other between positions in which the said parts are respectively in paint spreading relationship and in stenciling relationship, means for relatively moving said blade and screen in the plane of one of said parts at both relative positions of the parts to cause said blade to spread paint on said screen when the parts are in paint spreading relationship and to cause the same blade to force paint through said pervious areas onto the articles being stenciled when the parts are in stenciling relationship.

9. Stenciling apparatus comprising a stencil screen having pervious areas conforming to the design to be applied to an article, means for holding articles in stenciling position relative to said screen, a movable squeegee having blades disposed contiguous to the screen, means for intermittently moving said squeegee and screen relatively from each other and toward each other between positions in which the said parts are respectively in paint spreading relationship and in stenciling relationship, means for moving said blades through a complete sweep of the screen at each of said relative positions of the parts to cause the same blades to spread a film of paint material on said screen when the parts are in paint spreading relationship and to force the paint spread on said screen through said pervious areas when the parts are in stenciling relationship, and means for arresting sweeping movement of the squeegee each time the blades complete one sweep of the screen at either of said relative positions while it moves to the other relative position.

10. Stenciling apparatus comprising a stencil screen having pervious areas conforming to the design to be applied to an article, means for holding articles in stenciling position relative to said screen, a movable squeegee having blades disposed contiguous to the screen, means for intermittently moving said squeegee and screen relatively outwardly and inwardly of each other between fixed positions, means for moving said blades through a complete sweep of the screen at each of said fixed positions to cause the blades to spread a film of paint material on said screen when it is at one position relative to the screen and to cause the same blades to force the paint spread on said screen through said pervious areas when it is at its other relative position, and adjustable means for varying the location of either or both of the fixed positions between which the squeegee and screen are relatively movable inwardly or outwardly of each other.

11. Stenciling apparatus comprising a stencil screen having pervious areas conforming to the design to be applied to an article, means for holding articles in stenciling position relative to said screen, a movable squeegee, means for intermittently moving said squeegee and screen relatively between a fixed position in which the parts are in paint spreading relationship and a fixed position in which the parts are in stenciling relationship, means for moving said squeegee through a complete sweep of the screen at each of said relative positions of the said parts to cause the squeegee to spread a film of paint material on said screen when the parts are in paint spreading relationship and to force the paint spread on said screen through said pervious areas when the parts are in stenciling relationship, and means for varying the position relative to the screen at which the squeegee comes to rest upon termination of its sweeping movement at either of said fixed relative positions.

12. In a stenciling apparatus having a stencil screen, means at one side of this screen for spreading and forcing paint material through said screen onto work to be stenciled, a turntable, a plurality of equidistantly spaced work holders carried by said turntable and biased to a retracted position relative to said screen, indexing means for advancing said turntable to move successive work holders opposite the screen including means for locking the turntable at positions accurately locating said work holders opposite the screen, a plunger for advancing the work holder opposite said screen into stationary contact therewith, means to guide movement of said plunger and prevent angular displacement thereof, cooperating means on the plunger and holders for accurately positioning the latter relative to the plunger when the two are engaged, means for reciprocating said plunger, and means for operating said indexing means, turntable locking means and plunger reciprocating means successively.

13. In a stenciling apparatus having a stencil screen, a squeegee on one side of said screen, means on the other side of said screen for moving work into and out of stenciling relationship with the screen including a rockable member, means for adjusting either or both of the limits of movement of said rockable member, and means for rocking said rockable member including a cam, a member reciprocated by said cam, an operative connection between said rockable member and the member reciprocated by the cam including a part fixed to one of said members and oppositely disposed coil springs reacting between said part and the other member to transmit force between said rockable and reciprocable members, said springs being sufficiently resistant to yielding normally to rock said rockable member when said reciprocable member is reciprocated and providing a lost motion connection between the reciprocable and rockable members adapted to yield when movement of the latter is positively arrested, and means to move said squeegee over said screen when the work is in stenciling relationship to force paint through said screen onto the work and to move said squeegee over said screen when the work is out of stenciling relationship to spread the paint on said screen.

14. In a stenciling apparatus having a stencil screen, a squeegee on one side of said screen, means on the other side of said screen for moving work into and out of stenciling relationship with the screen including a reciprocable member, rigid guide means for said reciprocable member, means rockable on a fixed axis to one side of said reciprocable member for reciprocating the latter, means forming an operative connection between said reciprocable member and rockable means including a hollow guide block secured to the lower end of said reciprocable member and a roller extending into said guide block and pivotally secured upon a fixed axis carried by said rockable means, said guide block being dimensioned in a direction endwise of said reciprocable member closely to correspond to the diameter of said roller and thus prevent endwise play between the rockable means and reciprocable member and being of enlarged dimensions in a plane normal thereto to prevent binding between the reciprocable member and pivotal support for said rockable means when the latter is rocked.

15. Stenciling apparatus comprising a stencil screen, means for holding work on one side of the screen, a squeegee shaft and squeegee on the other side of the screen, means to rock said shaft and squeegee toward and away from said screen between fixed positions, means for moving the squeegee through a complete sweep of the screen at each fixed position first to spread paint on the screen and then to apply it through the screen, adjustable means for varying the location of either or both of said fixed positions to which the squeegee shaft and squeegee are movable, cam means to effect rocking movement of said squeegee shaft and squeegee through a stroke of predetermined length, and means to establish a driving connection between said cam means and squeegee shaft including means adapted to yield when adjustment of said adjustable means arrests rocking movement of the shaft short of the limits of the predetermined stroke.

16. Stenciling apparatus comprising a stencil screen, work holding means on one side of the screen, a squeegee shaft and squeegee on the other side of the screen, rockable means for moving said shaft and squeegee toward and away from said screen between fixed positions, means for moving the squeegee through a complete sweep of the screen at each position successively to spread paint on the screen and apply it to work to be stenciled, adjustable means for varying the location of either or both of said fixed positions, and means for rocking said rockable means including a power driven cam, a member reciprocated by said cam through a predetermined stroke, and a lost motion driving connection between said rockable means and reciprocable member including rigid driving means extending between said rockable means and reciprocable member, and opposed springs arranged to apply the driving force of said cam to said rockable means through said rigid means, said springs being sufficiently resistant normally to rock the rockable means and squeegee shaft through a full stroke and yielding only when rocking movement of these parts is positively arrested.

17. Stenciling apparatus comprising a stencil screen, work holding means on one side of said screen, a squeegee shaft and squeegee supported for rotation and for movement axially relative to the other side of said screen, means for rocking said shaft and squeegee axially toward and from said screen, means for rotating the shaft and squeegee successively to spread paint on the screen and apply it through the same, means for limiting movement of said shaft toward and from the screen including levers of generally bell crank shape pivotally secured to a fixed part of the apparatus, corresponding arms of each of said levers being disposed opposite each other in spaced relation and positioned for engagement by a part fixed relative to said shaft to define the limits of axial movement thereof, and adjusting screws adapted to be engaged by the other arms of each of said bell cranks to effect pivotal movement of the levers and thereby vary the spacing between the oppositely disposed arms.

18. Stenciling apparatus comprising a stencil screen, work holding means on one side of said screen, a rotatable squeegee shaft and squeegee on the other side of said screen, driving means for said squeegee shaft including a gear splined to said shaft, means for periodically arresting rotation of said driving means, means normally restraining rotation of said gear relative to said driving means sufficiently to establish a drive connection between the shaft and driving means without absolutely locking said parts against relative rotation, and means for rotating the gear and shaft while the driving means is arrested to vary the angular position relative to the screen at which the squeegee comes to rest when the driving means is arrested.

19. Stenciling apparatus comprising a stencil screen, work holding means, a squeegee shaft and squeegee, a rotatable drive assembly having a connection with said shaft to rotate the same, means for effecting step by step rotation of said drive assembly and the parts rotated thereby including a gear train effective to rotate said drive assembly, releasable means to arrest rotation of said drive assembly, means for driving said gear train including a cam, and linkage operated periodically by said cam in sequence to release said arresting means for a predetermined interval and drive said gear train to move the drive assembly and squeegee shaft through a predetermined arc.

20. Stenciling apparatus comprising a stencil screen, work holding means, a rotatable squeegee shaft and squeegee, a drive assembly having a connection with said shaft to rotate the same, oppositely disposed stop means biased to closed position for releasably locking said drive assembly against forward and return rotation, a gear to rotate said drive assembly, means for intermittently driving said gear to rotate said drive assembly and shaft in a forward direction including a cam, linkage intermittently operated by said cam in sequence to release said stop means and drive said gear, and oppositely disposed cam means rendered effective when said drive assembly moves from arrested position to hold said stop means in released position while the drive assembly, squeegee shaft and squeegee are rotated through a predetermined arc.

21. Stenciling apparatus comprising a stencil screen, work holding means, a squeegee shaft and squeegee, a rotatable drive assembly for rotating said squeegee, said drive assembly including a driven pinion having a resilient driving connection with said drive assembly, releasable means for abruptly arresting rotation of said drive assembly, means for effecting step by step rotation of said drive assembly and the parts rotated thereby including means operable intermittently substantially simultaneously to release said arresting means and drive said driven pinion and substantially simultaneously to discontinue the drive to said driven pinion and free said arresting means for return to operative position, said resilient driving connection between said driven pinion and drive assembly absorbing shock and overrun on arrest in the rotation of the drive assembly.

22. Stenciling apparatus comprising a stencil screen, work holding means, a squeegee shaft and squeegee, a rotatable drive assembly for rotating said squeegee, said drive assembly including a driven pinion having a lost motion driving connection with said drive assembly, means for effecting step by step rotation of said drive assembly including means for alternately rotating said drive assembly and abruptly arresting rotation thereof, said lost motion driving connection between said driven pinion and drive assembly comprising a star wheel fixed to rotate with said driven pinion, a cooperating star wheel fixed relative to the rest of said drive assembly, and coil springs forming a driving connection between said star wheels for absorbing shock and overrun on abrupt arrest in the rotation of the drive assembly.

23. Stenciling apparatus including a stencil screen, work holding means, a drive shaft, a rotatable squeegee shaft and squeegee, means for rotating said squeegee shaft including a gear train, a first cam means rotated by said drive shaft, means operated by said cam periodically to drive said gear train and thereby rotate the squeegee shaft and squeegee, rockable means for moving said shaft and squeegee in a plane substantially normal to the screen between paint spreading and paint applying positions, and a second cam means rotated by said drive shaft for rocking said rockable means, said two cam means rotated by said drive shaft being out of phase to alternate axial movement of the squeegee with rotation thereof and thereby effect paint spreading and paint applying at the separate positions of the squeegee relative to the screen.

24. Stenciling apparatus comprising a stencil screen, work holding means on one side of the screen, a squeegee shaft having a squeegee fixed thereto on the opposite side of the screen, means to support said shaft including a bearing for the shaft fixed against endwise movement relative thereto intermediate the ends of the shaft, a member supporting said bearing, said member being rockable to impart axial movement to the bearing and shaft and thereby move the squeegee between fixed axial positions relative to the screen, driving means on one side of said support having an operative connection with said shaft for effecting rotation of the shaft relative to which it is axially movable, bearings associated with said driving means including a bearing in which said shaft is rotatable and axially movable, a bearing for the shaft on the side of said support opposite said driving means in which said shaft is rotatable and axially movable, and means for alternately rotating said drive assembly and rocking said shaft to effect rotation of the squeegee at each of the fixed axial positions to which it is movable at one position to spread paint on said screen and at the other position to apply the paint through the screen onto the articles.

25. In a stenciling machine having work positioning means on one side of a stencil screen and a rotatable squeegee shaft on the other side of the screen, said shaft having a frusto-conically shaped end portion, the combination comprising a squeegee including a hub having a frusto-conical bore adapted to receive and hold said end portion of said squeegee shaft, a supporting member adapted to be fixedly secured to said hub, one or more blade assemblies adapted to be supported by said supporting member, each blade assembly comprising a flexible blade a clamping plate; and a blade holder, means for securing said blade between said holder and clamping plate, means for securing a blade assembly for rotary movement with said shaft including a slot and screw connection between the blade holder and supporting member disposed to one side of the axis of the squeegee shaft by means of which said blade assembly may be adjusted angularly to vary the degree to which the outer end of the blade precedes or trails its inner end when the squeegee shaft is rotated.

26. In a stenciling machine having work positioning means on one side of a stencil screen and a rotatable squeegee shaft on the other side of the screen, the combination comprising a squeegee including a supporting member adapted to be fixedly secured to said shaft, a blade assembly comprising a flexible blade and a blade holder, and a screw and slot connection between the supporting member and blade holder for slidably securing the latter to said supporting member to permit transverse movement of the blade holder relative to the supporting member and for pivotally securing the blade holder to said supporting member to permit angular adjustment of the blade holder and blade relative to the supporting member upon the axis of the screw.

27. In a stenciling machine having work positioning means on one side of a stencil screen and a rotatable squeegee shaft on the other side of the screen, the combination comprising a squeegee including a supporting member having a part secured to said shaft and one or more supporting arms extending outwardly therefrom having slots spaced laterally from the part secured to said shaft, a blade assembly for each of the arms on said supporting member, each blade assembly comprising a blade holder, a clamping plate and a flexible blade, means for securing said blade between said holder and plate means extending through said slots and into an intermediate part of said holders for pivotally securing said holders to said supporting member for angular adjustment relative to the supporting member whereby the degree to which the outer ends of the blades precede or trail their inner ends when the shaft is rotated may be adjusted.

28. In a stenciling apparatus having means for holding work in stenciling relationship with a stencil screen and a main frame to which is hinged a housing for a squeegee and its operating mechanism, means for tilting the housing on its hinged connection with said frame comprising, a rotary member secured upon an axis fixed relative to said housing, a link secured at one end to a fixed pivot axis on said frame and at the other end to a fixed pivot axis on the rotary member located radially of the axis of said rotary member, said link cooperating with said rotary member to form a toggle connection between the housing and frame which is moved between extended and contracted positions upon rotation of said rotary member thereby to effect movement of said housing on its hinged connection with the frame between upright and tilted positions, and means for rotating said rotary member to move the housing on its hinged connection.

29. Stenciling apparatus as defined in claim 28 wherein the link comprises parts longitudinally adjustable to vary the maximum effective length of the link and wherein said parts are interconnected by a lost motion connection adapted to yield sufficiently when said toggle connection approaches dead center at its extended position to allow the connection to move past dead center at this position upon continued rotation of the rotary member.

30. Stenciling apparatus as defined in claim 28 wherein the rotary member is a worm wheel and the means for rotating the same is a worm, and wherein a reversible motor controlled by a reversing switch is provided for rotating said worm.

31. In a stenciling apparatus having a main frame for supporting work holding means and a stencil screen, the combination comprising a squeegee, mechanism for operating said squeegee, a housing for said squeegee and its operating mechanism having an open bottom, a table on said frame against which said housing is adapted to engage to close said open bottom, cooperating means on the frame, housing and table securing the housing and table to the frame for pivotal movement relative thereto as a unit or independently between an operative position and a tilted inoperative position, releasable means for clamping the housing and table together for movement as a unit, means for rocking said housing between operative and inoperative positions, and cooperating positioning means on the frame and table accurately to locate the operative position of the table relative to the work holding means.

32. In a stenciling apparatus having a main frame for supporting work holding means and a stencil screen, the combination comprising a squeegee, mechanism for operating said squeegee, a housing for said squeegee and its operating mechanism having an open bottom, a table on said frame against which said housing is adapted to engage to close said open bottom, cooperating means on the frame, housing and table securing the housing and table to the frame for pivotal movement relative thereto as a unit or independently between an operative and a tilted inoperative position, releasable means for clamping the housing and table together for movement as a unit, and means for rocking said housing between operative and inoperative positions.

33. In a stenciling apparatus having a main frame, the combination comprising a squeegee, mechanism for operating said squeegee, a housing for said squeegee and its operating mechanism having an open bottom, a table on said frame against which said housing is adapted to engage to close said open bottom, said table having an aperture disposed axially relative to said squeegee when the parts are in operative position, a stencil screen supported by said table on one side of said squeegee in parallel relation thereto, work holding means on the side of said screen opposite said squeegee, cooperating means on said housing and table for clamping the same together, and cooperating means on the frame, housing and table securing the housing and table to the frame for pivotal movement as a unit relative to the frame when the two are clamped together to a position exposing one side of said table and screen and the work holding means and securing the housing for movement independently of the table when the parts are not clamped together to a position exposing the other side of said screen and table and the squeegee and operating mechanism therefor.

34. In a stenciling apparatus having a main frame for supporting work holding means, the combination comprising a squeegee, mechanism for operating said squeegee, a housing for said squeegee and its operating mechanism sealing off a space on all sides of said squeegee except one, a table on said frame against which said housing is adapted to engage in sealing relation with said open side, said table having an aperture, a stencil screen supported by said table to cover the aperture therein and seal said squeegee in said housing, cooperating means on the housing and table for clamping the same together to seal the space in the housing surrounding said squeegee, paint feeding means extending in sealed relation through the sealed portion of the housing and having an outlet over said screen, and an outlet connection communicating with the sealed space in the housing through which deleterious vapors emitted into said sealed space during the operation of said machine may be withdrawn.

35. In a stenciling apparatus having a main frame for supporting work holding means, the combination comprising a squeegee, mechanism for operating said squeegee, a housing for said squeegee and its operating mechanism enclosing a space on all sides of said squeegee except one, a table on said frame against which the open side of said housing is adapted to engage, said table having an aperture, a stencil screen supported by said table over the aperture therein, cooperating means on the housing and table for releasably clamping the same together, paint feeding means extending through the closed portion of the housing and having an outlet over said screen, and a window in a wall of said housing, said window being located to facilitate observation of the squeegee, screen and operating mechanism when the housing and table are in operative position.

36. In a stenciling apparatus having a main frame, the combination comprising a squeegee operating subunit including a squeegee, operating mechanism therefor, and a shaft supported in said subunit for driving said operating mechanism, a housing for said sub-unit having an open bottom, a stencil screen on one side of said squeegee, a table on said main frame, which said housing is adapted to engage to close said open bottom, means for bringing work into stenciling position relative to said screen supported in said frame on the other side of said screen, a main drive shaft supported in said frame for driving said work positioning means, cooperating means on said frame and housing securing the latter for rocking movement relative to the frame between an operative and a tilted inoperative position, and a universal joint for driving said subunit drive shaft from said main drive shaft adapted to maintain driving connection between the shafts when the subunit is tilted.

37. Stenciling apparatus including a stencil screen, a squeegee, squeegee positioning means for moving said squeegee into stenciling relationship with one side of the screen, movable work positioning means for bringing work into stationary stenciling relation with the side of said screen opposite said squeegee, power driven means to substantially simultaneously cause said work and squeegee positioning means to move said work and squeegee into stenciling relationship, complete one stenciling operation and return to initial position, clutch means to connect said power driven means to a source of power, and means conditioned upon failure of said parts to return to initial position to render said clutch means ineffective to connect said power driven means and source of power.

38. Stenciling apparatus including a fixed stencil screen, a squeegee, squeegee positioning means for moving said squeegee into stenciling relationship with one side of the screen, movable work positioning means for bringing work into stationary stenciling relation with the other side of said screen opposite said squeegee, power driven means to substantially simultaneously cause said work and squeegee positioning means to move said work and squeegee into stenciling relationship, complete one stenciling operation and return to initial position, a constantly operating source of power, electromagnetically operated clutch means to connect said power driven means to said source of power adapted automatically to become inoperative after a predetermined interval normally sufficient to complete a single stenciling operation and return the parts to their initial position, a circuit for said electromagnetically operated clutch means, and means to control closing of said circuit including a manually operated switch and a switch conditioned upon failure of the parts to return to initial position to prevent closing of said circuit.

39. Stenciling apparatus including a fixed stencil screen, a squeegee, squeegee positioning means for moving said squeegee into stenciling relationship with one side of the screen, movable work positioning means for bringing work into stationary stenciling relation with the side of said screen opposite said squeegee, power driven means to cause said work and squeegee positioning means to move said work and squeegee into stenciling relationship, complete one stenciling operation and return to initial position including a part rotated through a predetermined angle during each stenciling operation, means to connect said power driven means to a source of power and a safety device including a member on a fixed part of the apparatus biased toward the rotatable part in said power driven means, and means on the said rotatable part cooperating with said biased member when said rotatable part and power driven means approach initial position to urge the same to the said position.

40. Stenciling apparatus including a stencil screen, a squeegee, squeegee positioning means for moving said squeegee into stenciling relationship with one side of the screen, movable work positioning means for bringing work into stationary stenciling relation with the side of said screen opposite said squeegee, power driven means to cause said work and squeegee positioning means and squeegee to operate including a part rotated through a predetermined angle during each stenciling operation, a constantly operating source of power, electromagnetically operated clutch means to connect said power driven means to said source of power adapted upon energization to remain engaged for an interval long enough normally to cause a single stenciling operation to be completed and the parts to be returned to their initial position, a safety device including a member biased into engagement with the rotatable part in said power driven means, said biased member cooperating with said rotatable part when the latter and said power driven means return toward initial position releasably to hold the same at the said position, a circuit for said electromagnetically operated clutch means, and means to control closing of the circuit including a manually operated switch and a switch connected to be opened by the biased member when said member and the means on said rotatable part adapted to cooperate therewith are not in cooperating engagement.

41. Stenciling apparatus including a fixed stencil screen, a movable squeegee and movable work positioning means on opposite sides of said screen, said squeegee and work being moved toward and away from said screen into stenciling and nonstenciling relationship, power driven means to cause said work positioning means and squeegee to operate automatically, independent electrically energized means for driving said power driven means and controlling the application of power thereto, circuits for energizing said electrically energized means, a circuit to control energization of said first mentioned circuits including a relay for connecting said circuits to a source of current, and switch means in said control circuit including manually operated switches cooperating at one position thereof to effect operation of said apparatus under manual control and at another position to effect automatic operation of the apparatus.

42. Stenciling apparatus including a stencil screen, a movable squeegee and movable work positioning means on opposite sides of said screen, power driven means to cause said work positioning means and squeegee to operate automatically, an electric motor for driving said power driven means, an electromagnetically energized clutch to connect said motor to said power driven means for a sufficient interval to complete one stenciling operation and then return to disengaged position, a movable paint reservoir and agitator, an electric motor for agitating said reservoir, a circuit for energizing said two motors, a circuit including a normally open switch to energize said electromagnetically operated clutch, a circuit to control energization of said first two circuits including a relay for connecting said circuits to a source of current, and switch means in said control circuit including manually operated switches cooperating at one position thereof to effect operation of said apparatus under manual control and at another position to effect automatic operation of the apparatus.

43. Stenciling apparatus including a stencil screen, a movable squeegee and movable work positioning means on opposite sides of said screen, power driven means to cause said work positioning means and squeegee to operate automatically, an electric motor for driving said power driven means, an electromagnetically energized clutch to connect said motor to said power driven means for a sufficient interval to complete one stenciling operation and then return to disengaged position, a circuit for energizing said motor, a circuit including a normally open switch to energize said electromagnetically operated clutch, a circuit to control energization of said first two circuits including a relay for connecting said circuits to a source of current and switch means in said control circuit including a manually operated switch to close said control circuit for manual or automatic operation of the machine, a normally open switch manually operable to close said control circuit when said first mentioned switch is set for manual operation to permit operation of the machine under manual control, and a second switch means in said control circuit including a normally open switch to close a circuit to said relay when said first mentioned switch is set for automatic operation, and a normally closed switch for establishing a holding circuit for said relay upon momentary closing of said normally open switch to maintain said circuits energized until said normally closed switch is opened.

44. Stenciling apparatus including a stencil screen, a movable squeegee and movable work positioning means on opposite sides of said screen, power driven means to cause said work positioning means and squeegee to operate automatically, an electric motor for driving said power driven means, an electromagnetically energized clutch to connect said motor to said power driven means for a sufficient interval to complete one stenciling operation and then return to disengaged position, a circuit for energizing said motor, a circuit to energize said electromagnetically energized clutch, a circuit to control energization of said motor and clutch circuits including a relay for connecting said circuits to a source of current, switch means in said control circuit including manually operated switches cooperating at one position thereof to effect operation of said apparatus under manual control and at another position to effect automatic operation of the apparatus, and a manually operated switch in the clutch circuit for controlling energization of said clutch means to cause the same to move to engaged position, said circuit also including a switch to prevent energization of the clutch circuit except when said driven means is at initial position.

45. In a stenciling apparatus having a main frame, the combination comprising a squeegee operating subunit including a squeegee and operating mechanism therefor, a stencil screen on one side of said squeegee, means in said frame for bringing work into stenciling position on the side of the screen opposite said squeegee, cooperating means on said frame and subunit securing the latter for rocking movement relative to the frame between an operative and a tilted inoperative position, independent electrically energized means for driving said squeegee operating mechanism and said work positioning means including means controlling the application of driving force from said driving to said driven means, circuits for energizing said independent electrically energized means, a source of current, a circuit to control energization of said circuits including a relay for connecting said circuits to the source of current, switch means in said control circuit including a manually operated switch cooperating at one position thereof to effect operation of said apparatus under manual control and at another position to effect automatic operation of the apparatus, electrically energized means for moving said subunit between operative and inoperative positions, and an independent circuit including a manually operable reversing switch for energizing the means for moving said subunit from said source of current.

46. Stenciling apparatus comprising a stencil screen, a squeegee at one side of said screen, work carrier means at the other side of said screen, first means for substantially simultaneously moving said squeegee, stencil screen and the work carried by said carrier means relatively between fixed positions at which the parts are respectively in paint spreading relationship and in stenciling relationship, said first means including means for moving said work toward and away from said squeegee and screen in a direction generally perpendicular to the plane of the screen, and means for relatively moving the squeegee and screen in the plane of one of said parts to effect a complete sweep of the screen by the squeegee at each of said fixed positions of the squeegee, screen and work carrier means for causing paint to be spread on the screen when the parts are in spreading relationship and to be applied through the screen onto the article being stenciled when the parts are in stenciling relationship.

47. Stenciling apparatus comprising a stencil screen, a squeegee at one side of said screen, work carrier means at the other side of said screen, first means for substantially simultaneously moving said squeegee, stencil screen and the work carried by said carrier means relatively between variable fixed positions at which the parts are respectively in paint spreading relationship and in stenciling relationship, said first means including means for moving said work toward and away from said screen and work in a direction generally perpendicular to the plane of the screen, and means for relatively moving the squeegee and screen in the plane of one of said parts at both fixed positions of the squeegee, screen and work carrier means to cause paint to be spread on the screen when the parts are in paint spreading relationship and to be applied through the screen onto the article being stenciled when the parts are in stenciling relationship, and independently adjustable means for varying the location of each of the fixed positions to which the squeegee and screen are relatively movable and the fixed positions to which said carrier means and screen are relatively movable.

48. Stenciling apparatus comprising a stencil screen, a squeege at one side of said screen, work carrier means at the other side of said screen, first means for substantially simultaneously moving said squeegee, stencil screen and work carried by said carrier means relatively between fixed positions at which the parts are respectively in paint spreading relationship and in stenciling relationship, said first means including means for moving said work toward and away from said screen in a direction generally perpendicular to the plane of the screen, and means for relatively moving the squeegee and screen in the plane of one of said parts at both fixed positions of the squeegee, screen and work carrier means to cause paint to be spread on the screen when the parts are in paint spreading relationship and to be applied through the screen onto the article being stenciled when the parts are in stenciling relationship, and means for driving said apparatus automatically to cause the same to complete one stenciling operation and come to rest after moving the parts relatively out of stenciling relationship.

49. Stenciling apparatus comprising a stencil screen having pervious areas conforming to the design to be applied to an article, means for holding articles in stenciling position relative to said screen, a rotatable and axially movable squeegee having a blade disposed contiguous to the screen, a shaft for rotating said squeegee, rocker means carried by said shaft for alternately moving said squeegee axially between positions fixed relatively to said screen, and means for rotating said shaft and blade through a complete sweep of the screen at each of said fixed positions to cause the blade to spread a film of paint material on said screen when it is at one axial position and to cause the same blade to force the paint spread on said screen through said pervious areas when it is at its other axial position.

50. Stenciling apparatus comprising a stencil screen having pervious areas conforming to the design to be applied to an article, means for holding articles in stenciling position relative to said screen, a squeegee secured on one side of said screen for rotation and for axial movement toward and away from the plane of said screen, said squeegee having blades disposed contiguous to the screen, a shaft for rotating said squeegee, rocker means carried by said shaft for alternately moving the squeegee axially, means to rotate the shaft and blades through a complete sweep of the screen first to cause the blades to spread a film of paint material on said screen and then to cause the same blades to force the paint spread on said screen through said pervious areas, and means for arresting rotation of said squeegee each time the blades complete a sweep of the screen at either of the positions to which it is axially movable and while it moves axially to the other position.

RUFUS G. FORDYCE.

References Cited in the file of this patent

UNITED STATES PATENTS

| Number | Name | Date |
| --- | --- | --- |
| 1,641,143 | Allen | Sept. 6, 1927 |
| 1,731,635 | Murphy | Oct. 15, 1929 |
| 1,829,004 | Howard | Oct. 27, 1931 |
| 1,840,073 | Williams | Jan. 5, 1932 |
| 1,843,622 | Aldcroftt | Dec. 20, 1932 |
| 1,892,268 | Flockhart | Dec. 27, 1932 |
| 1,922,710 | Owens | Aug. 15, 1933 |
| 2,124,011 | Smith | July 19, 1938 |
| 2,229,346 | Shurley | Jan. 21, 1941 |
| 2,267,596 | Montague | Dec. 23, 1941 |
| 2,325,262 | McDannel | July 27, 1943 |
| 2,397,731 | Fowler | Apr. 2, 1946 |